United States Patent
Robinson et al.

(10) Patent No.: US 10,175,418 B2
(45) Date of Patent: *Jan. 8, 2019

(54) WIDE ANGLE IMAGING DIRECTIONAL BACKLIGHTS

(71) Applicant: REALD SPARK, LLC, Beverly Hills, CA (US)

(72) Inventors: Michael G. Robinson, Boulder, CO (US); Graham J. Woodgate, Henley on Thames (GB); Jonathan Harrold, Leamington Spa (GB); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/587,366

(22) Filed: May 4, 2017

(65) Prior Publication Data
US 2017/0235040 A1    Aug. 17, 2017

Related U.S. Application Data

(63) Continuation of application No. 13/839,552, filed on Mar. 15, 2013.
(Continued)

(51) Int. Cl.
*F21V 8/00*        (2006.01)
*G02B 27/22*       (2018.01)
(Continued)

(52) U.S. Cl.
CPC ......... *G02B 6/0068* (2013.01); *G02B 6/0048* (2013.01); *G02B 6/0055* (2013.01);
(Continued)

(58) Field of Classification Search
CPC .............................. G02B 6/0068; H04N 13/32
See application file for complete search history.

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Sejoon Ahn
(74) *Attorney, Agent, or Firm* — Penny L. Lowry; Neil G. Mothew

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. Viewing windows are formed through imaging individual light sources and hence defines the relative positions of system elements and ray paths. The
(Continued)

uncorrected system creates non-illuminated void portions when viewed off-axis preventing uniform wide angle 2D illumination modes. The system may be corrected to remove this non-uniformity at wide angles through the introduction of additional sources away from the system's object plane, additional imaging surfaces, and/or by altering ray paths.

15 Claims, 49 Drawing Sheets

Related U.S. Application Data

(60) Provisional application No. 61/649,054, filed on May 18, 2012, provisional application No. 61/648,840, filed on May 18, 2012, provisional application No. 61/649,050, filed on May 18, 2012, provisional application No. 61/727,421, filed on Nov. 16, 2012.

(51) Int. Cl.
| | |
|---|---|
| *G09G 5/14* | (2006.01) |
| *H04N 13/32* | (2018.01) |
| *H04N 13/368* | (2018.01) |
| *H04N 13/376* | (2018.01) |
| *G09G 3/00* | (2006.01) |
| *H04N 13/312* | (2018.01) |
| *H04N 13/366* | (2018.01) |
| *H04N 13/30* | (2018.01) |
| *G09G 3/34* | (2006.01) |

(52) U.S. Cl.
CPC ....... *G02B 6/0076* (2013.01); *G02B 27/2264* (2013.01); *G09G 3/003* (2013.01); *G09G 5/14* (2013.01); *H04N 13/312* (2018.05); *H04N 13/32* (2018.05); *H04N 13/366* (2018.05); *H04N 13/368* (2018.05); *H04N 13/376* (2018.05); *G02B 6/0038* (2013.01); *G02B 6/0043* (2013.01); *G09G 3/342* (2013.01); *G09G 2354/00* (2013.01); *H04N 2013/403* (2018.05); *H04N 2013/405* (2018.05)

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |

(56) References Cited

U.S. PATENT DOCUMENTS

| | | |
|---|---|---|
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 8,760,762 B1 | 6/2014 | Kelly et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |

(56) References Cited

U.S. PATENT DOCUMENTS

| | | | |
|---|---|---|---|
| 2011/0242150 | A1 | 10/2011 | Song et al. |
| 2011/0242277 | A1 | 10/2011 | Do et al. |
| 2011/0242298 | A1 | 10/2011 | Bathiche et al. |
| 2011/0255303 | A1 | 10/2011 | Nichol et al. |
| 2011/0285927 | A1 | 11/2011 | Schultz et al. |
| 2011/0292321 | A1 | 12/2011 | Travis et al. |
| 2011/0310232 | A1 | 12/2011 | Wilson et al. |
| 2012/0002136 | A1 | 1/2012 | Nagata et al. |
| 2012/0002295 | A1 | 1/2012 | Dobschal et al. |
| 2012/0008067 | A1 | 1/2012 | Mun et al. |
| 2012/0013720 | A1 | 1/2012 | Kadowaki et al. |
| 2012/0062991 | A1 | 3/2012 | Mich et al. |
| 2012/0063166 | A1 | 3/2012 | Panagotacos et al. |
| 2012/0075285 | A1 | 3/2012 | Oyagi et al. |
| 2012/0081920 | A1 | 4/2012 | Ie et al. |
| 2012/0086776 | A1 | 4/2012 | Lo |
| 2012/0106193 | A1 | 5/2012 | Kim et al. |
| 2012/0127573 | A1 | 5/2012 | Robinson et al. |
| 2012/0154450 | A1 | 6/2012 | Aho et al. |
| 2012/0162966 | A1 | 6/2012 | Kim et al. |
| 2012/0169838 | A1 | 7/2012 | Sekine |
| 2012/0206050 | A1 | 8/2012 | Spero |
| 2012/0236484 | A1 | 9/2012 | Miyake |
| 2012/0243204 | A1 | 9/2012 | Robinson |
| 2012/0243261 | A1 | 9/2012 | Yamamoto et al. |
| 2012/0257119 | A1* | 10/2012 | Hosoki ............... G02B 6/0056 348/725 |
| 2012/0257136 | A1* | 10/2012 | Horiuchi ............. G02B 6/0085 349/58 |
| 2012/0293721 | A1 | 11/2012 | Ueyama |
| 2012/0299913 | A1 | 11/2012 | Robinson et al. |
| 2012/0314145 | A1 | 12/2012 | Robinson |
| 2013/0101253 | A1 | 4/2013 | Popovich et al. |
| 2013/0107340 | A1 | 5/2013 | Wong et al. |
| 2013/0127861 | A1 | 5/2013 | Gollier |
| 2013/0135588 | A1 | 5/2013 | Popovich et al. |
| 2013/0156265 | A1 | 6/2013 | Hennessy |
| 2013/0169701 | A1 | 7/2013 | Whitehead et al. |
| 2013/0235561 | A1 | 9/2013 | Etienne et al. |
| 2013/0294684 | A1 | 11/2013 | Lipton et al. |
| 2013/0307831 | A1 | 11/2013 | Robinson et al. |
| 2013/0307946 | A1 | 11/2013 | Robinson et al. |
| 2013/0308339 | A1 | 11/2013 | Woodgate et al. |
| 2013/0321599 | A1 | 12/2013 | Harrold et al. |
| 2013/0328866 | A1 | 12/2013 | Woodgate et al. |
| 2013/0335821 | A1 | 12/2013 | Robinson et al. |
| 2014/0009508 | A1 | 1/2014 | Woodgate et al. |
| 2014/0022619 | A1 | 1/2014 | Woodgate et al. |
| 2014/0036361 | A1 | 2/2014 | Woodgate et al. |
| 2014/0041205 | A1 | 2/2014 | Robinson et al. |
| 2014/0043323 | A1 | 2/2014 | Sumi |
| 2014/0126238 | A1 | 5/2014 | Kao et al. |
| 2014/0240828 | A1 | 8/2014 | Robinson et al. |
| 2014/0368602 | A1 | 12/2014 | Woodgate et al. |
| 2015/0268479 | A1 | 9/2015 | Woodgate et al. |

FOREIGN PATENT DOCUMENTS

| | | | |
|---|---|---|---|
| CN | 1454329 | A | 11/2003 |
| CN | 1466005 | A | 1/2004 |
| CN | 1487332 | A | 4/2004 |
| CN | 1678943 | A | 10/2005 |
| CN | 1696788 | A | 11/2005 |
| CN | 1823292 | A | 8/2006 |
| CN | 1826553 | A | 8/2006 |
| CN | 1866112 | A | 11/2006 |
| CN | 1910399 | A | 2/2007 |
| CN | 2872404 | | 2/2007 |
| CN | 1307481 | | 3/2007 |
| CN | 101029975 | A | 9/2007 |
| CN | 101049028 | A | 10/2007 |
| CN | 200983052 | | 11/2007 |
| CN | 101114080 | A | 1/2008 |
| CN | 101142823 | A | 3/2008 |
| CN | 101266338 | A | 9/2008 |
| CN | 100449353 | | 1/2009 |
| CN | 101364004 | A | 2/2009 |
| CN | 101598863 | B | 12/2009 |
| CN | 100591141 | | 2/2010 |
| CN | 101660689 | A | 3/2010 |
| CN | 102147079 | A | 8/2011 |
| CN | 202486493 | U | 10/2012 |
| EP | 0653891 | A1 | 5/1995 |
| EP | 0721131 | A2 | 7/1996 |
| EP | 0830984 | A2 | 3/1998 |
| EP | 0833183 | A1 | 4/1998 |
| EP | 0860729 | A2 | 8/1998 |
| EP | 0939273 | A1 | 9/1999 |
| EP | 0656555 | B1 | 3/2003 |
| EP | 1394593 | A1 | 3/2004 |
| EP | 1736702 | A1 | 12/2006 |
| EP | 2003394 | A2 | 12/2008 |
| EP | 2451180 | A2 | 5/2012 |
| EP | 1634119 | B1 | 8/2012 |
| GB | 2405542 | | 2/2005 |
| JP | H08211334 | | 8/1996 |
| JP | H08237691 | A | 9/1996 |
| JP | H08254617 | | 10/1996 |
| JP | H08070475 | | 12/1996 |
| JP | H08340556 | | 12/1996 |
| JP | 2000048618 | A | 2/2000 |
| JP | 2000200049 | A | 7/2000 |
| JP | 2001093321 | A | 4/2001 |
| JP | 2001281456 | | 10/2001 |
| JP | 2002049004 | A | 2/2002 |
| JP | 2003215349 | A | 7/2003 |
| JP | 2003215705 | A | 7/2003 |
| JP | 2004319364 | A | 11/2004 |
| JP | 2005116266 | A | 4/2005 |
| JP | 2005135844 | A | 5/2005 |
| JP | 2005183030 | A | 7/2005 |
| JP | 2005259361 | A | 9/2005 |
| JP | 2006004877 | A | 1/2006 |
| JP | 2006031941 | A | 2/2006 |
| JP | 2006310269 | A | 11/2006 |
| JP | 3968742 | B2 | 8/2007 |
| JP | 2007273288 | A | 10/2007 |
| JP | 2007286652 | | 11/2007 |
| JP | 2008204874 | A | 9/2008 |
| JP | 2010160527 | A | 7/2010 |
| JP | 2011216281 | A | 10/2011 |
| JP | 2013015619 | | 1/2013 |
| JP | 2013502693 | | 1/2013 |
| JP | 2013540083 | | 10/2013 |
| KR | 20030064258 | | 7/2003 |
| KR | 20090932304 | | 12/2009 |
| KR | 20110006773 | A | 1/2011 |
| KR | 20110017918 | A | 2/2011 |
| KR | 20110067534 | A | 6/2011 |
| KR | 20120048301 | A | 5/2012 |
| KR | 20120049890 | A | 5/2012 |
| WO | 1994006249 | A1 | 3/1994 |
| WO | 1995020811 | A1 | 8/1995 |
| WO | 1995027915 | A1 | 10/1995 |
| WO | 1998021620 | A1 | 5/1998 |
| WO | 1999011074 | A1 | 3/1999 |
| WO | 2001027528 | A1 | 4/2001 |
| WO | 2001061241 | A1 | 8/2001 |
| WO | 2001079923 | A1 | 10/2001 |
| WO | 2011020962 | A1 | 2/2011 |
| WO | 2011022342 | A2 | 2/2011 |
| WO | 2011068907 | A1 | 6/2011 |
| WO | 2011149739 | A2 | 12/2011 |
| WO | 2012158574 | A1 | 11/2012 |
| WO | 2014130860 | A1 | 8/2014 |

OTHER PUBLICATIONS

AU-2011329639 Australia Patent Examination Report No. 1 dated Mar. 6, 2014.

AU-2013262869 Australian Office Action of Australian Patent Office dated Feb. 22, 2016.

(56) References Cited

OTHER PUBLICATIONS

AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office first action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].
JP-2015-512809 1st Office Action dated Mar. 28, 2017.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.

(56) References Cited

OTHER PUBLICATIONS

PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2016.
PCT/US2016/027350 International search report and written opinion of the international searching authority dated Jul. 25, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/061428 International search report and written opinion of international searching authority dated Jan. 20, 2017.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Appl. No. 15/098,084 entitled "Wide angle imaging directional backlights" filed Apr. 13, 2016.
Robinson, U.S. Appl. No. 13/300,293 entitled "Directional flat illuminators" filed Nov. 18, 2011.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

* cited by examiner

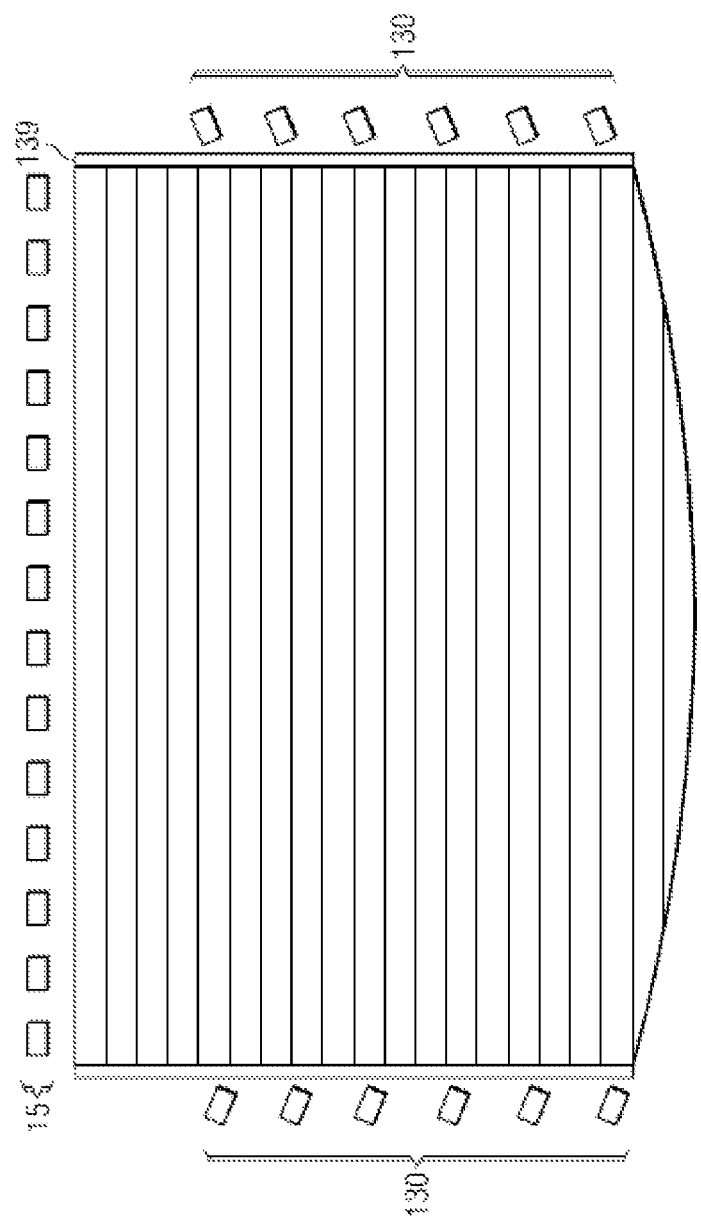

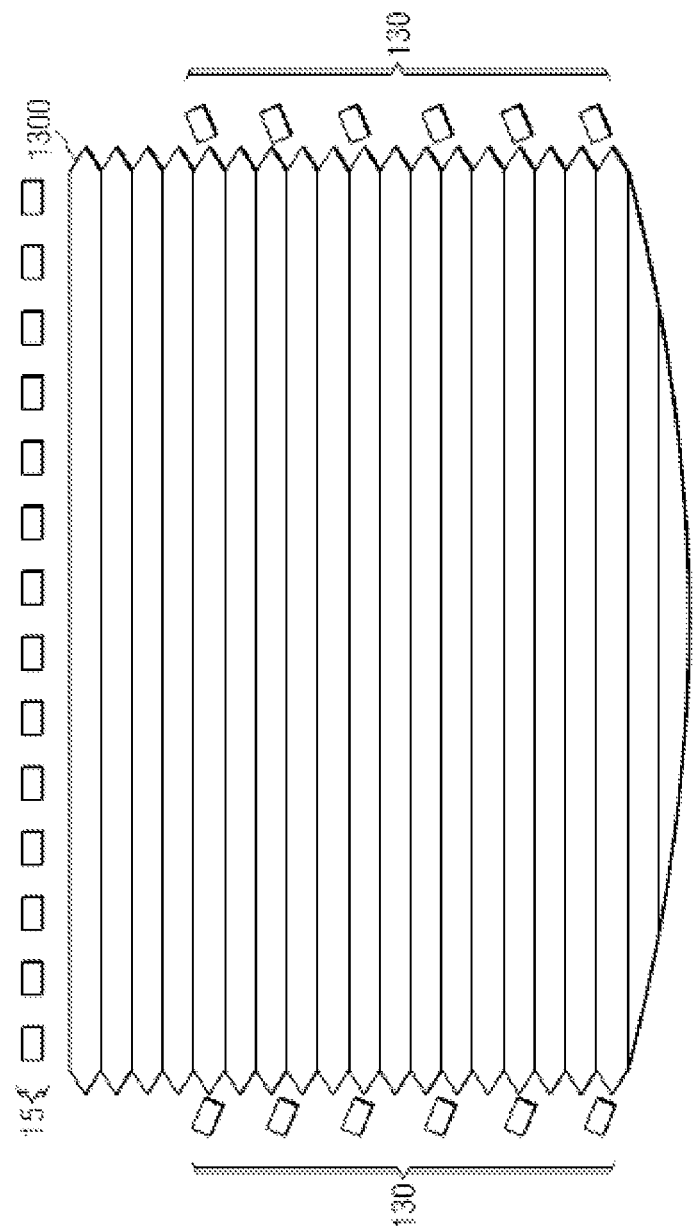

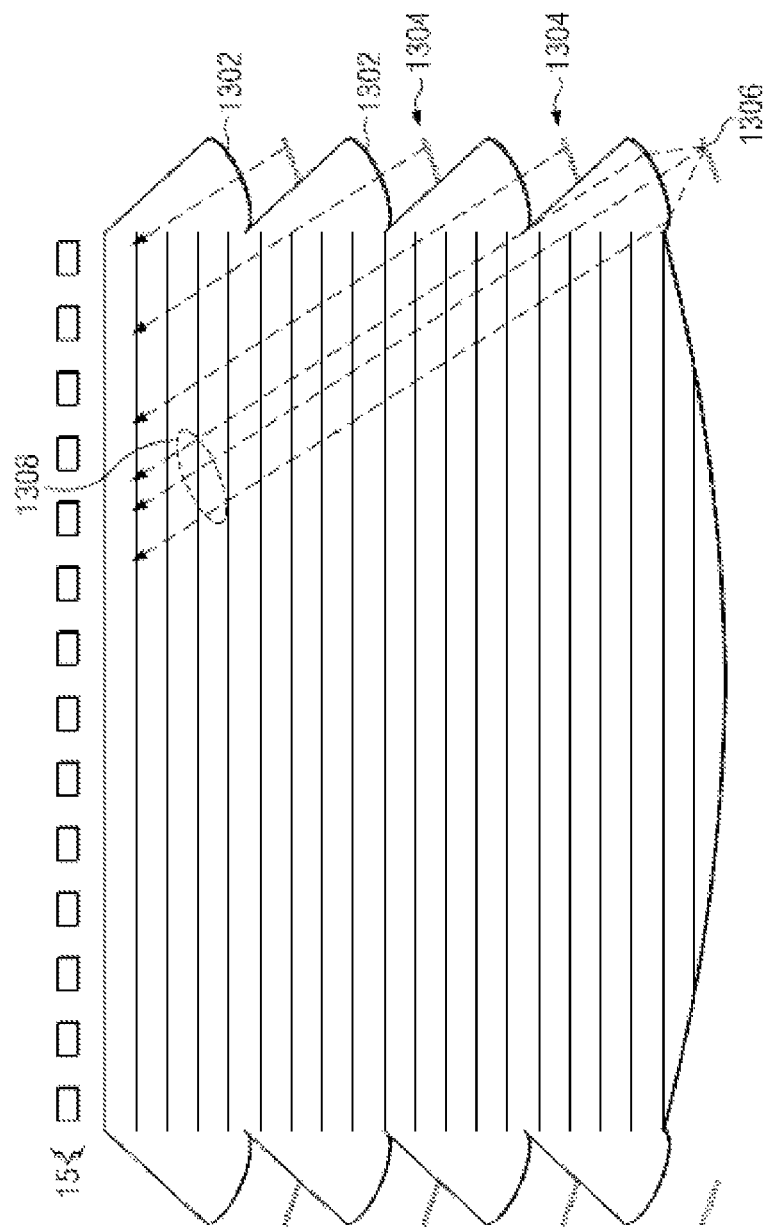

WIDE ANGLE IMAGING DIRECTIONAL BACKLIGHTS

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however, such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight and an additional optical element that alters the optical system of the imaging directional backlight to provide a substantially uniform 2D illumination mode. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus, a non-illuminated (or void) outer portion (that may be triangular) is formed between one edge of the collimated beam and the respective edge of the waveguide. No light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general, with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present invention, there is provided, a directional backlight apparatus comprising: a waveguide extending between an input end for receiving input light and a reflective end for reflecting the input light back through the waveguide; an array of light sources disposed at different input positions in a lateral direction across the input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions; and a control system arranged to selectively operate the light sources to direct light into a selectable viewing windows, wherein the reflective end converges the reflected light such that reflected light from light sources that are offset from the optical axis of the waveguide fails to illuminate outer portions of the waveguide, the waveguide further comprises sides, extending between the input end and the reflective end and between the guiding surfaces, that are planar surfaces arranged to reflect light from the light sources, and the control system being arranged, on selective operation of a first light source to direct light into a viewing window, to simultaneously operate a second light source that directs light reflected by the reflective end and then by a side of the waveguide into the outer portion of the waveguide that fails to be illuminated by the first light source.

According to a second aspect of the present invention, there is provided, a directional backlight comprising: a waveguide extending between an input end for receiving input light and a reflective end for reflecting the input light back through the waveguide; and an array of light sources disposed at different input positions in a lateral direction across the input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions, wherein the reflective end converges the reflected light such that reflected light from light sources that are offset from the optical axis of the waveguide fails to illuminate outer portions of the waveguide, and the waveguide further comprises sides, extending between the input end and the reflective end and between the guiding surfaces, that are arranged to reflect the light incident from a light source into the outer portion of the waveguide that fails to be illuminated by that light source.

According to a third aspect of the present invention, there is provided, a directional backlight device comprising: a waveguide extending between an input end for receiving input light and a reflective end for reflecting the input light back through the waveguide; and an array of light sources disposed at different input positions in a lateral direction across the input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions, wherein the reflective end converges the reflected light such that reflected light from light sources that are offset from the optical axis of the waveguide fails to illuminate outer portions of the waveguide, and the directional backlight device further comprises an array of second light sources disposed along each side of the waveguide that extends between the input end and the reflective end and between the guiding surfaces and arranged to supply light to said outer portions of the waveguide.

According to a fourth aspect of the present invention, there is provided, a directional display device comprising: a waveguide extending between an input end for receiving input light and a reflective end for reflecting the input light back through the waveguide; an array of light sources disposed at different input positions across the input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions; and a transmissive spatial light modulator extending across the waveguide for modulating the light output therefrom, wherein the spatial light modulator extends across only part of the area of the waveguide.

According to a fifth aspect of the present invention, there is provided, a backlight apparatus comprising: a directional waveguide extending between an input end for receiving input light and a reflective end for reflecting the input light back through the directional waveguide, the directional waveguide having first and second, opposed guide surfaces extending between the input end and the reflective end for guiding light forwards and back along the directional waveguide, wherein the second guide surface has a plurality of light extraction features facing the reflective end and arranged to reflect the light guided back through the directional waveguide from the reflective end from different input positions across the input end in different directions through the first guide surface that are dependent on the input position; and an array of light sources arranged to illuminate the directional waveguide at different input positions across the input end of the directional waveguide, wherein the reflective end converges the reflected light such that reflected light from light sources that are offset from the optical axis of the directional waveguide fails to illuminate outer portions of the directional waveguide; a backlight structure arranged extending across the second guide surface of the directional waveguide and arranged to provide illumination through the directional waveguide including the outer portions that fail to be illuminated by offset light sources.

Thus, each of the first to fifth aspects of the present invention provide structures that provide for illumination of the outer portion of the waveguide that otherwise fails to be illuminated by light sources. The first to fifth aspects of the present invention may be applied together in any combination.

According to a sixth aspect of the present invention, there is provided, an autostereoscopic display apparatus, comprising: a display device comprising an array of pixels, the display device being controllable to direct an image displayed on all of the pixels into selectable viewing windows having different positions; and a control system that is operable in a 3D mode of operation and a 2D mode of operation, the control system being arranged in the 3D mode of operation to control the display device to display temporally multiplexed left and right images and synchronously to direct the displayed images into viewing windows in positions in a lateral direction corresponding to the left and right eyes of the observer, and being arranged in the 2D mode of operation to control the display device to display a continuous 2D image, wherein the display device further comprises an angle-dependent diffuser film extending across the display device having a property that light incident at angles in a first range around the normal to the film in the lateral direction is not angularly diffused but light incident at angles in a second range in the lateral direction outside said first range is angularly diffused.

Further according to a sixth aspect of the present invention, there is provided, a waveguide structure comprising: a waveguide extending between an input end for receiving input light and a reflective end for reflecting the input light back through the waveguide, the waveguide having first and second, opposed guide surfaces extending between the input end and the reflective end for guiding light forwards and back along the waveguide, the waveguide being arranged to reflect input light from different input positions in a lateral direction across the input end after reflection from the reflective end in output directions distributed in a lateral direction in dependence on the input position; and an angle-dependent diffuser film extending across the waveguide, having a property that light incident at angles in a first range around the normal to the film in the lateral direction is not angularly diffused but light incident at angles in a second range in the lateral direction outside said range is angularly diffused.

The diffuser film in accordance with the sixth aspect of the present invention may provide increased viewing angle in a 2D mode of operation at a relatively low cost in an apparatus that is also capable of providing a 3D mode of operation using a time division multiplexing technique.

The sixth aspect of the present invention may be applied in combination with any of the first to fifth aspects of the present invention or with any combination thereof.

According to a seventh aspect of the present invention, there is provided, a directional illumination apparatus, comprising: an imaging directional backlight for directing light comprising: a waveguide for guiding light, further comprising: a first light guiding surface; and a second light guiding surface, opposite the first light guiding surface; and an illuminator array for providing light to the imaging directional backlight; and an additional optical element that alters the optical system of the imaging directional backlight to provide a substantially uniform 2D illumination mode.

According to an eighth aspect of the present invention, there is provided, a stepped imaging directional backlight apparatus, comprising: a stepped waveguide for guiding light, wherein the waveguide comprises: a first light guiding surface; and a second light guiding surface, opposite the first light guiding surface, the second light guiding surface comprising at least one guiding feature and a plurality of extraction features, wherein the extraction features direct light to exit the stepped waveguide; a first illumination input surface located between the first and second light guiding surfaces, the first illumination input surface operable to receive light from a first array of light sources; an illuminator array for providing light to the stepped imaging directional backlight; and an additional optical element that alters the optical system of the stepped imaging directional backlight to provide a substantially uniform 2D illumination mode.

According to a ninth aspect of the present invention, there is provided, an imaging directional backlight, comprising: an input side located at a first end of a waveguide; a reflective side located at a second end of the waveguide; a first light directing side and a second light directing side located between the input side and the reflective side of the waveguide, wherein the second light directing side further comprises a plurality of guiding features and a plurality of extraction features; and an additional optical element that alters an optical system of the imaging directional backlight to provide a substantially uniform 2D illumination mode, wherein the additional optical element is at least one of an optical emitter, an imaging facet end, or an alternative light path.

According to a tenth aspect of the present invention, there is provided, a folded imaging directional backlight system that provides a substantially uniform 2D illumination mode, comprising: a folded imaging directional backlight, comprising: a first waveguide for guiding light operable to receive light from an illuminator array; and a second waveguide optically connected to the first waveguide and operable to receive light from the illuminator array, wherein the first waveguide has a first edge with edge facets and the second waveguide has a second edge with edge facets, further wherein the edge facets provide a substantially uniform 2D illumination mode.

Any of the aspects of the present invention may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications.

In embodiments, the optical function of the directional backlight can be provided by a multiple imaging direction backlight system in which side voided regions of end illuminators may be filled. Advantageously such an arrangement may provide optical functions in addition to the respective optical valve functions while preserving the advantages of high efficiency, large back working distance and thin form factor of the respective optical valve.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient auto stereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 20B is a schematic diagram illustrating another directional backlight in which additional light sources are used to introduce light into the side of an optical valve, in accordance with the present disclosure;

FIG. 20C is a schematic diagram illustrating another directional backlight in which additional light sources are used to introduce light into the side of an optical valve, in accordance with the present disclosure;

FIG. 21 is a schematic diagram illustrating another directional backlight in which local arrays of sources launch light at controlled angles for wide angle uniform viewing with independent window control, in accordance with the present disclosure;

DETAILED DESCRIPTION

Figure 1A:
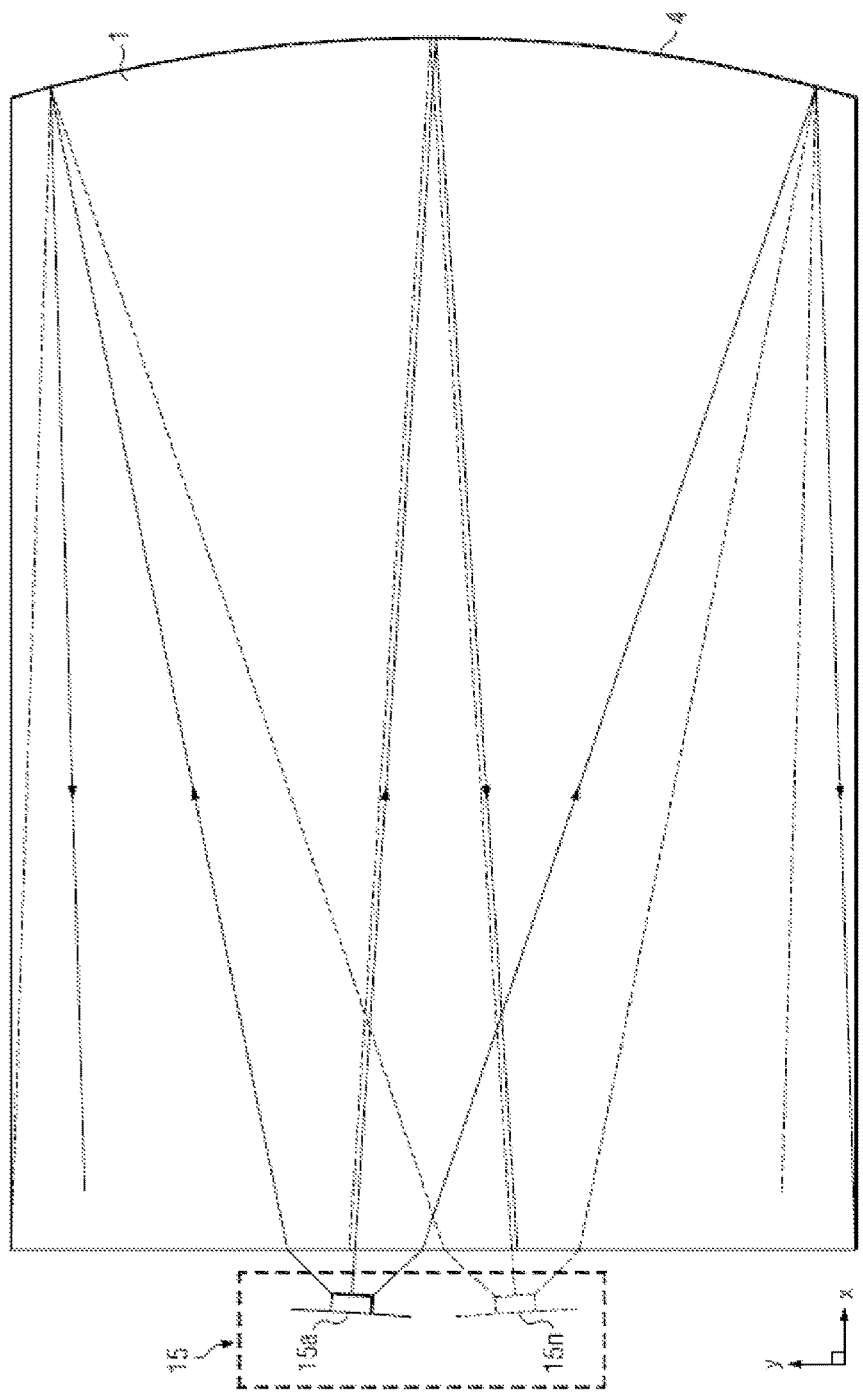
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first-time slot, and all of the pixels to a second viewing window in a second-time slot. Thus, an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one-dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus, non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a glossy waveguide which may include sparse features; typically, local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back-working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
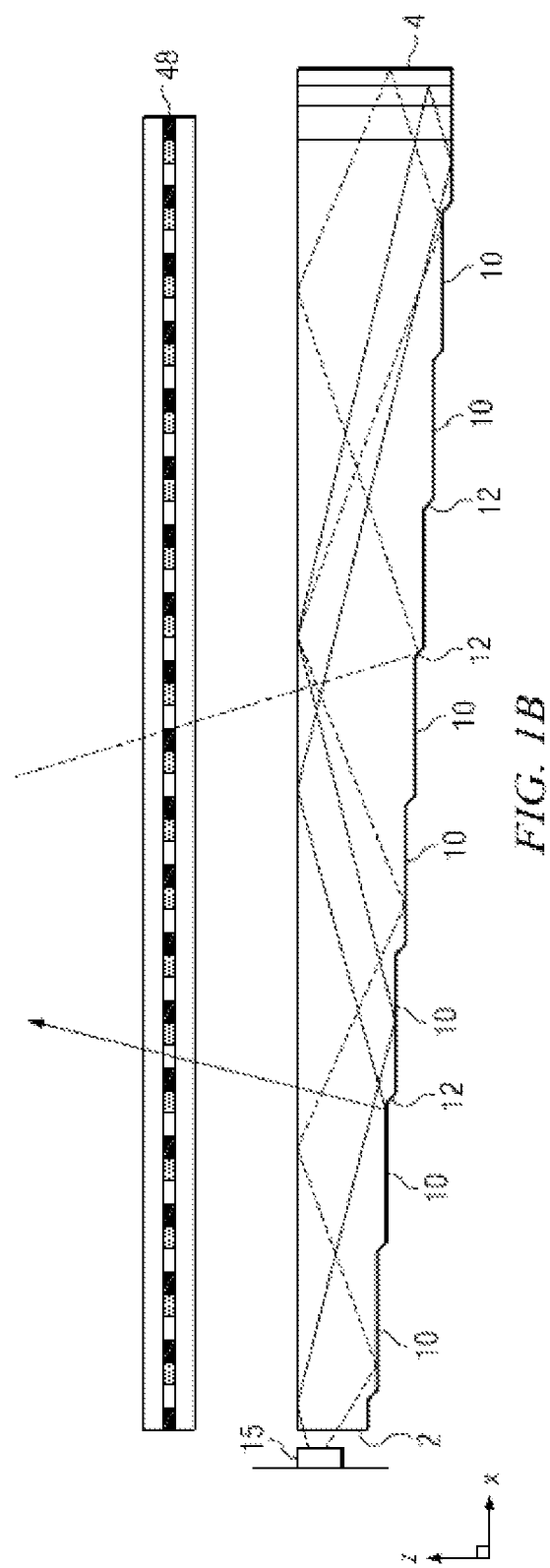
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus, the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one-dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45-degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
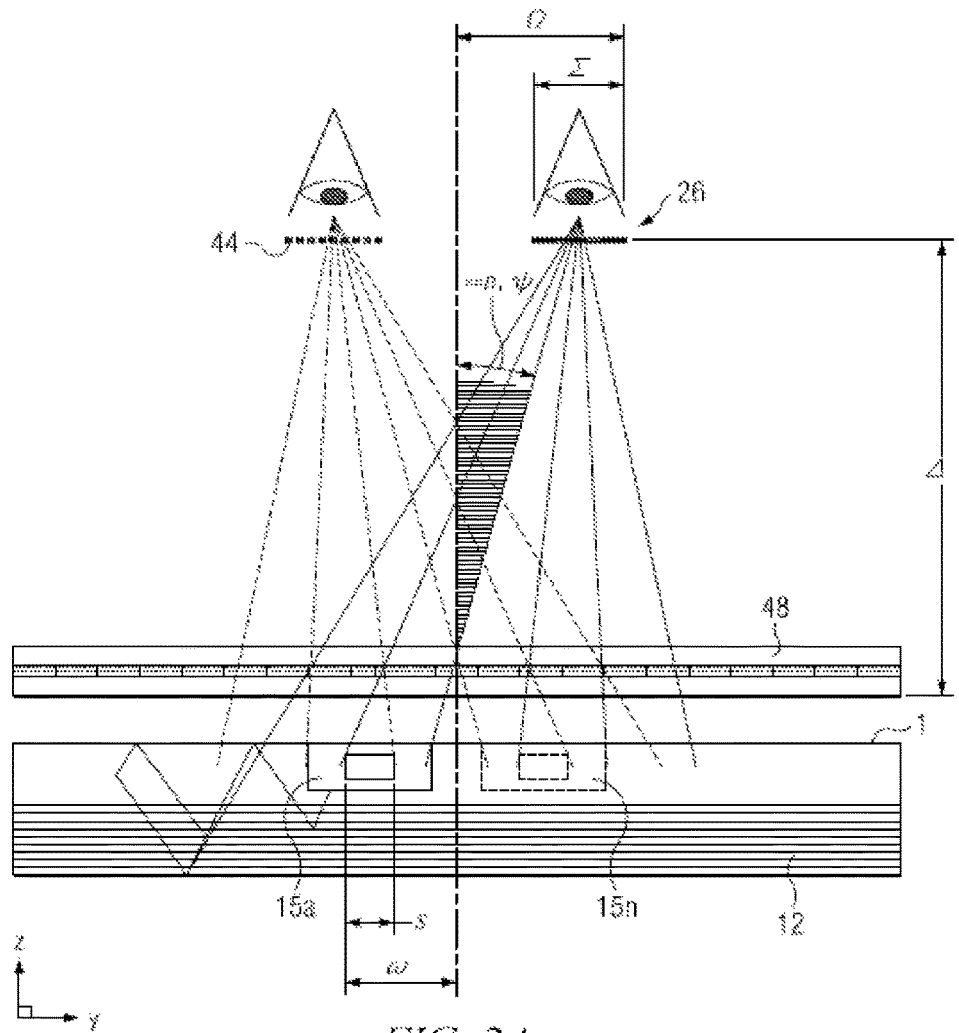
FIG. 2A is a schematic diagram illustrating in a top view of light propagation in another embodiment of a directional display device, in accordance with the present disclosure.
Figure 2B:
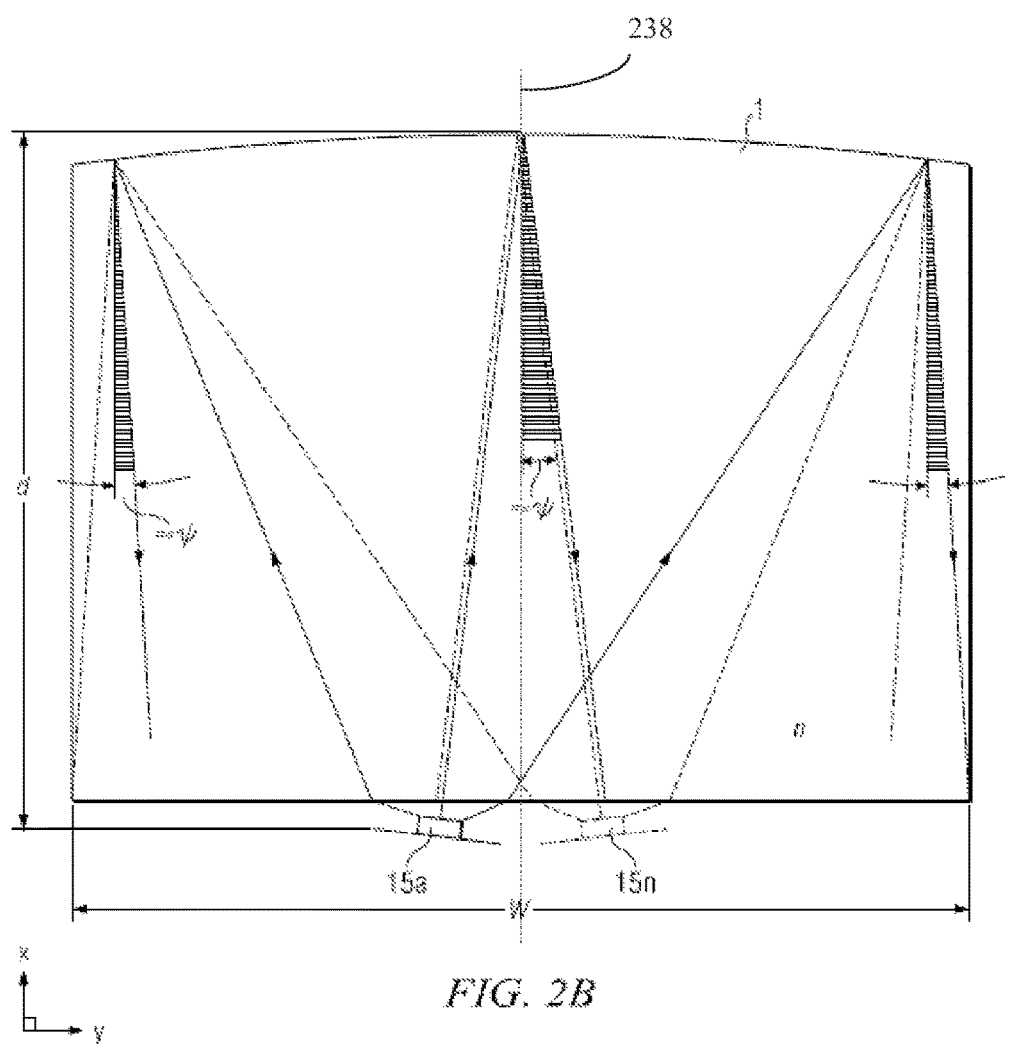
FIG. 2B is a schematic diagram illustrating light propagation in a front view of the directional display device of FIG. 2A, in accordance with the present disclosure.
Figure 2C:
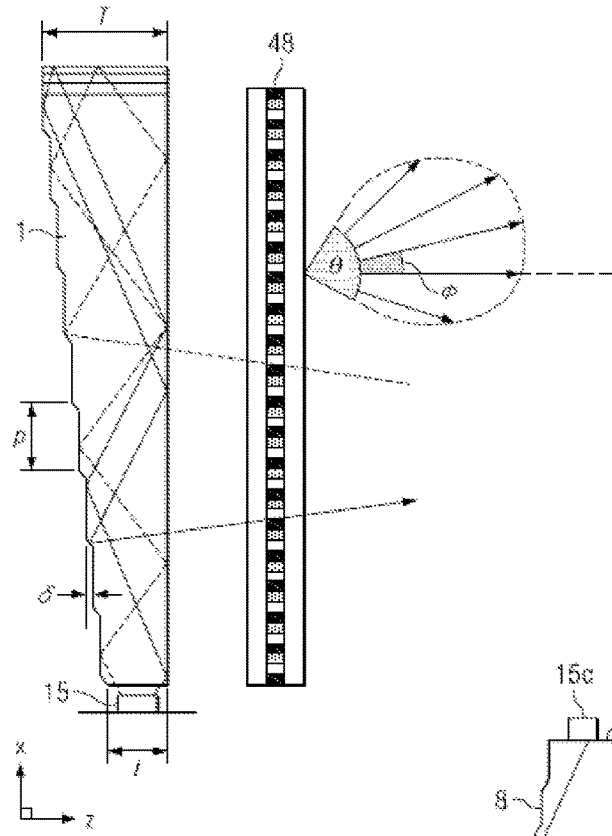
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one-dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
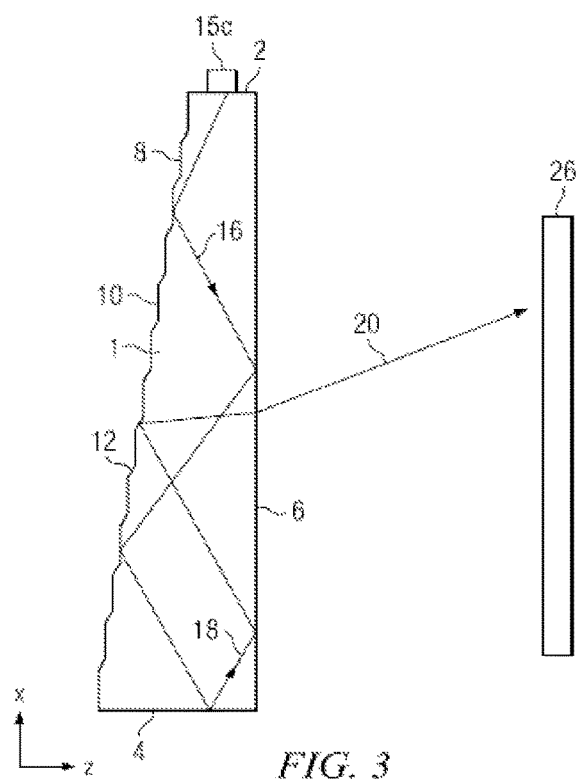
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus, each viewing window 26 represents a range of separate output directions with respect to the surface normal direction of the spatial light modulator 48 that intersect with a plane at the nominal viewing distance.

Figure 4A:
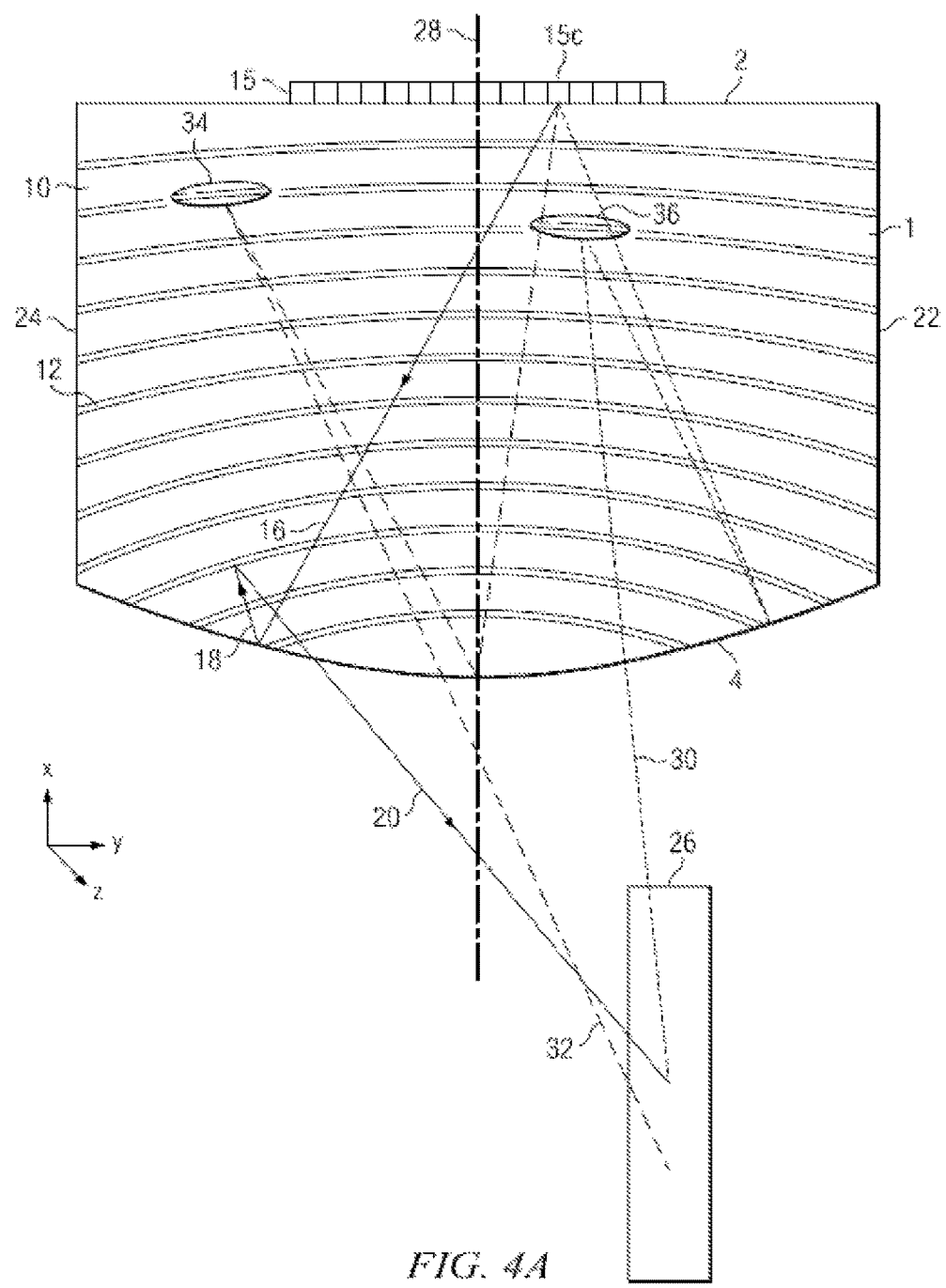
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15*c* of illuminator array 15, in the stepped waveguide 1. Each of the output rays are directed towards the same viewing window 26 from the respective illuminator 14. Thus, light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
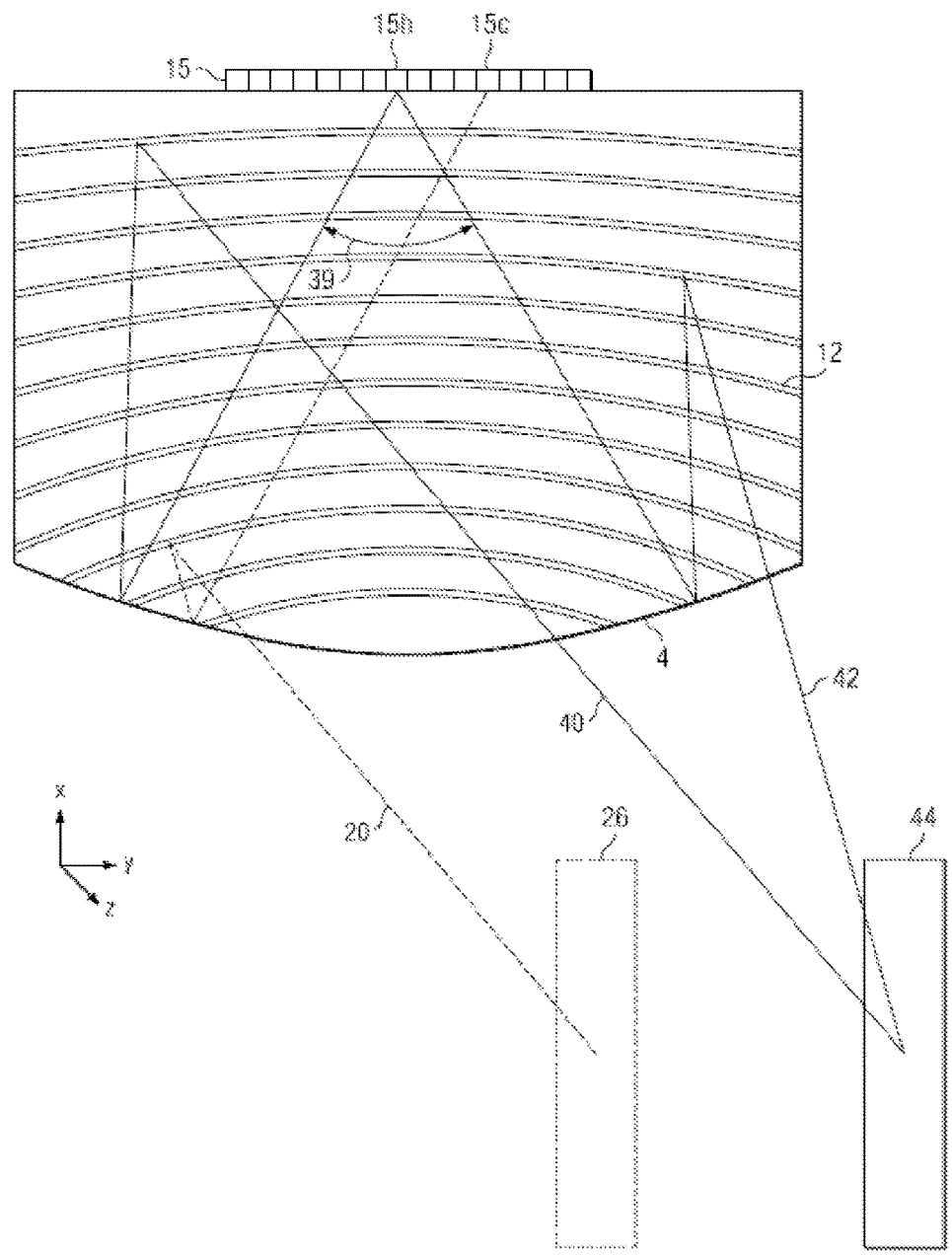
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15*h* of the illuminator array 15. The curvature of the reflective end on the side 4 and the light extraction features 12 cooperatively produce a second viewing window 44 laterally separated from the viewing window 26 with light rays from the illuminator element 15*h*.

Advantageously, the arrangement illustrated in FIG. 4B may provide a real image of the illuminator element 15*c* at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15*c* to lateral positions in viewing window 26. Improved aberrations may achieve an extended viewing freedom for an autostereoscopic display while achieving low cross talk levels.

Figure 5:
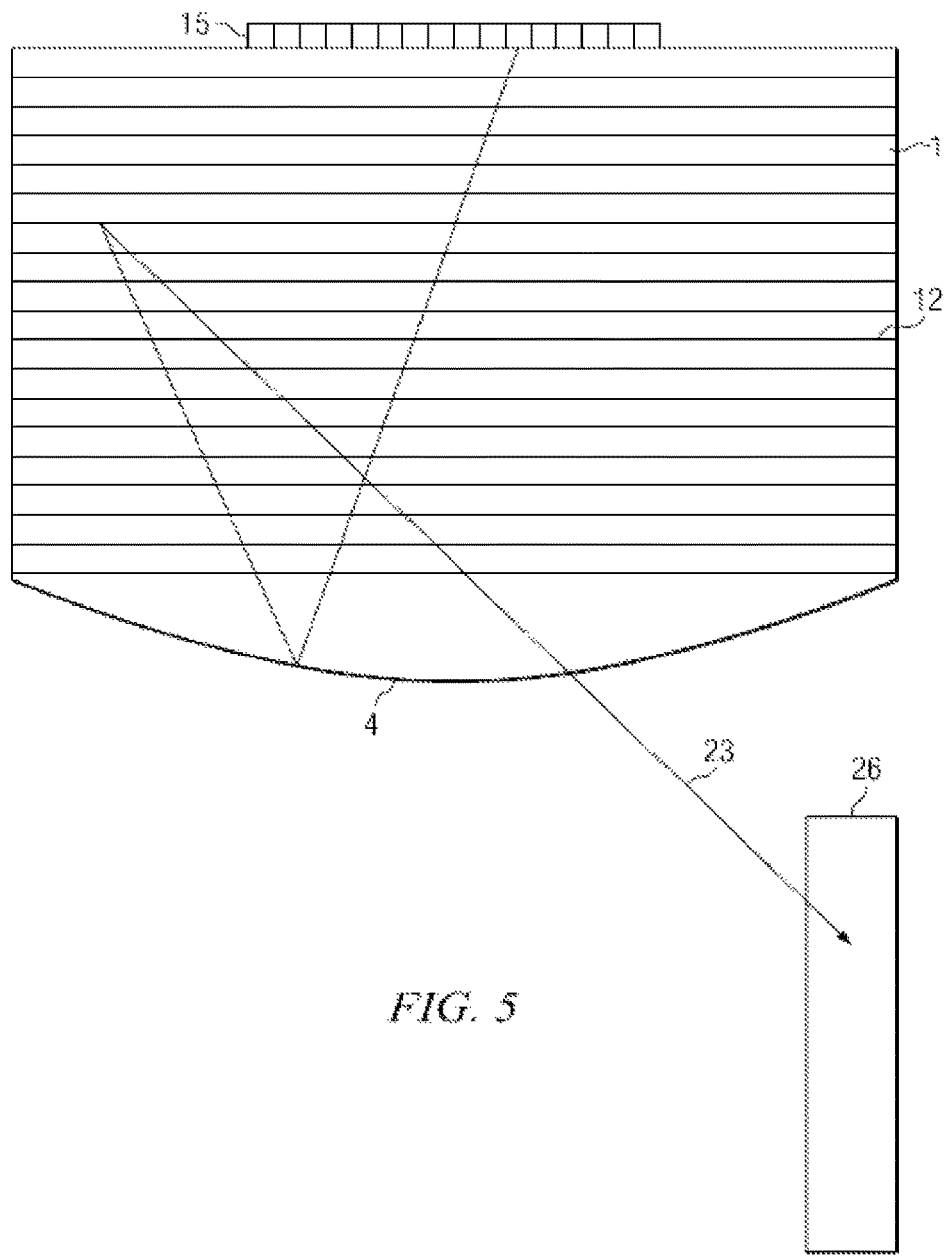
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
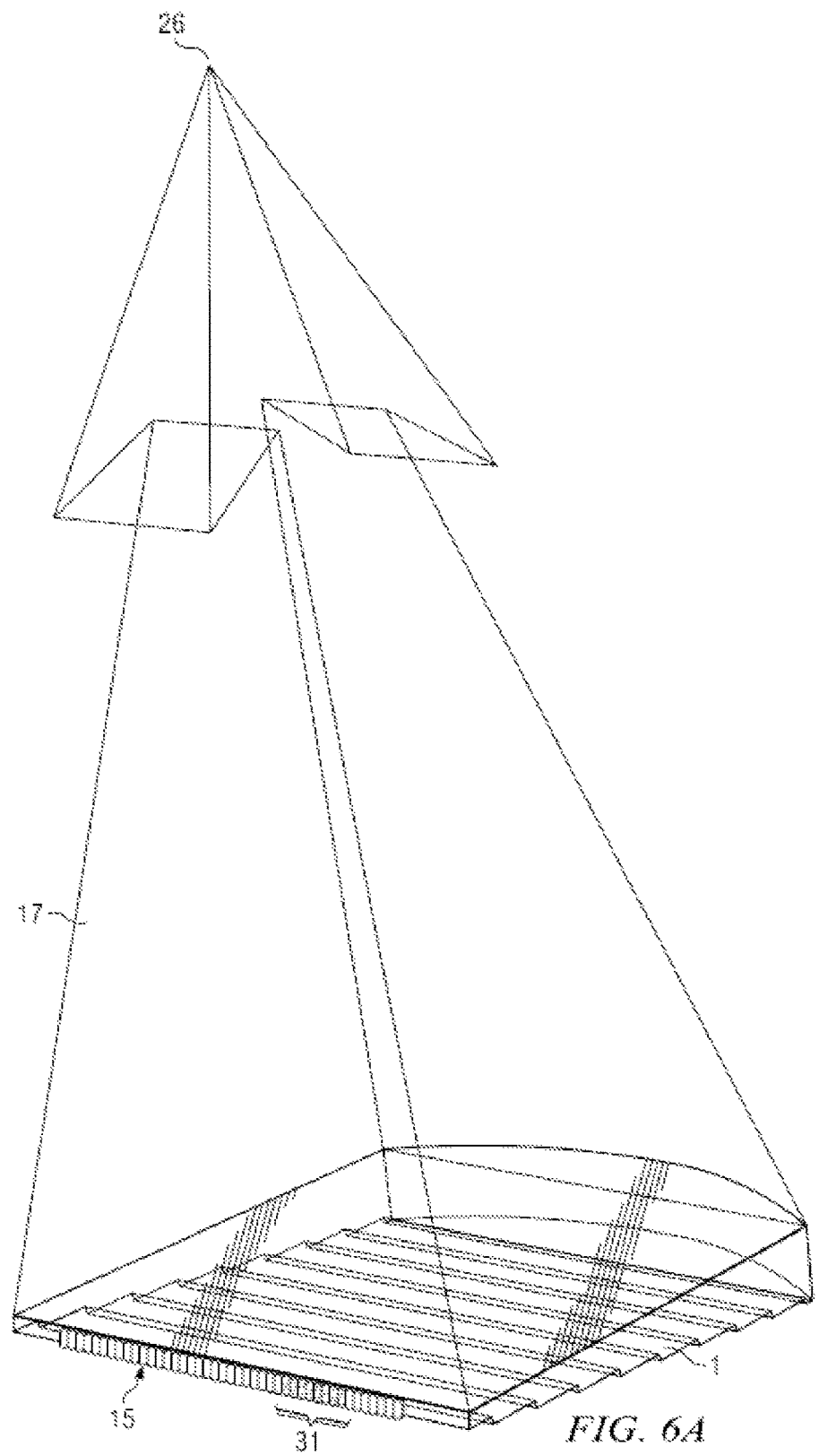
FIG. 6A is a schematic diagram illustrating one embodiment of the generation of a first viewing window in a time multiplexed directional display device in a first-time slot, in accordance with the present disclosure.
Figure 6B:
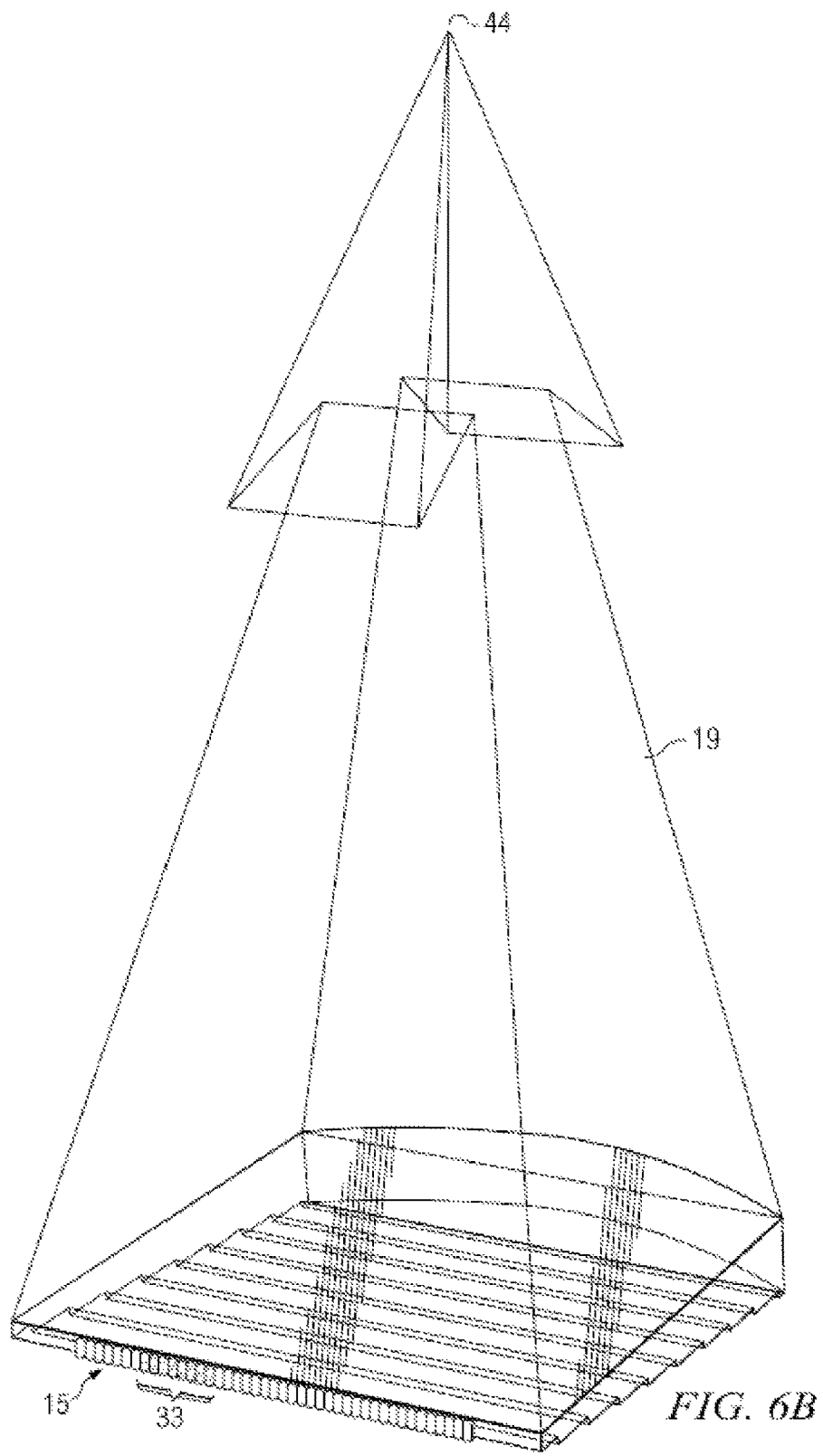
FIG. 6B is a schematic diagram illustrating another embodiment of the generation of a second viewing window in a time multiplexed directional display device in a second-time slot, in accordance with the present disclosure.
Figure 6C:
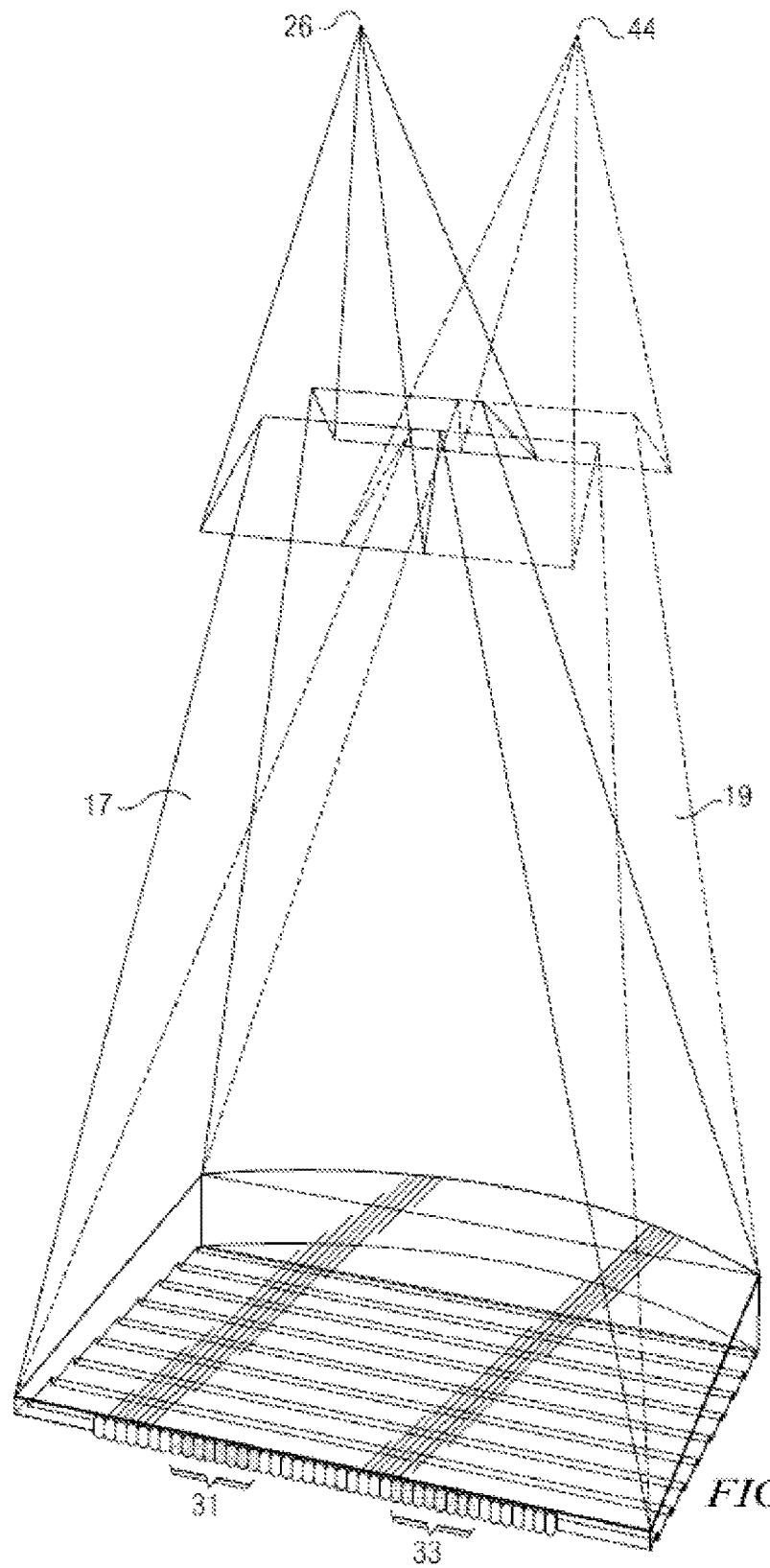
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15*a* to 15*n*, where n is an integer greater than one.

Figure 7:
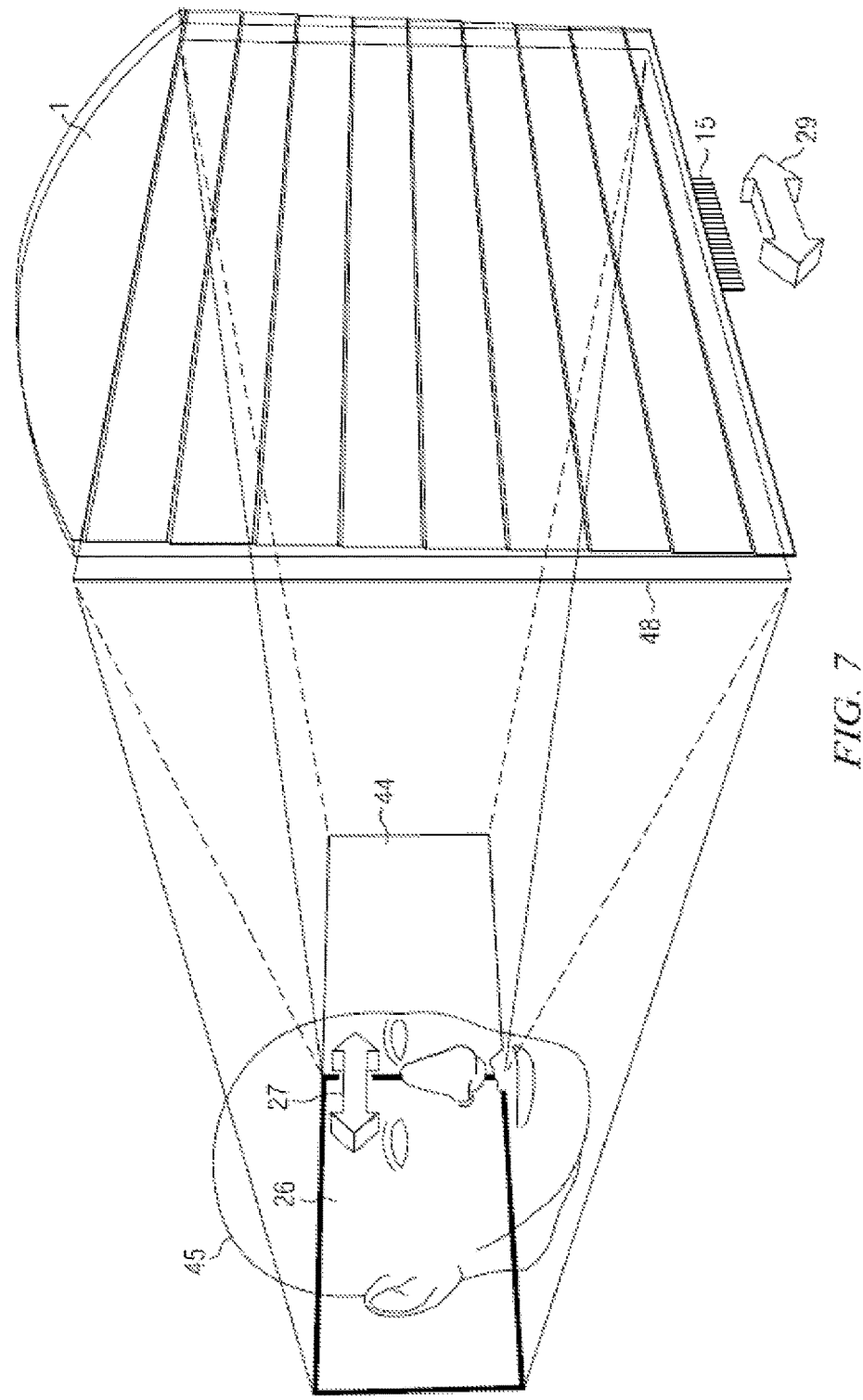
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15*a* to 15*n* along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again, similar operation can be achieved with all the directional backlights described herein.

Figure 8:
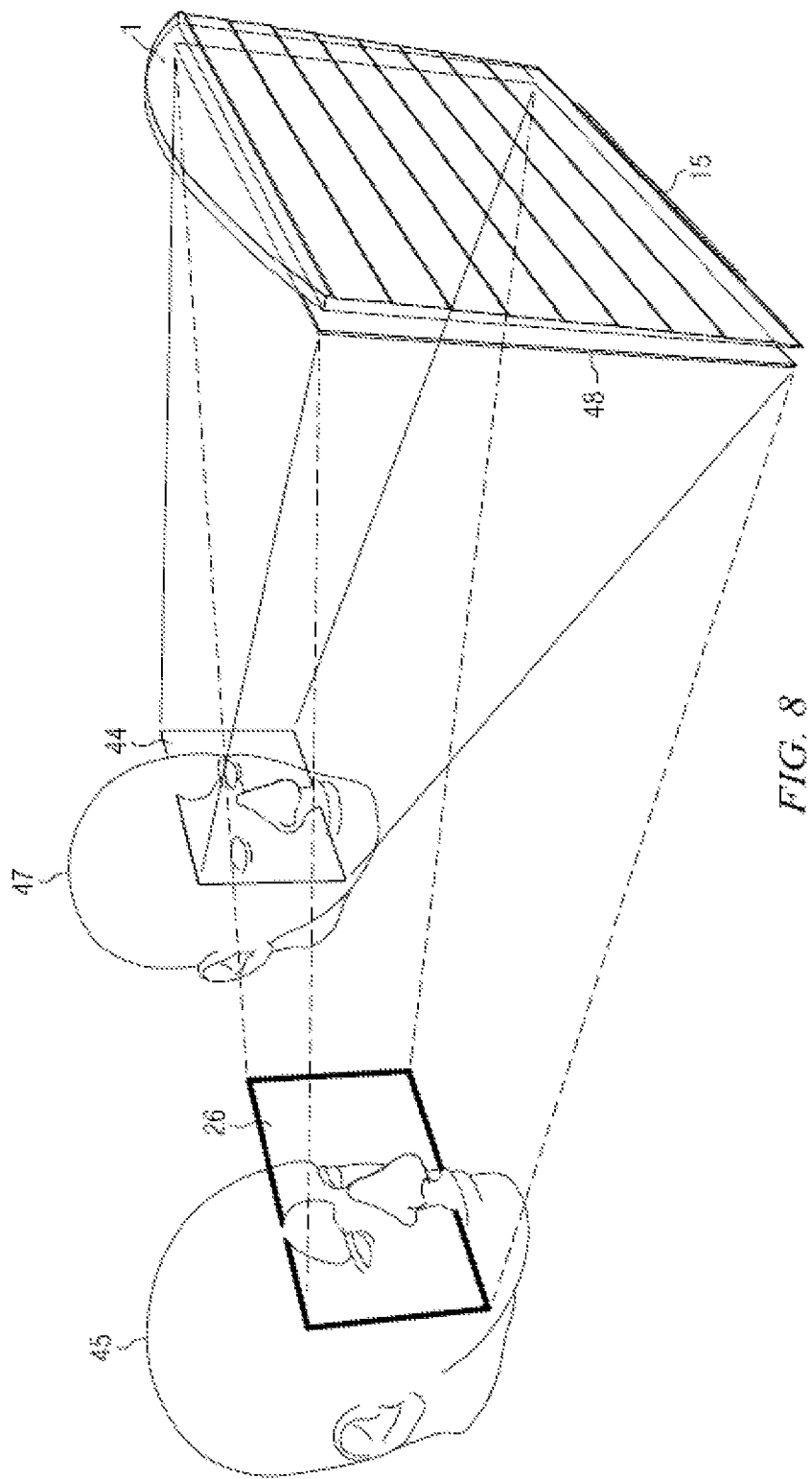
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
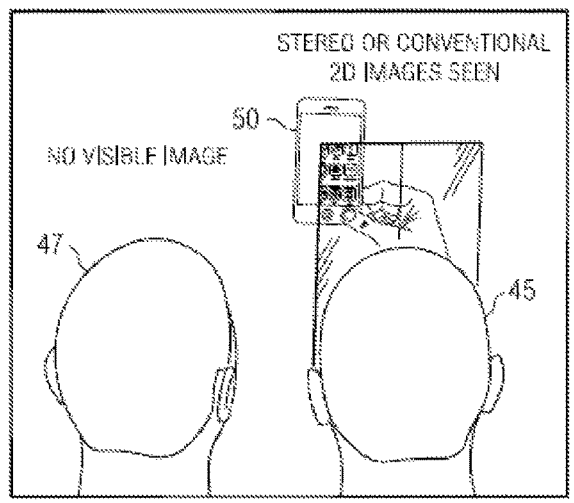
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus, second viewer 47 is prevented from viewing an image on device 50. Each of the embodiments of the present disclosure may advantageously provide autostereoscopic, dual image or privacy display functions.

Figure 10:
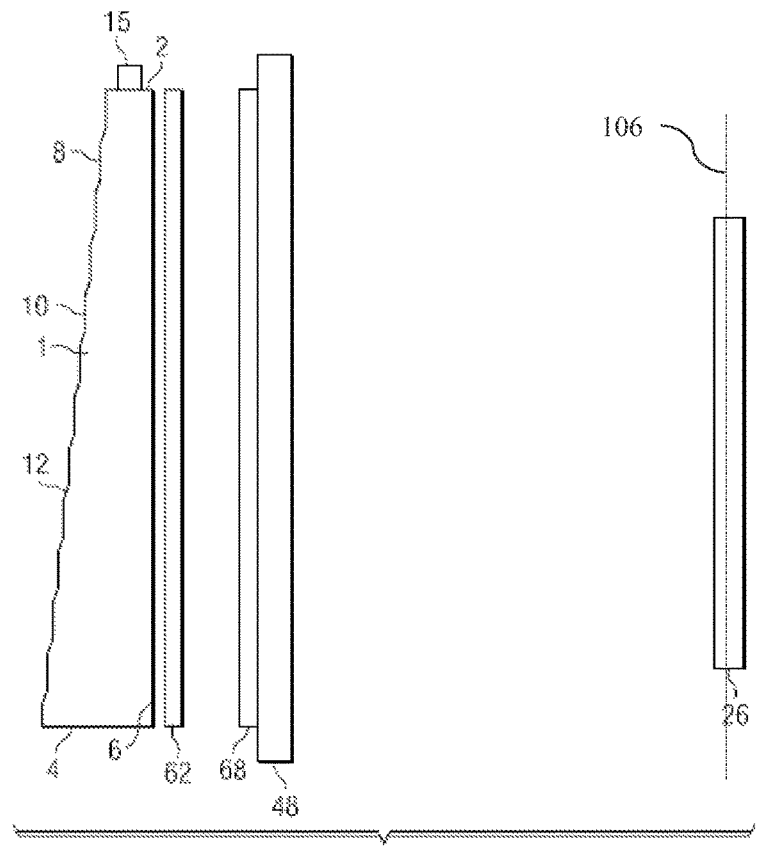
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively, the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally, in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light redirection films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11A:
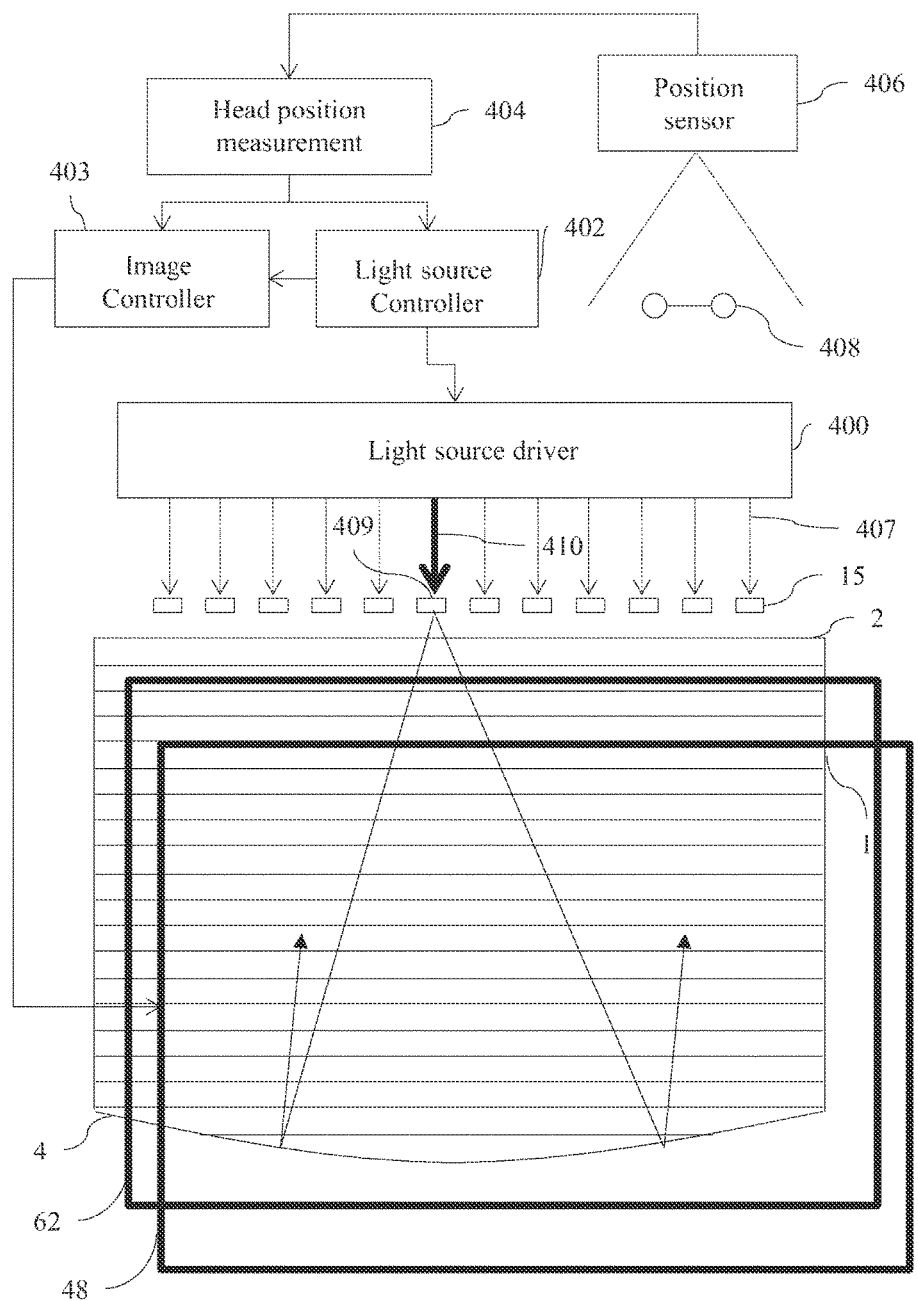
FIG. 11A is a schematic diagram illustrating a directional display apparatus comprising a directional display device and a control system, in accordance with the present disclosure.

FIG. 11A is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronisation with the illumination of the light sources of the array 15.

Figure 11B:
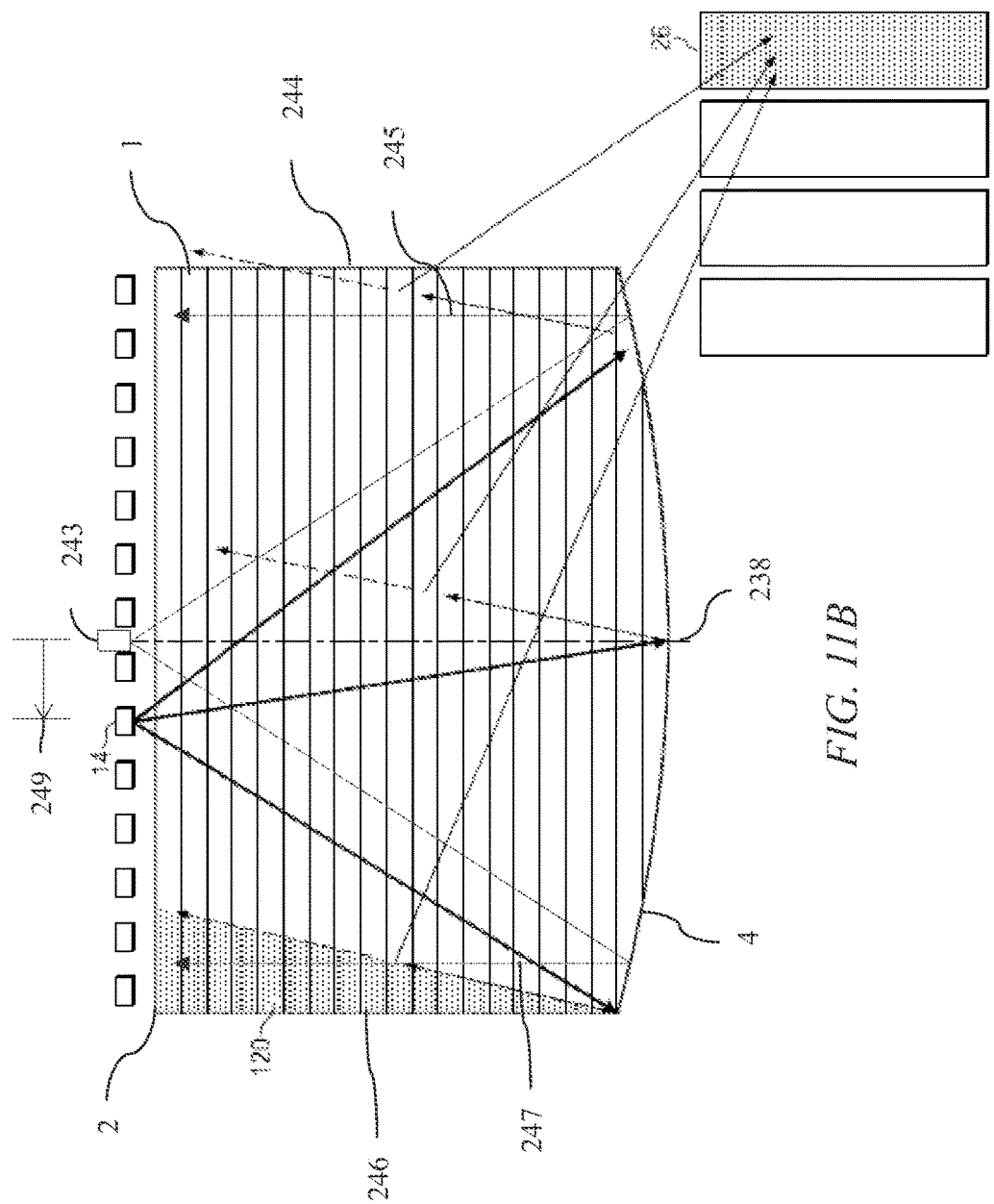
FIG. 11B is a schematic diagram illustrating a left side region of insufficient illumination for right sided off-axis viewing of a directional backlight, in accordance with the present disclosure.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. In FIG. 11B, the position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12A:
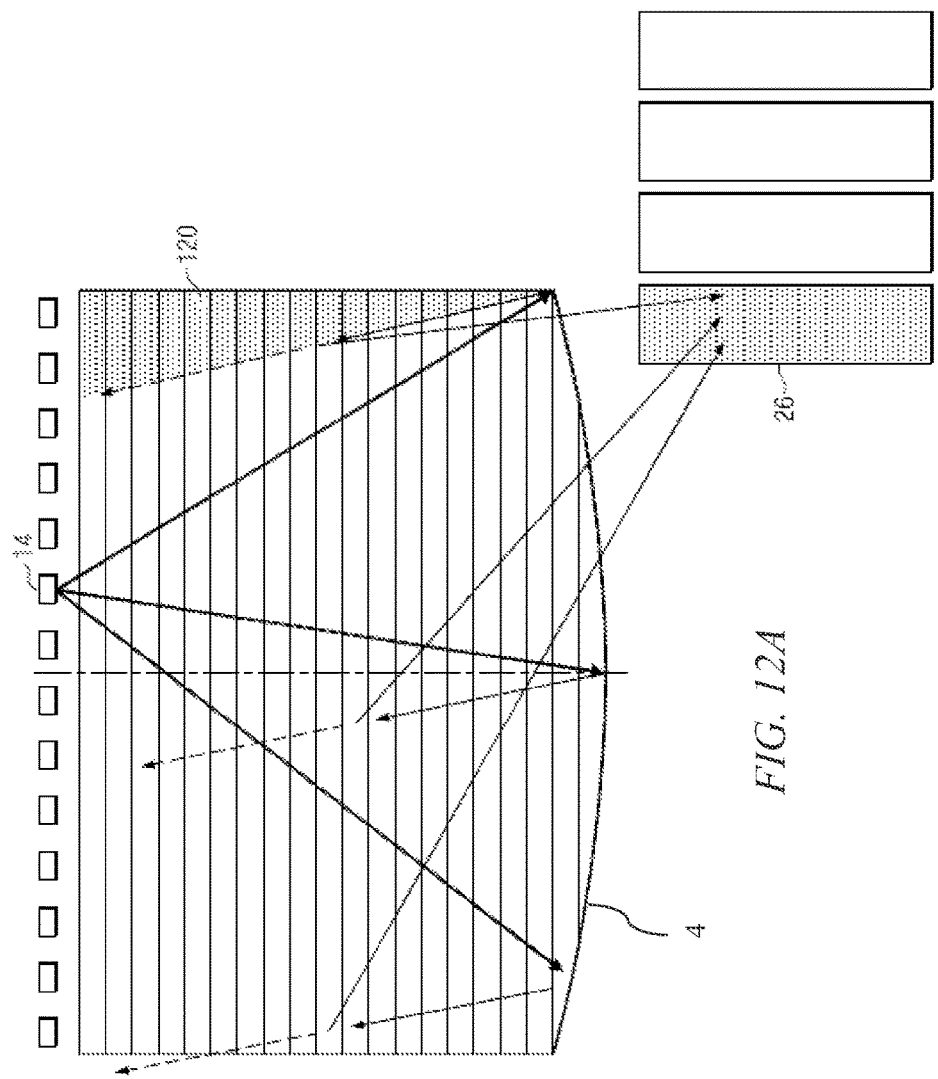
FIG. 12A is a schematic diagram illustrating a right-side region of insufficient illumination for left sided off-axis viewing of a directional backlight, in accordance with the present disclosure.

FIG. 11B is a schematic diagram illustrating a left side region of insufficient illumination for right sided off-axis viewing of a directional backlight. The region of insufficient illumination may be referred to herein as a void region or outer portion 120. FIG. 12A is a schematic diagram illustrating a right-side region of insufficient illumination for left sided off-axis viewing of a directional backlight. Further, FIGS. 11B and 12A illustrate the divergence, reflection/refraction and extraction of rays emanating from right and left positioned off-axis sources that propagate away from the guide to form corresponding off-axis viewing windows 26 for the optical valve. Thus a directional backlight comprises a waveguide 1 arranged as described above.

A light source 243 of the array 15 may be arranged on the optical axis 238 of a waveguide 1 that is arranged with a substantially rectangular output area (ignoring the sag of the side 4). Diverging light rays from the source 243 are converged by the reflective side 4 to produce a collimated beam within the waveguide with light rays 245, 247 that are parallel to the sides 244, 246 of the waveguide 1. Thus, for light source 243, light may be output from across the entire width of the waveguide 1.

Side 4 comprises a reflective end that converges the reflected light such that light sources that are offset from the optical axis of the waveguide fail to illuminate outer portions of the waveguide. The convergence of reflective end defines convergence applied to the incoming light beam from the respective light source. The convergence does not refer to the convergence of the light beam. Thus, the light beam that is reflected from the reflective end may be collimated or converging, but may also be diverging with a divergence that is lower than the divergence of the incident light beam on the reflective end. Thus, the reflective end converges the reflected light such that reflected light from light sources that are offset from the optical axis of the waveguide fails to illuminate outer portions 120 of the waveguide 1.

The effect of the redirection of these rays off the imaging mirror/lens in the two systems is to create void regions in outer portions 120 within the extraction region that is substantially void of light. When viewed from the left side of the illuminator, the triangular voided region may appear to the right, and the triangular voided region may increase in size the further off-axis the viewer moves. A similar triangular portion 120 may be seen symmetrically on the left to viewers situated to the right. To the viewer these portions 120 appear dim. In some cases, it may be practical to oversize the extraction region (comprising features 10,12) to avoid an overlap of these deficient portions with the active area of the display panel. It is more desirable to avoid light deficiency and any associated brightness non-uniformity over the entire extraction region for all viewing angles without oversizing and/or to achieve high angle performance compatible with conventional 2D illumination.

Figure 12B:
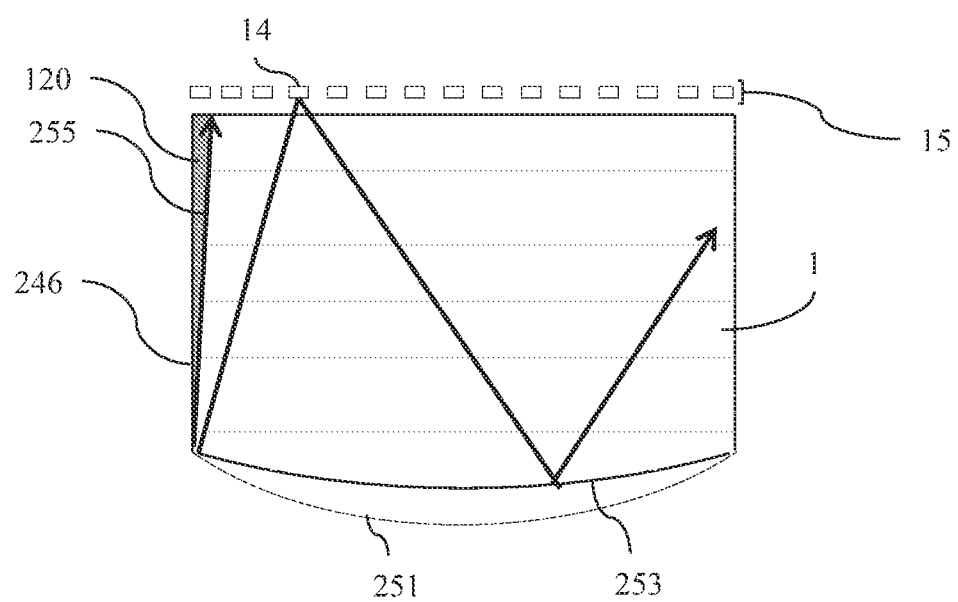
FIG. 12B is a schematic diagram illustrating the top view of a directional backlight arranged to reduce the visibility of the void outer portions, in accordance with the present disclosure.

FIG. 12B is a schematic diagram illustrating the top view of a directional backlight arranged to reduce the visibility of the void outer portions 120. Reflective end at side 4 for a collimated output may be provided by form 251. However, if the radius of curvature is increased to provide reflective end with form 253. Such a form for side 4 produces diverging light beam within the waveguide 1 after reflection, such that the light ray 255 next to side 246 is parallel or close to parallel to side 246. Thus, the size of the portion 120 is reduced or eliminated. Further the side 4 may be planar. Such an arrangement thus advantageously reduces the size of waveguide needed for a given display area and viewing angle. Disadvantageously, the optimum viewing window distance varies down the length of the waveguide 1. Such a variation in viewing window performance changes the imaging properties of the waveguide in the vertical direction so that cross talk, image flicker for a moving observer and brightness may vary in the vertical direction.

The following apparatuses are based on and incorporate the structures of FIGS. 1 to 10. Accordingly, except for the modifications and/or additional features which will now be described, the above description applies to the following apparatuses but for brevity will not be repeated.

Figure 12C:
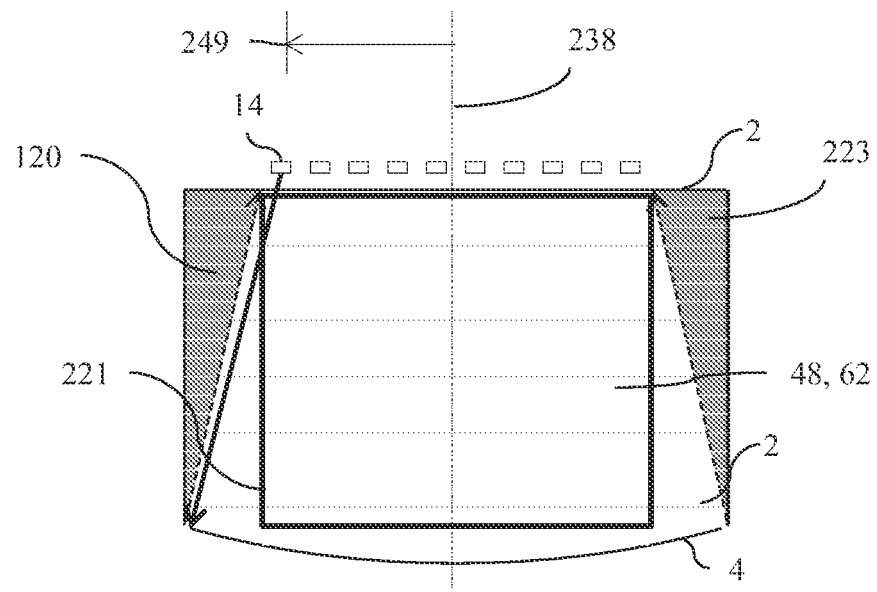
FIG. 12C is a schematic diagram illustrating a directional display device comprising a directional backlight and spatial light modulator of area outside the outer regions achieved by edge light sources, in accordance with the present disclosure.

FIG. 12C is a schematic diagram illustrating a directional display device comprising a directional backlight as described above and a spatial light modulator 48 that extends across only part of the area of the waveguide 1. Thus, the entirety of the SLM 48 is outside the outer portions 120, 223 not illuminated by the edge light source 14. Advantageously SLM 48 with border 221 does not receive light from the portion 120 when directed to viewing window 26 so that a viewer does not have visibility of portions 120, 223.

Figure 12D:
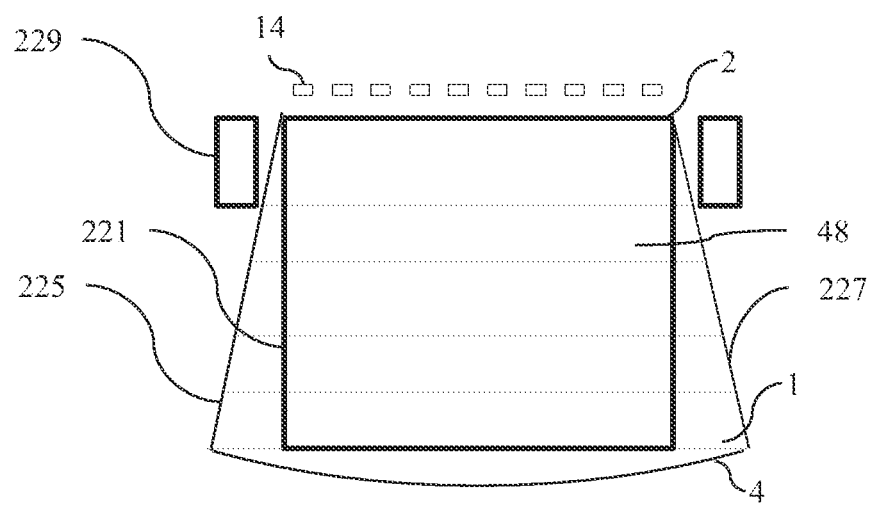
FIG. 12D is a schematic diagram illustrating a directional display device comprising a directional backlight and spatial light modulator of area outside the outer regions achieved by edge light sources wherein the directional backlight is tapered, in accordance with the present disclosure.

FIG. 12D is a schematic diagram illustrating a directional display device comprising a directional backlight as described above and a spatial light modulator 48 that extends across only part of the area of the waveguide 1. Thus, the entirety of the SLM 48 is outside the outer portions not illuminated by the edge light sources 14. In this example, the sides 225, 227 of the waveguide 1 extending between the input end 2 and the reflective end 4 are diverge from the input end 2 to the reflective end 4, such that the waveguide 1 is tapered. Thus, the width of the end 4 is greater than the width of the end 2. The SLM 48 has a border 221 that is inside the waveguide 1 area to avoid the visibility of the non-waveguide regions. Advantageously the size of the waveguide 1 is reduced so that additional components 229 such as electronic components may be introduced in the region that would otherwise be void.

The embodiments of FIGS. 12C and 12D increase the size of the directional display device and so it would be desirable to fill the portions in other ways, as will be described in the following embodiments.

Figure 13A:
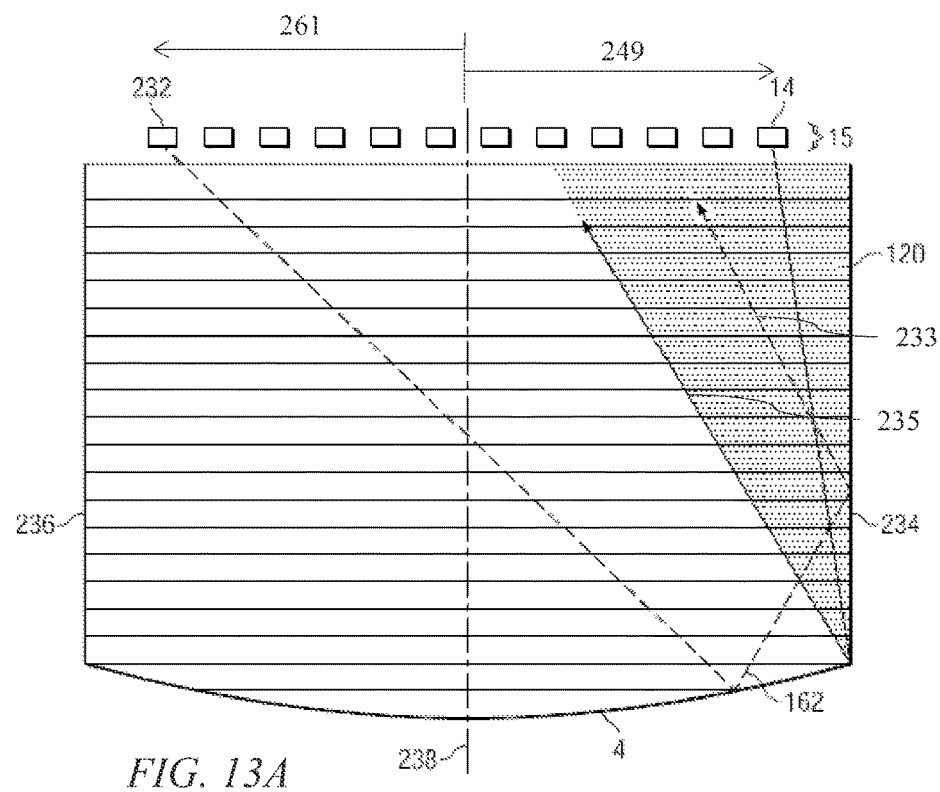
FIG. 13A is a schematic diagram illustrating a directional backlight comprising a waveguide that has polished transmitting edges to direct light into voided regions between pairs of sources while allowing unwanted rays to exit the guide, in accordance with the present disclosure.

FIG. 13A is a schematic diagram illustrating an imaging directional backlight including a waveguide 1 as described above, wherein the sides 234, 236 of the waveguide 1 extending between the input end 2 and the reflective end 4 and between the guiding surfaces, that are planar surfaces arranged to reflect light into voided portions 120 formed by source 14. Further, FIG. 13A is an embodiment in which the sides 234 and 236 of the waveguide 1 may be polished and optionally coated with a broadband anti-reflection (BBAR) coating. The sides 234 and 236 may have a reflective coating or may reflect by total internal reflection in which case they need not have a reflective coating. Portion 120, may be substantially devoid of returning illuminating rays originally from source 14 with position 249 (that may be referred to as the first light source) and reflected at end 4. In this example, the sides 234 and 236 are parallel to each other and the optical axis of the waveguide.

When light source 14 (referred to as the as a first light source is operated, light source 232 (referred to as the second light source) positioned on the opposite side of the optical axis 238 and with position 261 approximately equidistant as position 249 may be simultaneously operated to direct light into the same viewing window as the first light source 14. Light ray 162 undergoes reflection at the side 234 closest to the portion 120. The reflection may be achieved by a metallic coating on side 234 or preferably by total internal reflection. Thus, light ray 233 may be parallel to light ray 235 in the waveguide 1. Thus, light rays with the desired directionality may be arranged to propagate within the void region formed by the first source 14. In this manner, light rays from first light source 14 and second light source 232 are directed into the same viewing window and the waveguide area that directs light to the viewing window for a given off axis position is increased. Further the side 4 may be arranged to achieve collimated light within the waveguide, so that the imaging performance of the waveguide is substantially the same for all vertical positions. Advantageously for a given SLM 48 size, the width of the waveguide may be reduced, thus reducing bezel size and cost.

Thus source 14 and 232 may be arranged to be illuminated in synchronization with the timing of presentation of one image on an SLM. Thus sources 14 and 232 may be left eye illumination sources for example. Further, the sources of the array 15 may each comprise multiple light emitting elements and the gaps between the sources may be substantially reduced or removed.

Such a display may be arranged to achieve autostereoscopic illumination over a wide viewing angle with illumination over the most or all of the waveguide area.

Further, by turning on all sources of the illuminator array 15, substantially few to no voided portions 120 may then exist and wide angle 2D illumination may be achieved.

Figure 13B:
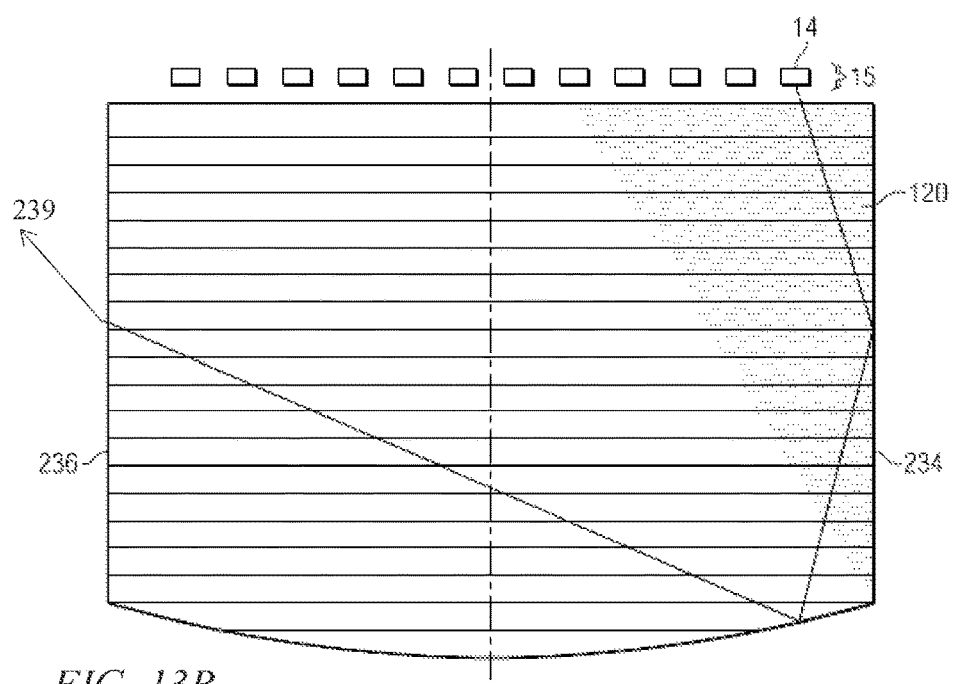
FIG. 13B is a schematic diagram illustrating a directional backlight comprising a waveguide that has polished transmitting edges to direct light into voided regions between pairs of sources while allowing unwanted rays to exit the guide, in accordance with the present disclosure.

FIG. 13B is a schematic diagram illustrating a folded imaging directional backlight including a waveguide 1 having polished transmitting edges to direct light substantially into voided regions between pairs of sources 14, 232 while allowing unwanted rays to exit the guide. Further, FIG. 13B shows that light rays 239 reflected from the side 234 from source 14 may exit the system through side 236, thus substantially avoiding any stray light contamination of the system and advantageously reducing image cross talk and display uniformity.

Figure 14A:
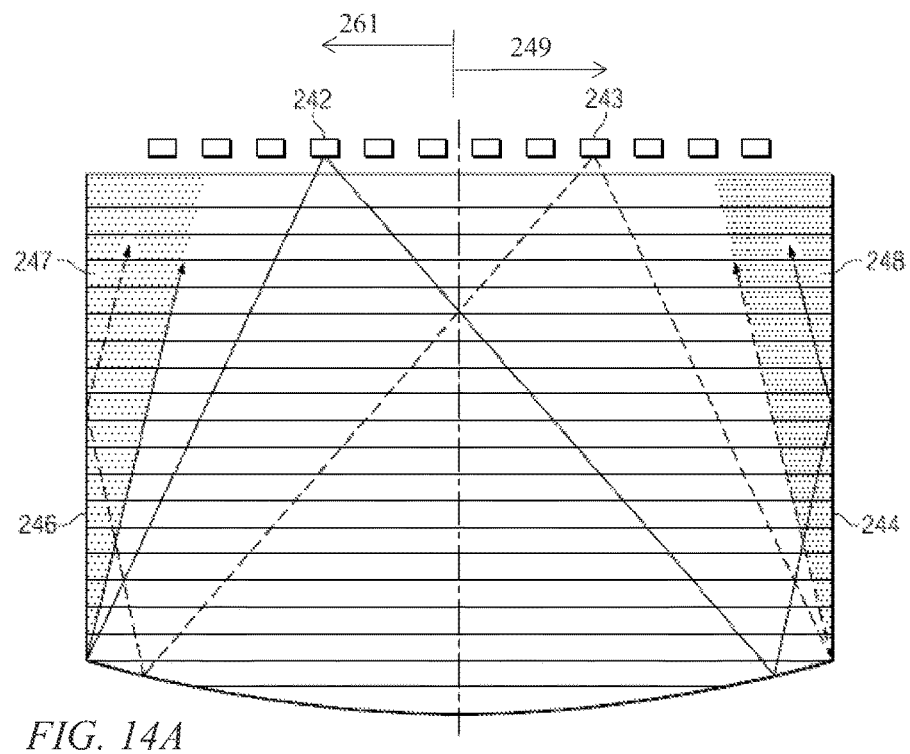
FIG. 14A is a schematic diagram illustrating operation of a directional backlight with paired sources for increased illumination areas, in accordance with the present disclosure.
Figure 14B:
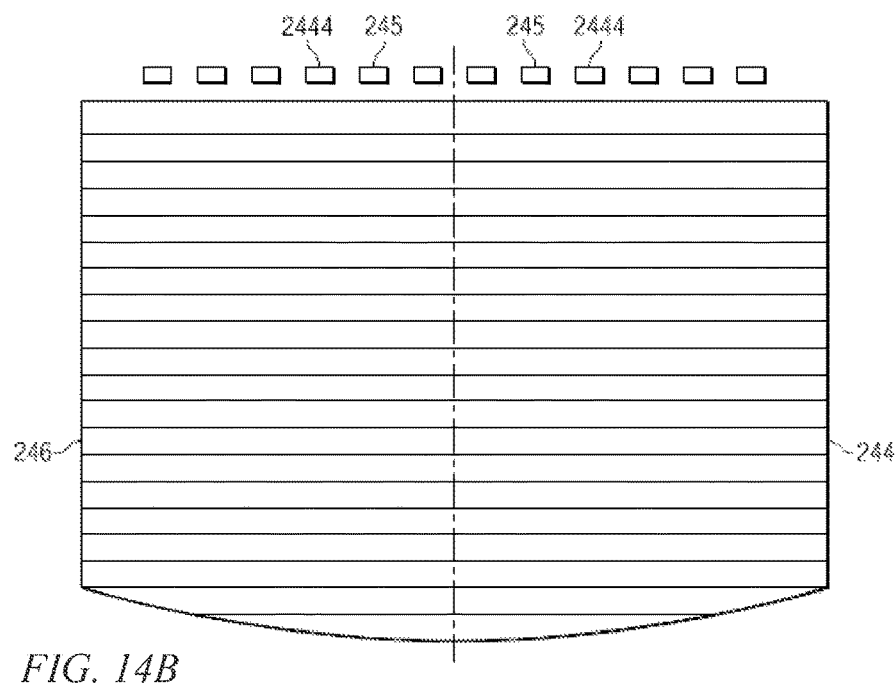
FIG. 14B is a schematic diagram illustrating operation of a directional backlight with paired sources for increased illumination areas, in accordance with the present disclosure.

FIG. 14A is a schematic diagram illustrating operation of a folded imaging directional backlight with paired sources for increased illumination areas. Further, FIG. 14A illustrates the symmetrical in-filling of voided regions 247 and 248 by source pairs 242 and 243. This paired operation may substantially prevent any voided regions and can be used for directional illumination applications such as an autostereoscopic display. For example, in FIG. 14B sources 2444 may be used to illuminate a left eye image and sources 245, a right eye image. FIG. 14B is a schematic diagram illustrating operation of a directional backlight with paired sources for increased illumination area on the waveguide 1. Furthermore, this arrangement may be achieved for most to all situations in which the source pairs 242, 243 do not substantially overlap.

Figure 14C:
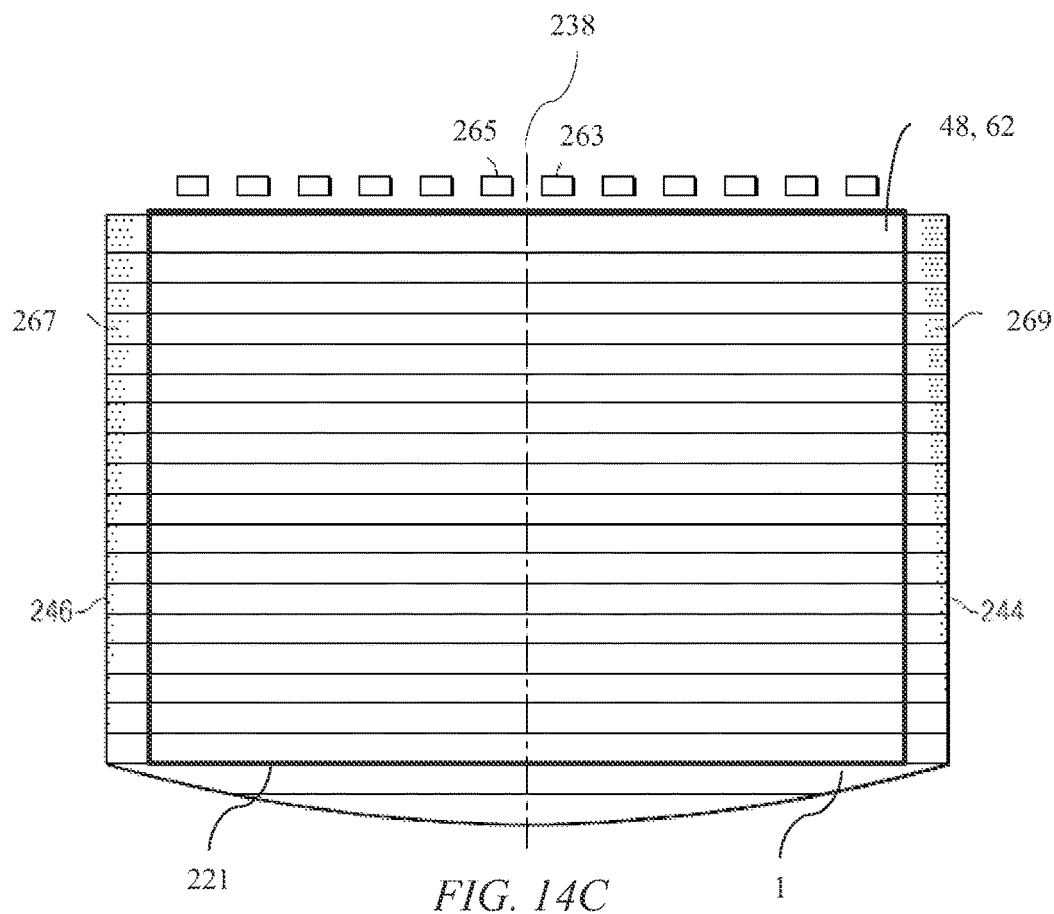
FIG. 14C is a schematic diagram illustrating operation of a directional backlight with paired sources for increased illumination areas, in accordance with the present disclosure.

FIG. 14C is a schematic diagram illustrating operation of a directional backlight for on-axis viewing. In the central viewing position the respective left and right eye light sources 263, 265 are typically arranged either side of the optical axis 238. It would be desirable to illuminate source 263 to illuminate portion 267 and illuminate source 265 to illuminate portion 269. However, such sources are in the opposite phase when acting as the first source to the second source, so would create cross talk in a 3D mode. Thus, such an arrangement advantageously achieves 2D infilling of outer portions 267, 269 but some void regions remain in 3D operation. Therefore, it may be desirable to slightly oversize the waveguide 1 in comparison to the SLM 48 to avoid visibility of the portions 267, 269 so that the spatial light modulator 48 extends across only part of the area of the waveguide 1 as described above.

Thus, there may be substantially total overlap which may cause single sources 2464, 247 to be used and void regions 246 to exist. Paired operation at high angle, can however, increase stereo viewing angle without introducing void regions larger than those seen for near normal viewing.

Figure 15:
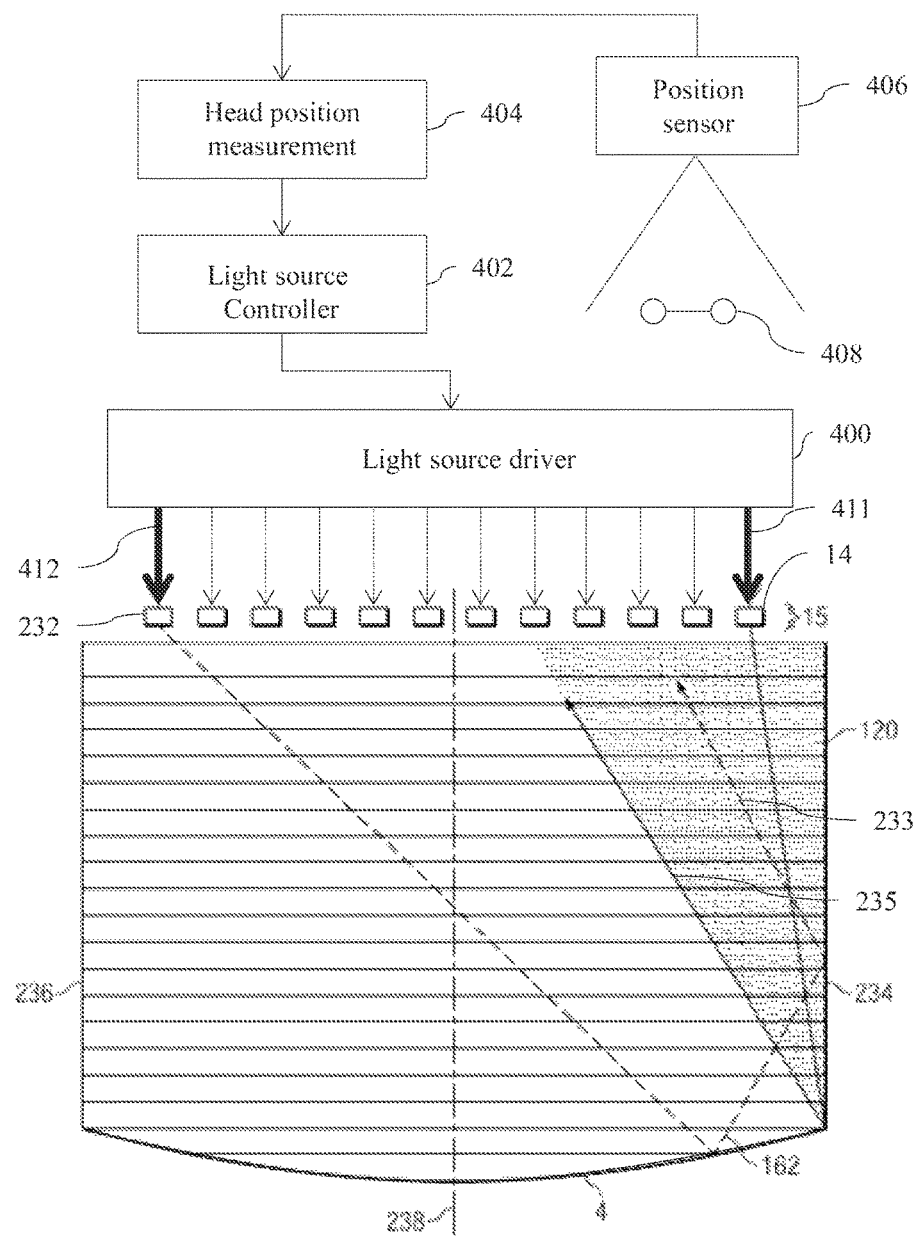
FIG. 15 is a schematic diagram illustrating an embodiment comprising a control system, a light source array and a directional waveguide comprising reflective sides arranged to achieve filling of void outer regions formed by a first light source by illuminating a second light source, in accordance with the present disclosure.

The apparatus may be operated by the control system shown in FIG. 11A as described above. FIG. 15 is a schematic diagram illustrating the operation of the control system to further provide driving of the second light source 232 in cooperation with the first light source 14.

FIG. 15 is a schematic diagram illustrating a directional display apparatus including a control system 406, 404, 402, 400, and a directional display device including a light source array 15 and a directional waveguide 1 comprising reflective sides 234, 236 arranged to achieve filling of void outer portions 120 formed by a first light source 14 by illuminating a second light source 232. Thus, drive line 411 is driven to illuminate light source 14 that creates void outer portion 120. Portion 120 may receive illumination from light source 232 driven by line 412. Light ray 233 from source 234 is directed towards the converging mirror at side 4 and reflected towards side 234 at which surface it undergoes a reflection and is directed parallel to ray 235. Thus, light rays with the same output directionality (and thus directed to the same viewing window) can be achieved in the portion 120 created by source 14. Advantageously, the waveguide 1 can be seen to produce light across its entire area for an observer in the respective viewing window 26. The size of the illuminated area is thus increased and waveguide 1 size for a given SLM 48 size may be reduced which reduces bezel size and device cost. Further illumination uniformity is increased and viewing freedom may be extended.

Thus a directional backlight comprises a waveguide 1 extending between an input end 2 for receiving input light and a reflective side 4 for reflecting the input light back through the waveguide, the waveguide 1 having first and second, opposed guide surfaces (comprising side 6 and features 10, 12 respectively) extending between the input end 2 and the reflective side 4 for guiding light forwards and back along the waveguide 1, wherein the second guide surface has a plurality of light extraction features 12 facing the reflective end 4 and arranged to reflect the light guided back through the waveguide 1 from the reflective side 4 from different input positions across the input end 2 in different directions through the first guide surface 6 that are dependent on the input position; an array of light sources 15 at different input positions across the input end 2 of the waveguide 1; and a control system arranged to selectively operate the light sources 14, 232 to direct light into selectable viewing windows 26, wherein the reflective end 4 converges the reflected light such that reflected light from light sources 14 that are offset from the optical axis of the waveguide fails to illuminate outer portions 120 of the waveguide 1, the waveguide further comprises sides 234, 236, extending between the input end 2 and the reflective end 4 and between the guiding surfaces, that are planar surfaces arranged to reflect light from the light sources 232, and the control system 406, 404, 402, 400 being arranged, on selective operation of a first light source 14 to direct light into a viewing window 26, to simultaneously operate a second light source 232 that directs light reflected by the reflective end 4 and then by a side 234 of the waveguide 1 into the outer portion 120 of the waveguide 1 that fails to be illuminated by the first light source 14.

The second light source 232 may selected to direct light into the same viewing window 26 as the first light source 14. The sides 234, 236 of the waveguide 1 may be parallel. The sides 234, 236 of the waveguide 1 may be arranged to reflect light from the light sources by total internal reflection. The sides 234, 236 of the waveguide 1 may have a reflective coating.

Further a display apparatus may comprise a directional backlight apparatus and a transmissive spatial light modulator 48 extending across the directional backlight apparatus for modulating the light output therefrom. The spatial light modulator 48 may extends across the first guide surface 6 of the waveguide 1. The display apparatus may be an autostereoscopic display apparatus, wherein the control system is arranged to control the spatial light modulator 48 to display temporally multiplexed left and right eye images and synchronously to operate the light sources to direct light into viewing windows 26 in positions corresponding to the left and right eyes of an observer 408. The display may further comprise a sensor system arranged to detect the position of an observer 408 relative to the display device, the control system to direct the displayed images into viewing windows 26 in positions corresponding to the left and right eyes of the observer 408, in dependence on the detected position of the observer.

Embodiments wherein the sides 244, 246 of the waveguide 1 are non-parallel can advantageously achieve desirable differences in the relative positions 249, 261 of the first light source 14 and second light source 232

Figure 16A:
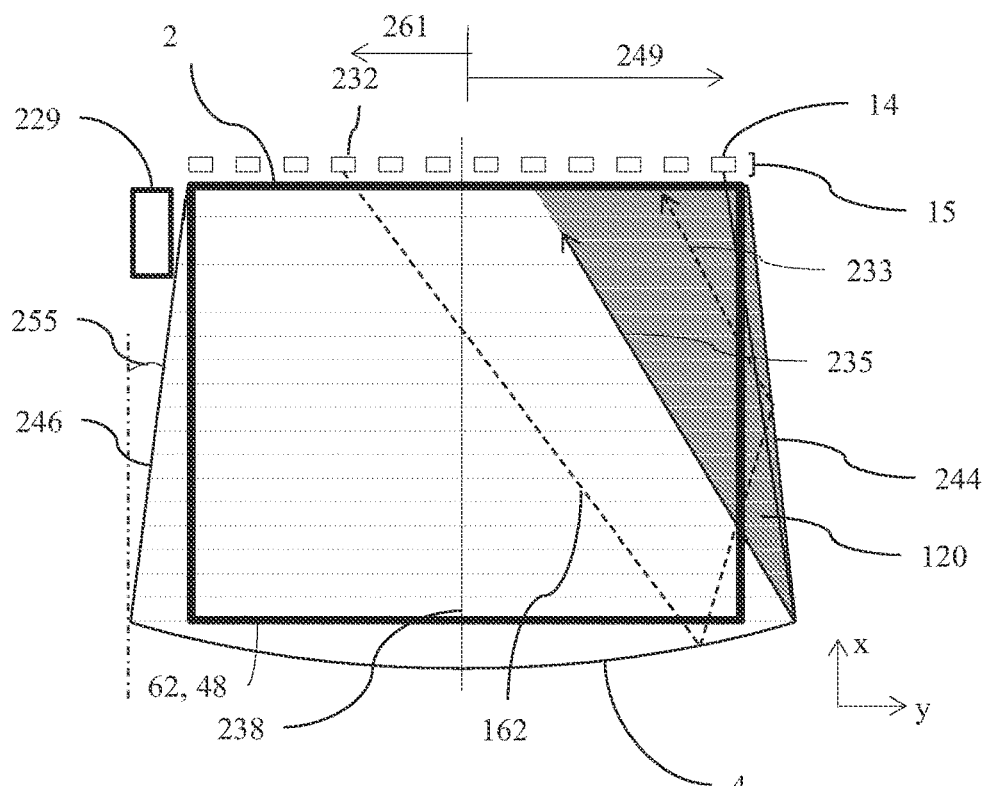
FIG. 16A is a schematic diagram illustrating a top view of a directional display device comprising a stepped waveguide, in accordance with the present disclosure.

FIG. 16A is a schematic diagram illustrating a top view of a directional display device comprising a stepped waveguide 1 wherein the sides 244, 246 of the waveguide diverge with an angle 255 from the input end 2 to the reflective end 4. Thus position 261 is a smaller distance from the optical axis 238 than position 249. Light rays 162 from second source 232 are thus directed after reflection at side 244 to be within the portion 120 such that reflected ray 233 is parallel to the reflected ray 235 from the first source 14 and is directed to the same viewing window. Advantageously, the waveguide has a taper region so that electronics or other components 229 can be positioned in the taper region, reducing usage by the waveguide 1 of areas outside the display bezel. By control of position of source 232 with respect to axis 238, the void portions 120 can be filled. Further, as the source 232 is closer to the optical axis 238, the brightness output of the illumination from second source 232 can be more closely matched to the brightness of the illumination from first source 14 as will be described below.

Figure 16B:
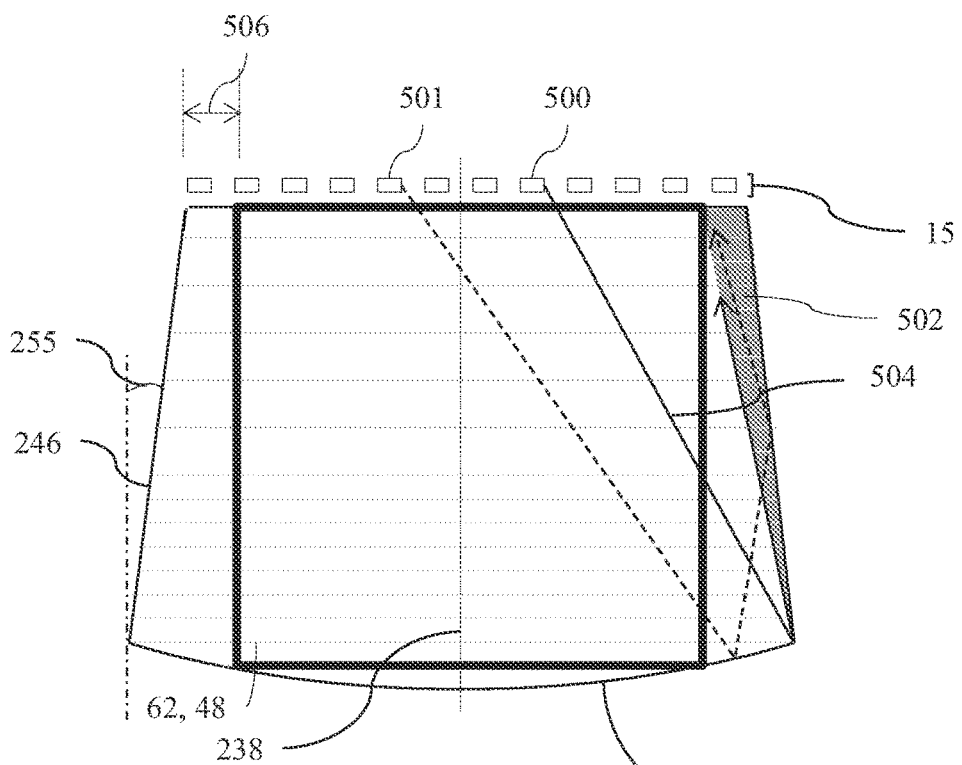
FIG. 16B is a schematic diagram illustrating a top view of a directional display device comprising a stepped waveguide, in accordance with the present disclosure.

FIG. 16B is a schematic diagram illustrating a top view of a directional display device comprising a stepped waveguide 1 wherein the sides 244, 246 of the waveguide diverge with an angle 255 from the input end 2 to the reflective end 4. For on-axis viewing positions, it may not be possible to provide compensating sources such as source 232 in FIG. 16A without generating image cross talk. For example, the compensating source for a right eye viewing window may be the same source to achieve the respective left eye viewing window. Thus, the compensation will create undesirable image cross talk. Such sources may be termed non-compensable sources. Light rays 504 from the edge of non-compensable source 500 are thus directed by side 4 to form void region 502. Such void region cannot be filled by a compensating light sources without said source creating image cross talk, such as would be the case if source 501 were illuminated. Thus, the stepped waveguide 1 must have a minimum width that is oversized by a distance 506 at each side in comparison to the width of the spatial light modulator 48.

Thus, if the reflector at the end 4 is arranged to provide collimated light from a single light source of the array 15, then the width of the input side 2 may be oversized by distance 506 so that light sources that are off-axis by a small distance are arranged to fill the aperture of the spatial light modulator 48. The small distance may for example be the distance from the axis 238 that provides viewing windows in the window plane 106 that are offset by 65 mm to 90 mm. Advantageously left eye void regions may avoid illumination by compensating light sources that are in the right phase and vice versa.

Advantageously, oversizing the stepped waveguide 1 can achieve a uniform illumination for viewing positions close to the optical axis of the display.

Figure 16C:
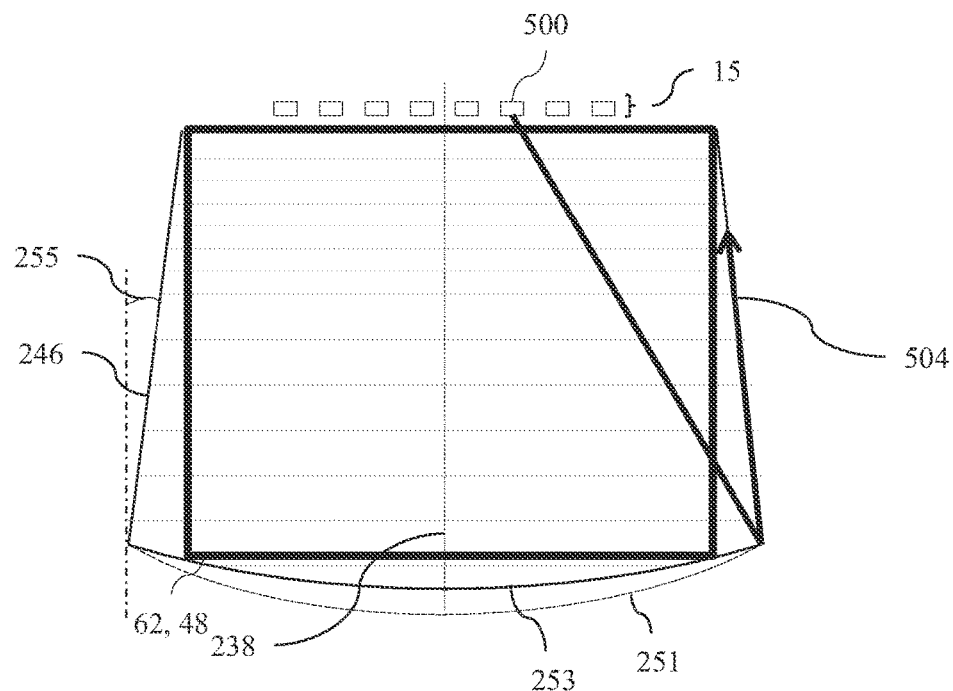
FIG. 16C is a schematic diagram illustrating a top view of a directional display device comprising a non-collimating reflecting end, in accordance with the present disclosure.

FIG. 16C is a schematic diagram illustrating a top view of a directional display device comprising a non-collimating reflecting end 4. In a similar manner to that described for FIG. 12B, the form 251 (comprising at least a radius and conic constant) of the end 4 that provides collimated output from source 500 after reflection is replaced by a form 253 (comprising a radius that is larger than the radius of form 251) that provides diverging output from source 500 after reflection of light rays 504. Further angle 255 for the sides 246 is provided to achieve filling of voids for light sources that are more off-axis than source 500. In comparison to FIG. 12B, the light source array is not required to fill the entire width of the input side 2 to achieve wide angle viewing characteristics. Advantageously void regions 502 of FIG. 16B are eliminated and the oversize distance 506 is reduced or removed. Further, light source array 15 has a reduced cost in comparison to the parallel sided arrangement of FIG. 12B.

Figure 16D:
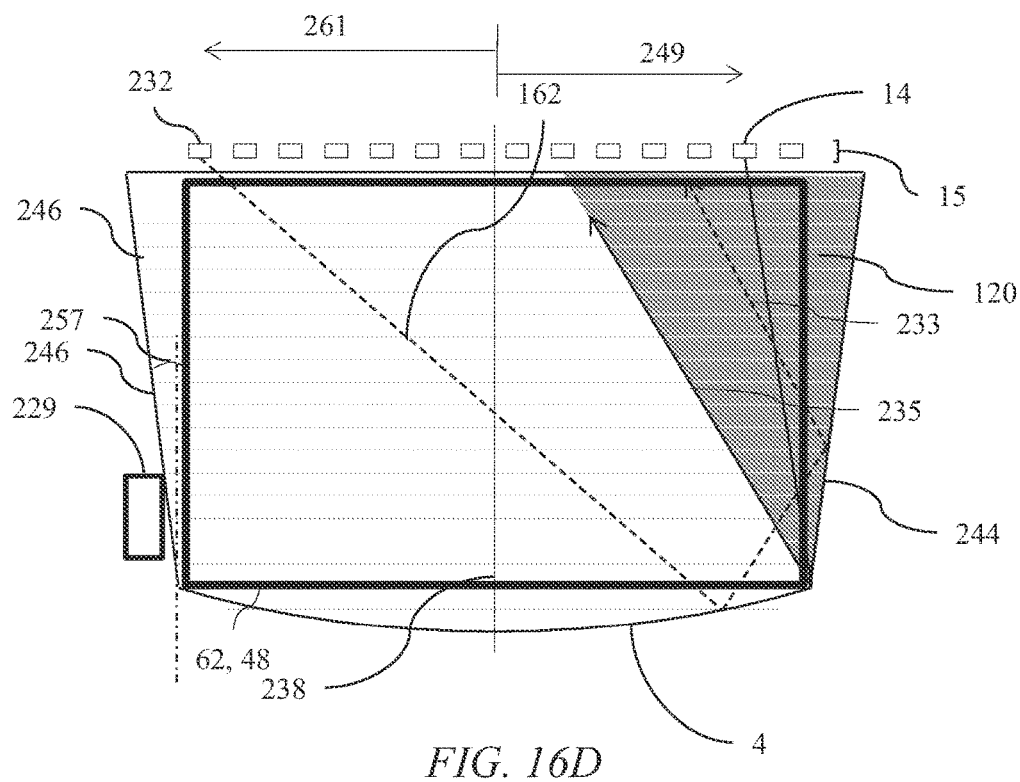
FIG. 16D is a schematic diagram illustrating a top view of a directional display device comprising a stepped waveguide, in accordance with the present disclosure.

FIG. 16D is a schematic diagram illustrating a top view of a directional display device comprising a tapered waveguide 1 wherein the sides 244, 246 of the waveguide converge with an angle 257 from the input end 2 to the reflective end 4.

Thus position 261 is a larger distance from the optical axis 238 than position 249. Light rays 162 from second source 232 are thus directed after reflection at side 244 to be within the portion 120 such that reflected ray 233 is parallel to the reflected ray 235 from the first source 14 and is directed to the same viewing window. Advantageously, the waveguide 1 has a taper region so that electronics or other components 229 can be positioned in the taper region, reducing usage by the waveguide 1 of areas outside the display bezel. By control of position of source 232 with respect to axis 238, the void portions 120 can be filled. Further, as the source 232 is further from the optical axis 238, the size of the zones 267, 269 as shown in FIG. 14C for viewing positions that are close to the optical axis are reduced, as the second light source 232 can be switched on at smaller off-axis viewing positions without creating undesirable image cross talk. Advantageously the bezel size and waveguide cost can be reduced.

Figure 16E:
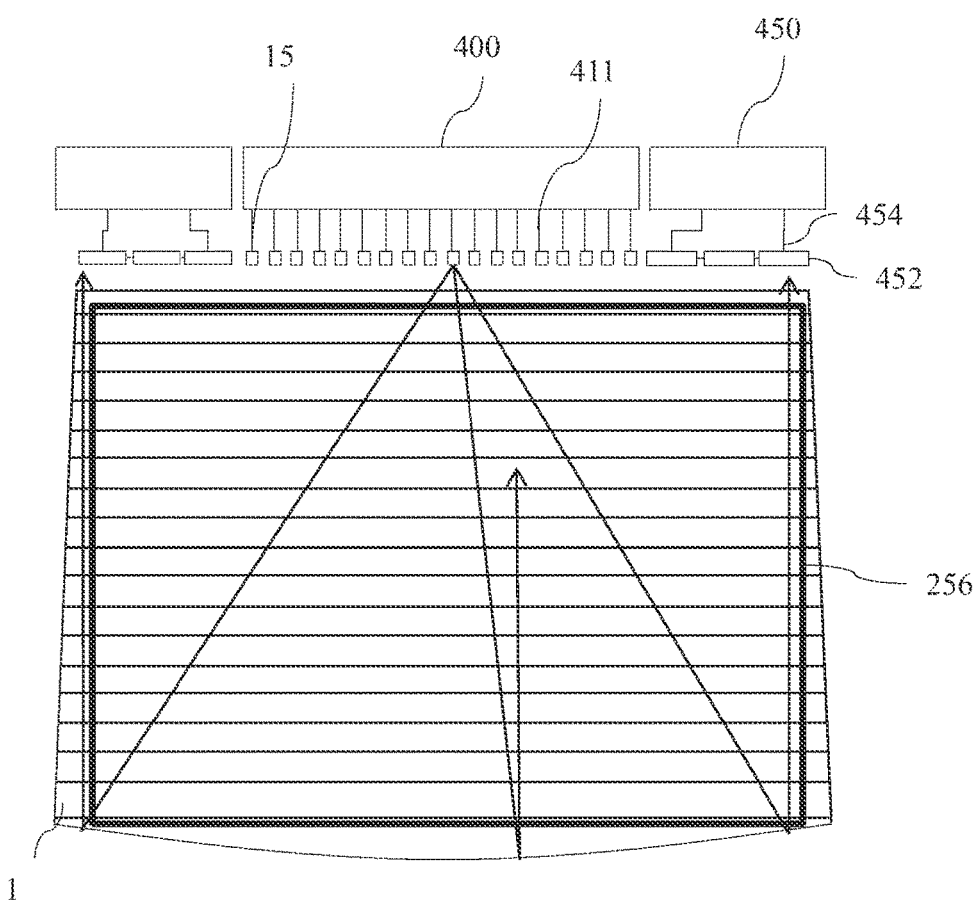
FIG. 16E is a schematic illustration of the front view of a directional display apparatus comprising outer strings of light sources, in accordance with the present disclosure.

FIG. 16E is a schematic illustration of the front view of a directional display apparatus comprising outer strings of light sources. LED driver 400 is arranged to independently drive array 15 of light sources as described above. It would be desirable to reduce the cost of LED driving for regions at the edge of the viewing freedom, for example in the 2D regions. Further light sources 452 that may be driven by drive lines 454 and may be arranged as LED strings for example may be arranged at the edges of the array 15, with multiple LEDs driven by a single driver 450. Fewer light sources 452 may be used per unit length of input aperture compared to light sources of array 15. Advantageously, wide angle operation may be achieved, for example in cooperation with diffuser 256, and light source cost and driver cost may be reduced in comparison to light sources of array 15 that are independently driven.

Figure 17A:
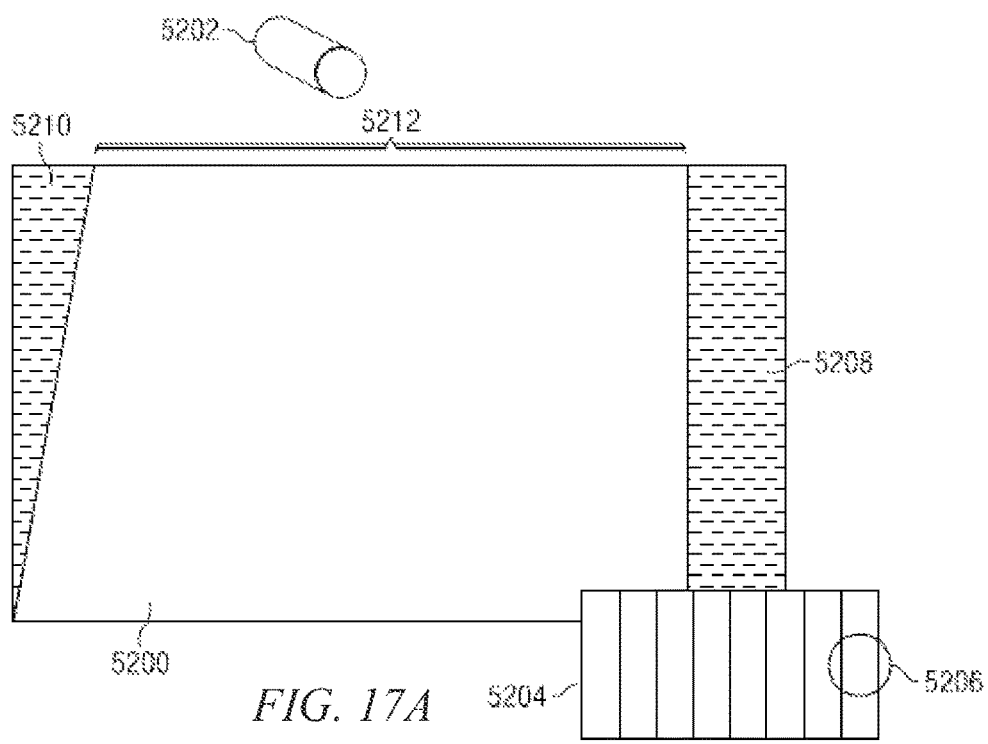
FIG. 17A is a schematic illustration of two artefacts which may appear at the edge of the viewing region of a directional display apparatus on one side, in accordance with the present disclosure.

FIG. 17A shows an embodiment of a tracked directional display apparatus in which a camera 5202 and observer position sensing system (not shown) cooperate with light emitting element illuminator array 15 to produce a sub-window array 5204. An observer may be positioned so that right eye 5206 position is arranged near the end of the sub-window array 5204. The illumination from light emitting element illuminator array 15 may demonstrate two artefacts when seen on the surface of optical valve 5200: a dark triangle portion 5210 (primarily due to imaging of the side 4 of the optical valve when directing light to an off-axis position); and a dark band artefact 5208 (primarily due to imaging of the light emitting element arrays when observed from a longitudinal position away from the window plane). The dark band artefact 5208 may not be visible at the window plane and the portion 5210 may be seen at and away from the window plane. Advantageously the visibility of these artefacts which primarily depend on the observer's position may be detected by one or both of the camera 5202 and observer position sensing tracking/system. After detection, appropriate action may be taken as described herein to minimize the visibility of the artefacts 5208, 5210.

Figure 17B:
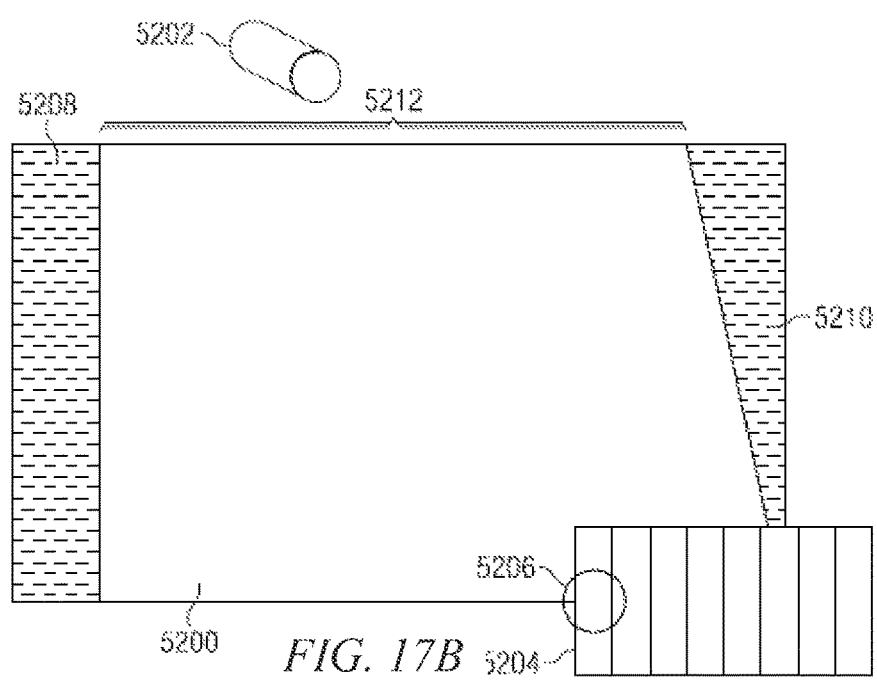
FIG. 17B is a schematic illustration of two artefacts which may appear at the edge of the viewing region of the directional display apparatus on the opposite side to FIG. 17A, in accordance with the present disclosure.

FIG. 17B illustrates schematically an embodiment of a tracked directional display apparatus when the observer's eye position 5206 is at the other side of the window array 5204 and the portion 5210 and black bar artefact 5208 are reversed with respect to FIG. 17A.

Figure 17C:
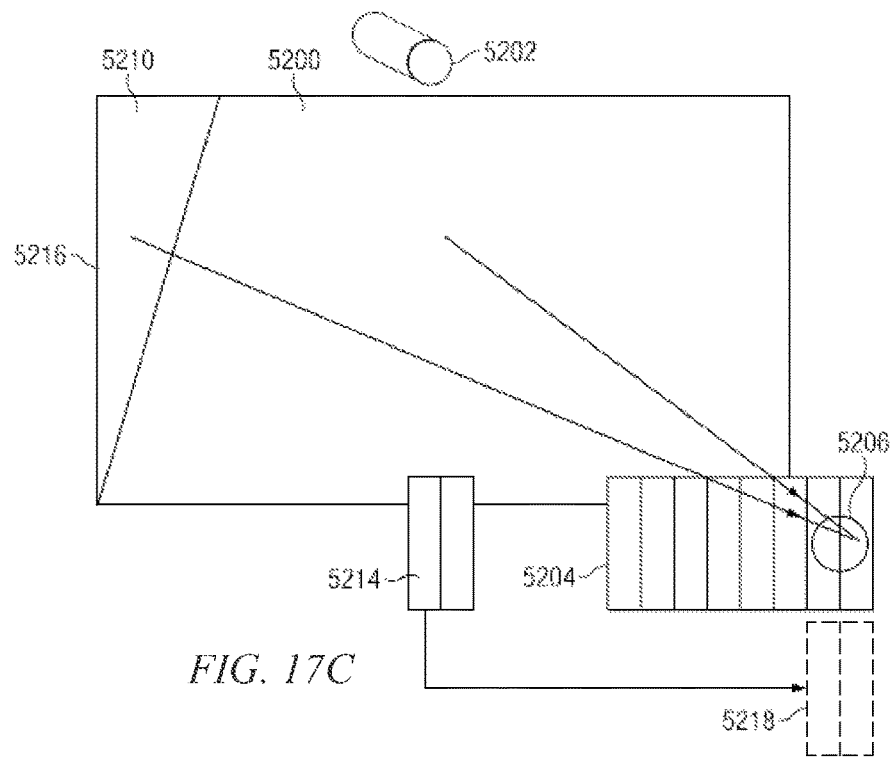
FIG. 17C is a schematic illustration of one method for compensating the appearance of the void portion of a directional display apparatus, in accordance with the present disclosure.

FIG. 17C illustrates schematically an embodiment of a directional display apparatus in which the appearance of the black portion 5210 may be compensated by turning on additional sub-windows 5214 by addressing respective light emitting elements 14, 232 of the illuminator array 15. For an observer with right eye 5206 position at the right-hand side of sub-window array 5204, the respective sub-windows 5214 are reflected by the edge 5216 and appear substantially overlayed at position 5218. Such subwindows 5214 thus illuminate the portion 5210. Advantageously the appearance of the dark triangles 5210 may be compensated or "filled in" by sub-window illuminators 5214, which may be primarily or only seen by the observer reflected at position 5218. Advantageously the optical losses that result from the different path travelled following reflection at 5216, when compared with direct travel for the rest of sub-window array 5204, may be primarily compensated for by adjusting the intensity of sub windows 5214 or 5204. Further, aberration differences such as due to coma may be compensated for by adjustment of the respective subwindow 5214 positions.

Figure 17D:
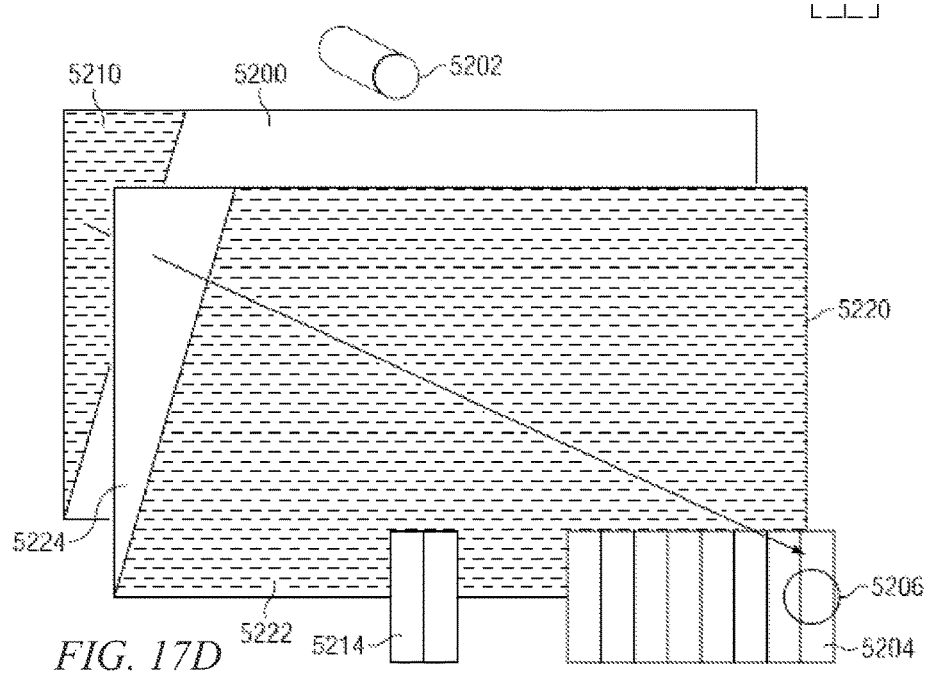
FIG. 17D is a schematic illustration of a further method for compensating the appearance of the void portion of a directional display apparatus, in accordance with the present disclosure.

FIG. 17D illustrates schematically a further embodiment of a directional display apparatus in which the portion 5210 may be compensated by adjusting the illumination of the SLM 5220 in the respective triangle region. For a known observer eye 5206 position, the position and the shape of the portion 5210 can be determined, and thus the image may be updated in correspondence. The difference in intensity in the triangle 5210 compared to the rest of illumination 5200 may be compensated by adjusting the transmission of the SLM 5220. Specifically, the image data for the SLM 5220 in region 5222 may be slightly attenuated compared to region 5224 so that the effect is to match the intensity seen across the whole SLM 5220. The compensation methods described in FIGS. 17C and 17D may be used separately or in combination to improve the viewing region of the display system. Advantageously, the viewing freedom of the observer can be extended by compensation for the portion 5210.

Figure 17E:
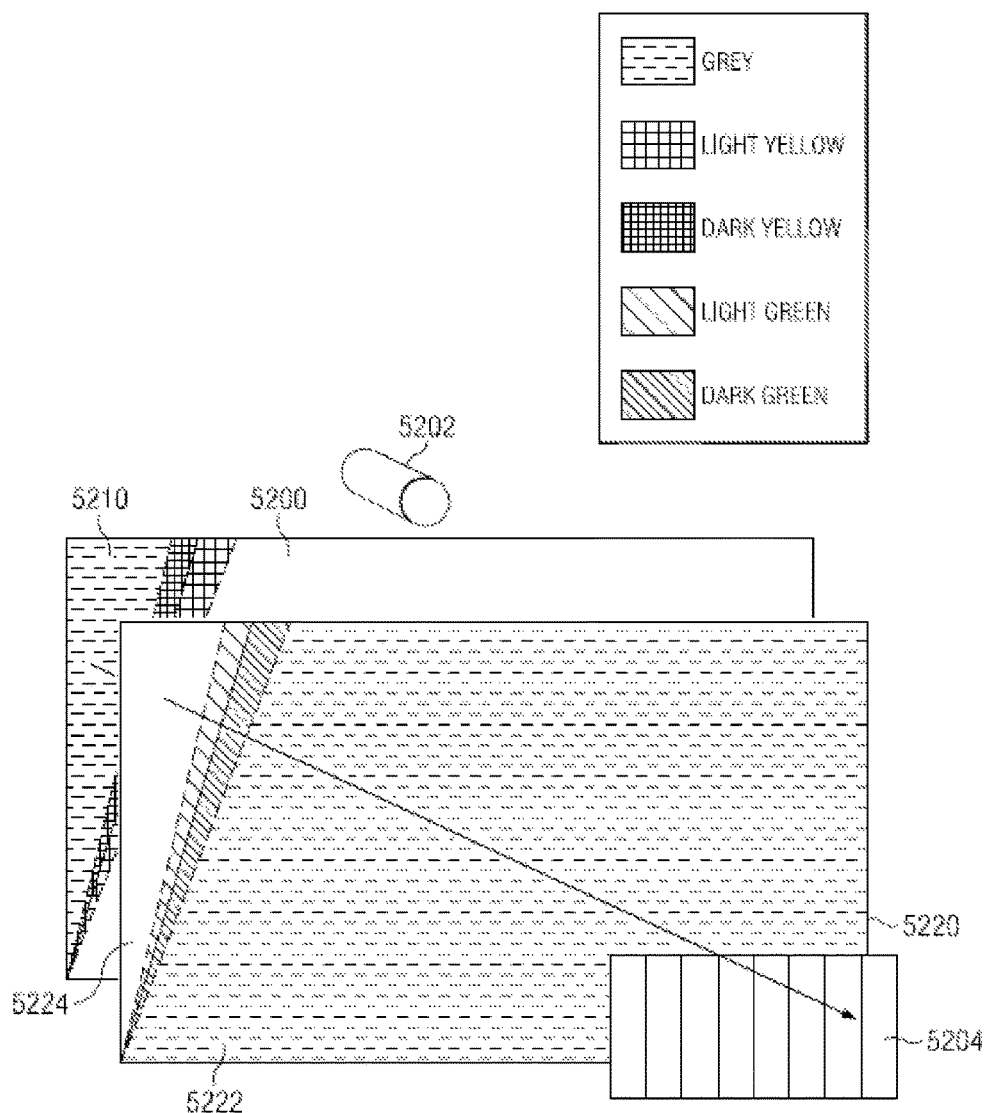
FIG. 17E is a schematic illustration of a further method for compensating the appearance of the void portion of a directional display apparatus, in accordance with the present disclosure.

FIG. 17E illustrates a further embodiment of a directional display apparatus in which the illumination in sub windows 5214 and illumination at the edge of sub window array 5204 may be adjusted to blend together the transition between regions 5210 and 5200 and advantageously improve the uniformity of the illumination seen by the observer in sub-window 5204. Also illustrated is blending the transmission either side of the boundary between regions 5222 and 5224 of SLM 5220. Such blending may include intensity and or colour blending. Advantageously these two methods may be used singly or in combination to improve the uniformity of the display.

Figure 18A:
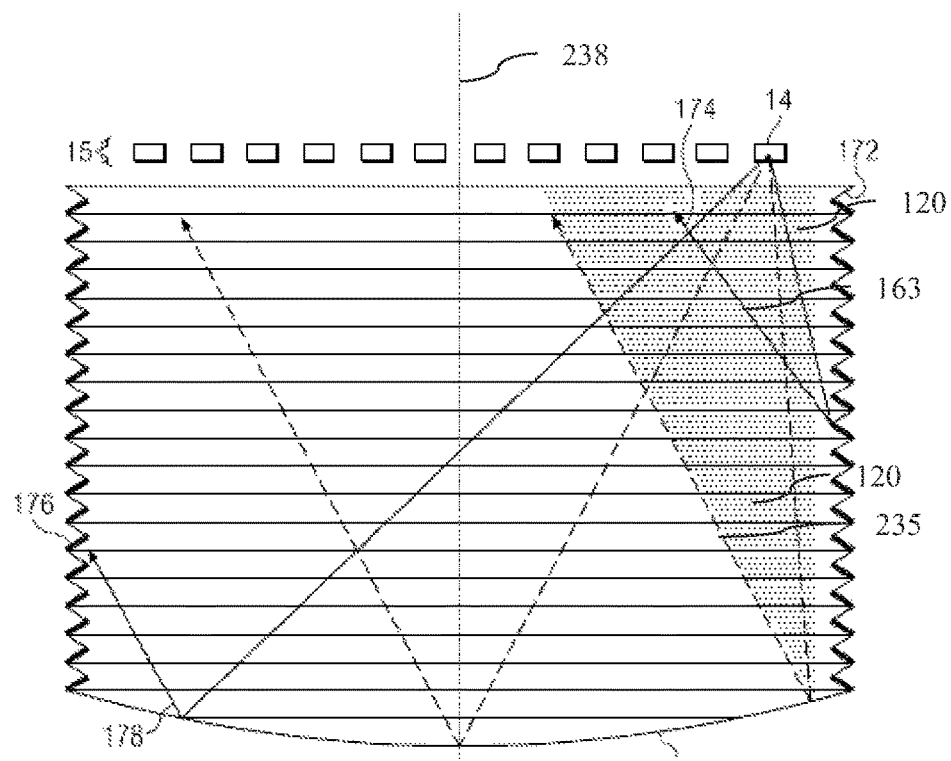
FIG. 18A is a schematic diagram illustrating a directional backlight in which side reflecting facets are introduced to redirect light into voided regions of a directional backlight system, in accordance with the present disclosure.

FIG. 18A is a schematic diagram illustrating a directional backlight in which side reflecting facets 172 are introduced to redirect light into voided regions 120 of a directional backlight system. Further, FIG. 18A shows an embodiment that may employ additional reflecting facets 172 with a directional backlight structure. The facets 172 may reflect rays 174 from a source 14 that may otherwise be absorbed by the edge and create regions void of illumination light as described previously. Although the angles of the reflected rays 163 do not exactly match the rays 235 reflected from the imaging surface 4, the combined rays from the entire source illuminator array 15 may fill the portion 120 with an appropriate spread in angle for high angle illumination. The shadowed surfaces 176 can be made absorbing to substantially suppress unwanted reflection from incident rays 178.

Figure 18B:
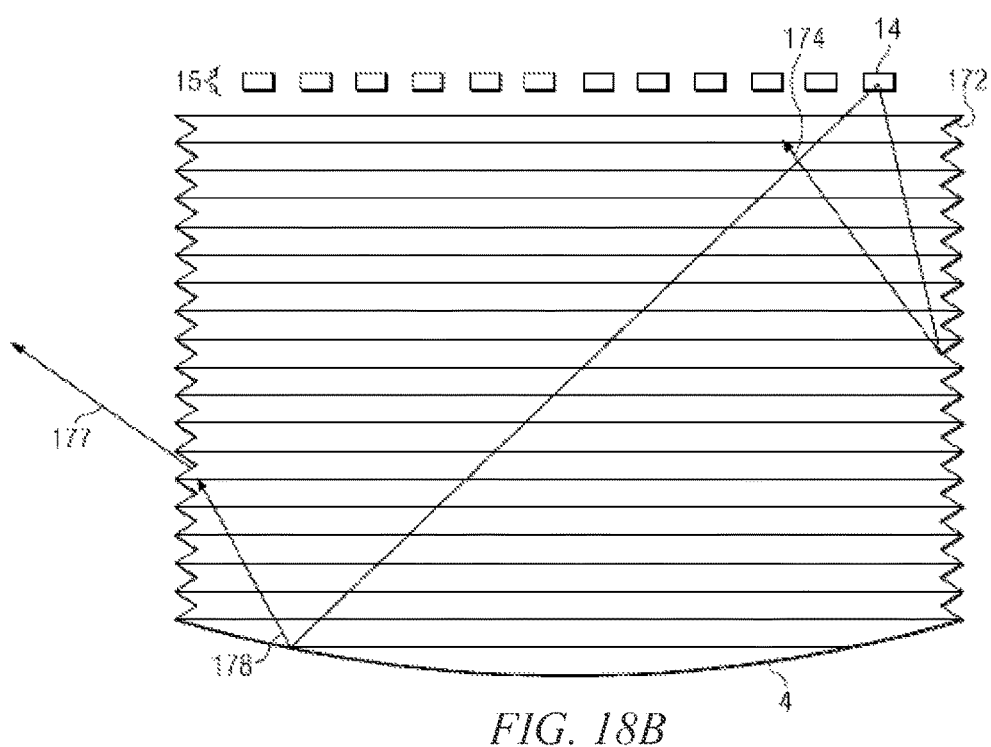
FIG. 18B is a schematic diagram illustrating a further directional backlight in which side reflecting facets are introduced to redirect light into voided regions of a directional backlight system, in accordance with the present disclosure.

FIG. 18B is a schematic diagram illustrating a further directional backlight in which the sides of the waveguide 1 extending between the input end 2 and the reflective end 4 and between the guiding surfaces are arranged to reflect light incident thereon from a light source into the outer portion of the waveguide that fails to be illuminated by that light source. In particular, the sides each comprise an array of reflecting facets that redirect light into voided portions 120 of a directional backlight system. Further, FIG. 18B shows a directional backlight related to that of FIG. 18C in which the bottom facing facet may be substantially transparent which may allow unwanted rays 177 to exit the system. Such rays may be absorbed by an external component (not shown) to reduce stray light in the system.

Figure 18C:
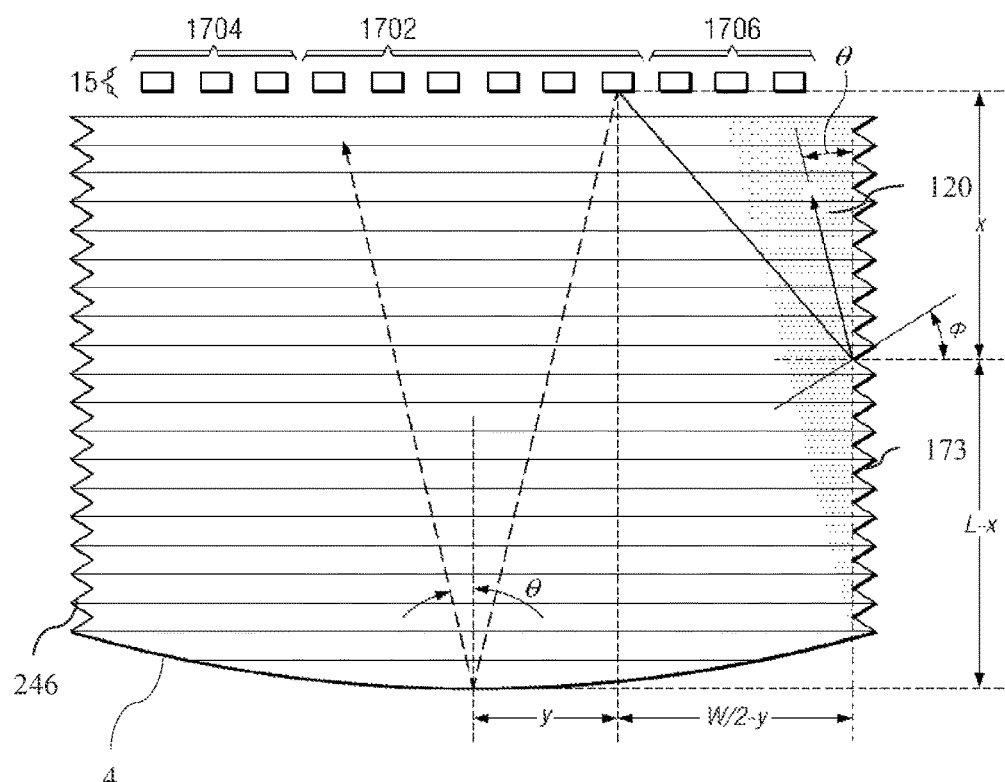
FIG. 18C is a schematic diagram illustrating yet another further directional backlight in which side reflecting facets are introduced to redirect light into voided regions of a directional backlight system, in accordance with the present disclosure.

FIG. 18C is a schematic diagram illustrating another directional backlight in which side reflecting facets 173 are introduced to redirect light into voided portions 120 of a directional backlight system. Further, FIG. 18C shows the geometry for designing the side reflecting facet angles. In some display systems sources 1704 and 1706 may illuminate for 2D purposes, and the sources 1702 may provide high quality windows for 3D and other direction viewing. Then the facet angles may best be designed to provide the correct reflection from the outermost source of the sources 1702 group. Consider an outer source positioned at approximately y from the center of an optical valve system of approximate width W and length L, the approximate facet angle φ in degrees at the approximate position x along the side may be given by:

$$\phi(x) = \frac{1}{2} \cdot \left( \mathrm{atan}\left(\frac{y}{L}\right) - \mathrm{atan}\left(\frac{x}{\frac{W}{2} - y}\right) - 90 \right)$$

In the present embodiments, the curved end 4 may further comprise a Fresnel mirror, that is a mirror with substantially the same curvature as a single surface, comprising facets to further reduce its thickness.

Referring to FIG. 18C wherein the side 246 may comprise faceted portions, in a waveguide 1 of a further display backlight, the facet angle φ may be arranged so angle 255 is the same as 90-φ. Advantageously the width of the waveguide 1 can be reduced, so that the bezel size may be correspondingly reduced.

If the array 15 is arranged with an air gap between the light emitting elements and the input side 2 then the illumination angle around the x-axis within the waveguide 1 will be limited to the critical angle, for example +/−42 degrees within the waveguide. Such an arrangement may not achieve adequate illumination uniformity for off-axis points which require higher angles of illumination. The cone angle of light within the waveguide can be increased by attaching the array 15 to the input side by an index matching material, thus providing a substantially Lambertian illumination profile around the x-axis within the waveguide.

Figure 19:
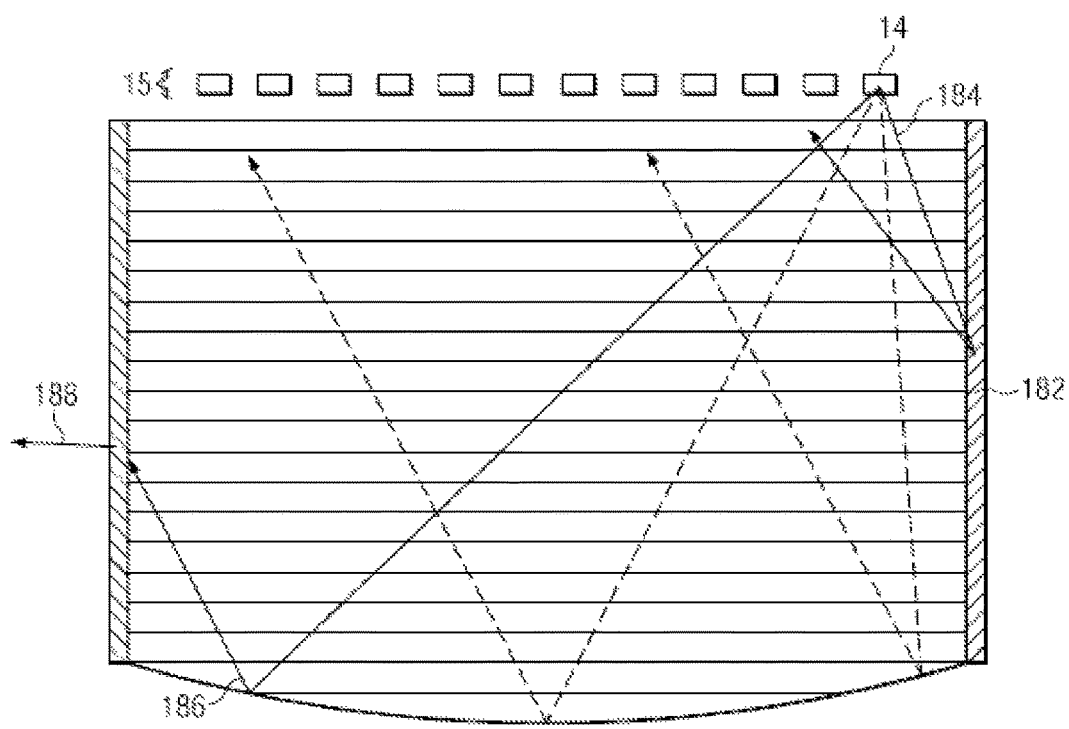
FIG. 19 is a schematic diagram illustrating a further directional backlight in which side holographic films redirect light into voided regions of a directional backlight system, in accordance with the present disclosure.

FIG. 19 is a schematic diagram illustrating a further directional backlight in which side holographic films 182 redirect light into voided portions 120 of a directional backlight system. Further, FIG. 19 is a related embodiment to that of FIGS. 18A-18C in which the reflecting facets 173 may be replaced with a holographic film 182 which has the same optical function as reflecting facets. Thus, the holographic film 182 may correctly reflect rays 184 that may fill the illumination area and may deflect unwanted rays 188 out of the system.

Figure 20A:
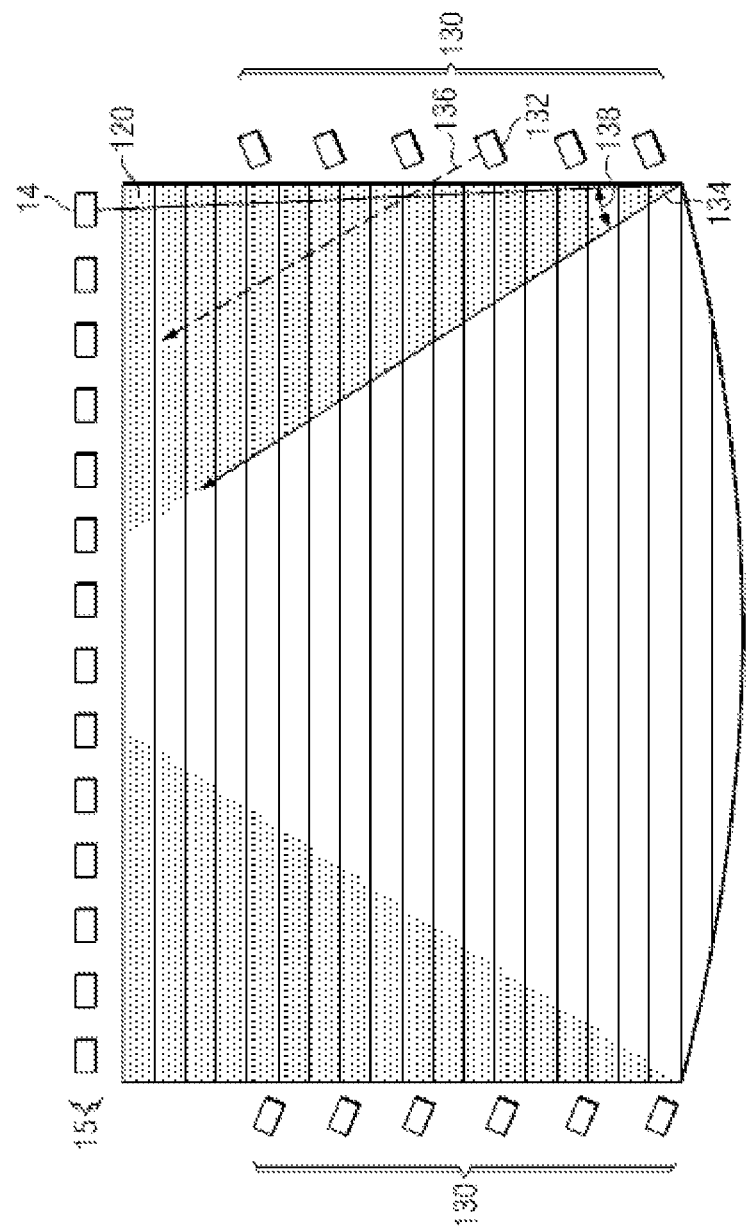
FIG. 20A is a schematic diagram illustrating a directional backlight in which additional light sources are used to introduce light into the side of an optical valve, in accordance with the present disclosure.

FIG. 20A is a schematic diagram illustrating a directional backlight in which additional light sources 130 are used to introduce light into the side of an imaging directional backlight such as an optical valve comprising a waveguide 1. Further, FIG. 20A illustrates an embodiment in which a uniform 2D illuminator can be provided through an array of additional light emitting elements 130 that act as second light sources and are disposed along each side of the waveguide 1 that extends between the input end 2 and the reflective end 4 and arranged to supply light to the outer portions 120 of the waveguide 1 at appropriate angles for off-axis viewing. Light from light source 14 may provide illumination for the extreme right side viewing window in the optical valve system shown. The reflected ray 134 may define the boundary of the associated right side sub-illuminated portion 120. A defining angle for 138 for the extreme void portion 120 in a 16:9 HD illuminated display system may be approximately 42 degrees. To substantially illuminate these regions, LEDs within arrays 130 may inject light into the guide down with a ray cone of approximately greater than ±21 degrees. An extreme ray 136 injected from source 132 into portion 120 may match angle 138 to be extracted at the extreme angles of view.

The external viewing angles may be magnified from the internal propagation angle 138 through refraction when extracted from the high index guiding material. Typical backlight aspect ratios, for example 16:9, may cause the extreme windows illuminated by corner light sources 14, to be almost 180 degrees off-normal viewing. Filling illumination void portions 120 with side injected light from LED arrays 130 in a system with a complete illuminator array 15 may then provide for wide-angle illumination.

FIG. 20B is a schematic diagram illustrating another directional backlight in which additional light sources 130 are used to introduce light into the side of an optical valve, and FIG. 20C is a schematic diagram illustrating another embodiment in which additional light sources are used to introduce light into the side of an optical valve waveguide 1. Further, FIGS. 20B and 20C are related embodiments in which the side surfaces of the guide may be altered to help couple light into the guide from the external source arrays 130. In FIG. 20B the sides may be anti-reflection coated with coating 139 whereas in FIG. 20C the sides of the waveguide 1 may be serrated so that they comprise an array of facets 1300 facing the second light sources 130, thereby offering a more normal surface to incoming rays. In the example of FIG. 20C, rays incident on the side surfaces from sources within illuminator array 15 may be allowed to escape the guide and avoid contamination between viewing windows.

FIG. 21 is a schematic diagram illustrating a directional backlight in which local arrays of sources launch light at controlled angles for wide angle uniform viewing with independent window control. In particular, the sides of the waveguide comprise an array of lenses 1302 aligned with respective second light sources 1304 and arranged to control the direction of light supplied from the second light sources 1304. Thus, FIG. 21 is an embodiment in which the injected light 1308 may be substantially controlled in direction and angular spread from a source 1306 by the lenses 1302. Arrays 1304 of independently addressed sources can be turned on and off in a similar fashion to those in the input illuminator array 15 which may allow for precise windows to be formed at extreme viewing angles from which uniform illumination is observed.

Figure 22A:
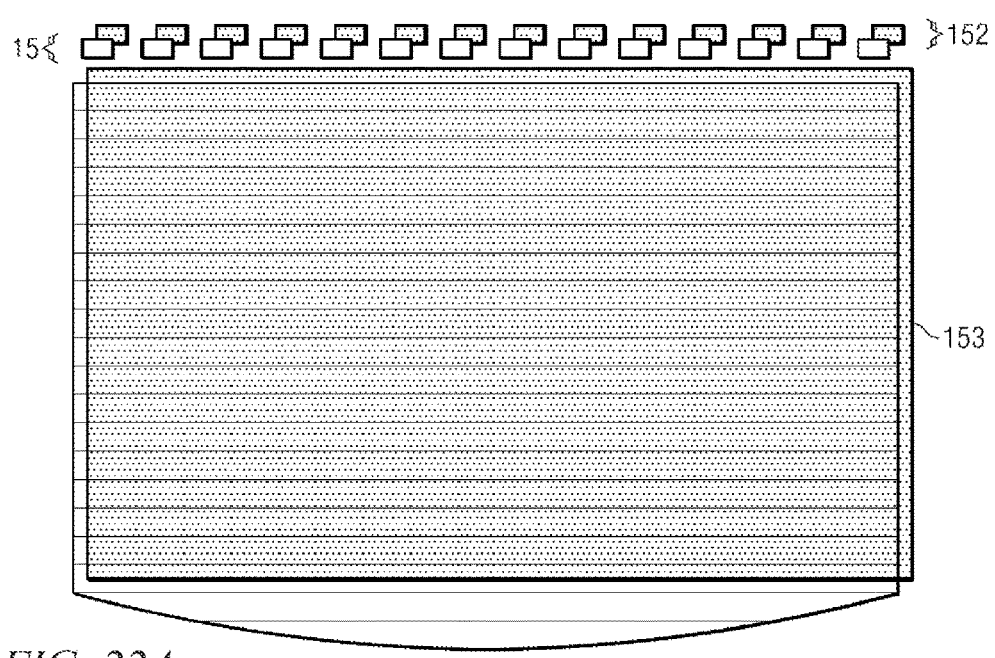
FIG. 22A is a schematic diagram illustrating a further directional backlight in which a backlight is placed adjacent an optical valve, in accordance with the present disclosure.
Figure 22B:
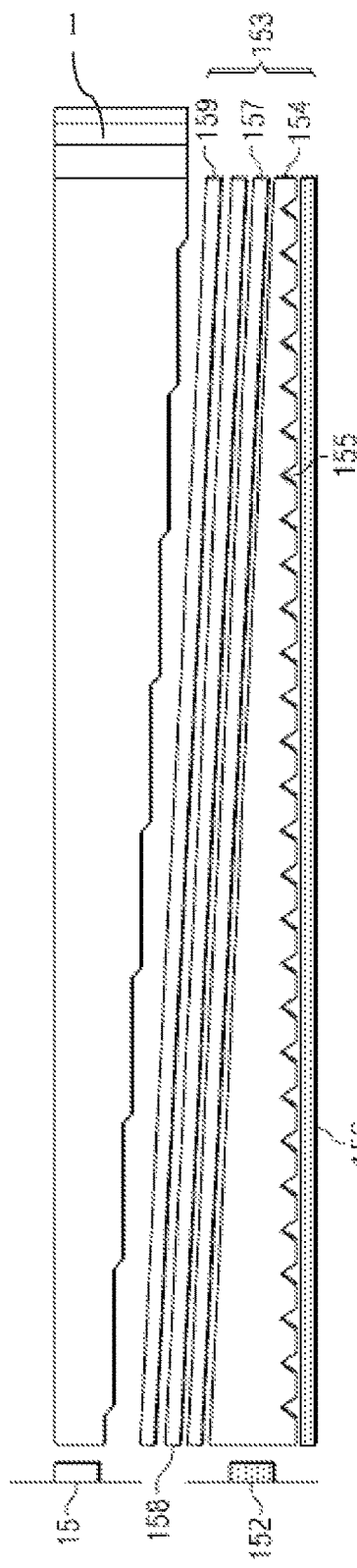
FIG. 22B is a schematic diagram illustrating a further directional backlight in which a backlight is placed adjacent an optical valve, in accordance with the present disclosure.
Figure 22C:
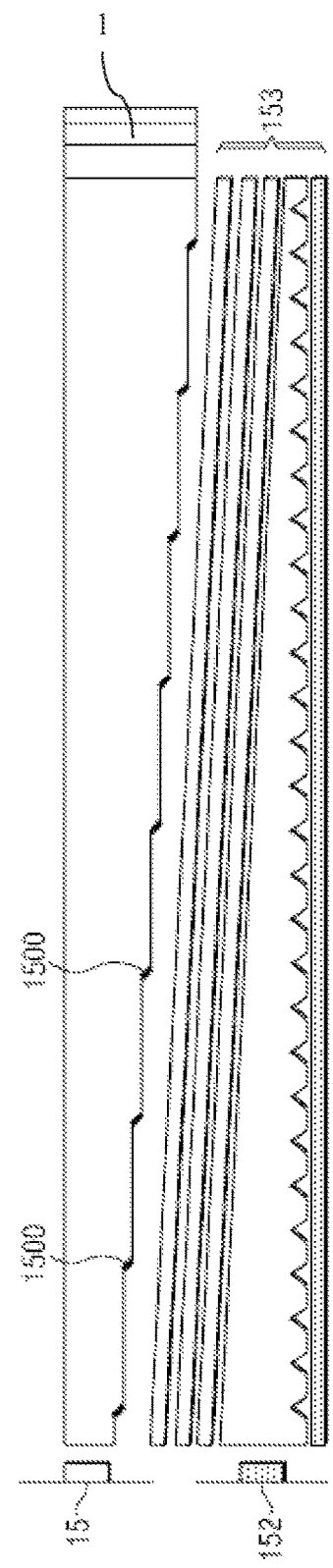
FIG. 22C is a schematic diagram illustrating a further directional backlight in which a backlight is placed adjacent an optical valve, in accordance with the present disclosure.

FIG. 22A is a schematic diagram illustrating a further directional backlight in which a backlight is placed adjacent an optical valve, FIG. 22B is a schematic diagram illustrating a side view in which a backlight structure 153 is placed behind the waveguide 1. The backlight structure 153 extends across the second guide surface of the directional waveguide 1 and is arranged to provide illumination through the directional waveguide 1 including the outer portions 120 that fail to be illuminated by offset light sources 14. Further, FIGS. 22B and 22C illustrate in front and side views respectively, another embodiment in which a backlight structure 153 is placed behind the waveguide 1. In each of these apparatuses, the transparency of the waveguide 1 of imaging directional backlight structures advantageously enables illumination light from additional light sources to be passed through substantially normally with minimal effect. Placing a 2D LCD backlight system 153 directly behind with independent sources 152 may isolate the illumination from each structure for independent directional and Lambertian illumination.

FIG. 22B illustrates the backlight structure 153 with the components separated. The system components may include a light source array 152 which may shine light into a wedge-shaped backlight waveguide 154. The light from the source array 152 may enter the backlight guide 154 by an entrance surface located at the thick end of the wedge-shaped guide 154. Light may pass down the guide and may be scattered toward an LCD when rays reflect off structures 155. Light that refracts off the same structures away from the display may be back reflected from a Lambertian reflector 156 on the opposite side of the backlight waveguide 154 from the directional waveguide 1. The crossed prism films 157 and 158 together with a diffusing film 159 are conditioning films that may condition the light for uniform bright illumination. Although the structure of FIG. 22B may only appear similar in some regards to directional systems, the structure of FIG. 22B may not provide independent control of viewing windows through source imaging.

FIG. 22C is a schematic diagram illustrating a further directional backlight in which a backlight is placed behind an optical valve. FIG. 22C includes a backlight system 153 and source array 152. Additionally, FIG. 22C illustrates an input illuminator array 15 and extraction features 1500. Further, FIG. 22C shows an embodiment in which the extraction features 1500 of the optical valve may be coated with a reflector to avoid leakage of light into the lower films while substantially maintaining transparency.

Figure 23:
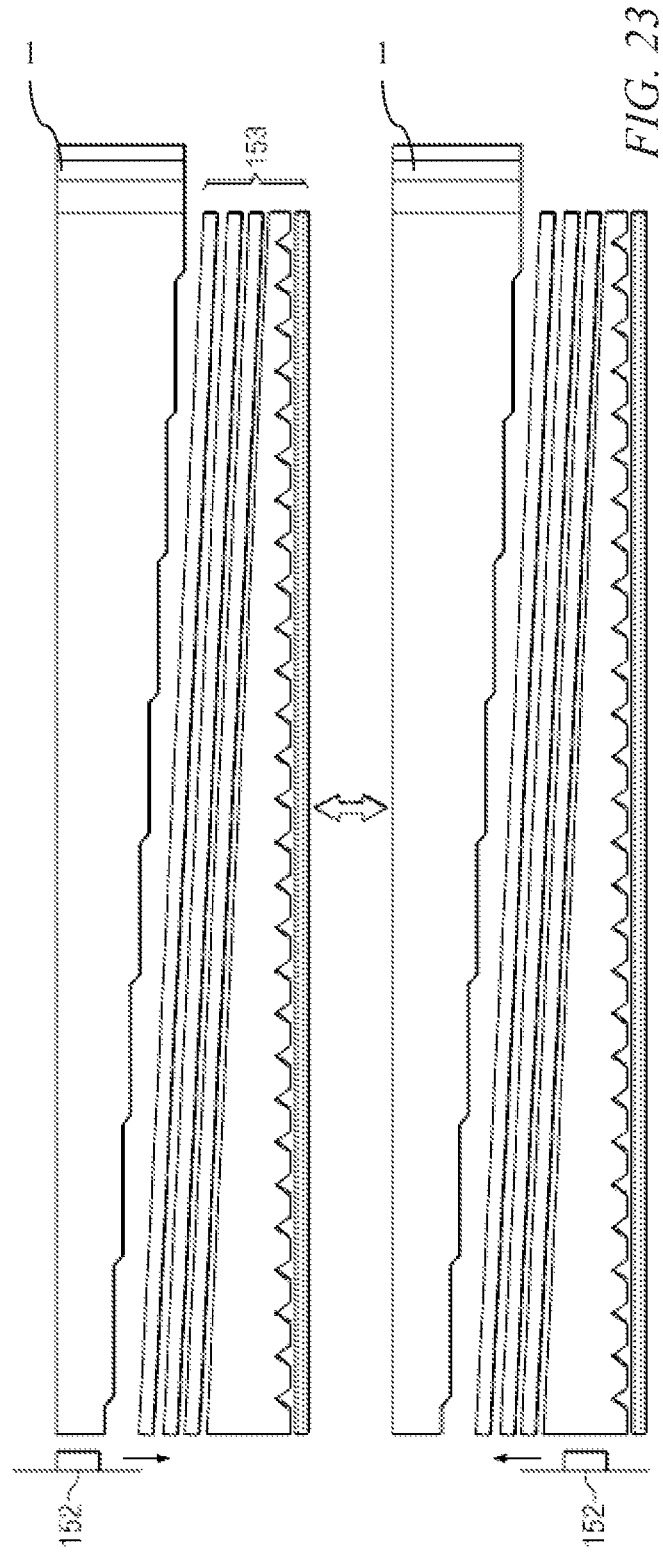
FIG. 23 is a schematic diagram illustrating a further directional backlight in which a source array is altered in position between adjacent backlights, in accordance with the present disclosure.

FIG. 23 is a schematic diagram illustrating a further directional backlight in which the two separate independent source arrays as shown in FIGS. 22A and 22B, are replaced by a single array 152 as shown in FIG. 23. The single array 152 may be physically moved between the entrance of the imaging directional backlight (illustrated in FIG. 23 is an optical valve structure) and the conventional back light unit 153. In particular, the array 152 of light sources is movable between a position shown in the upper drawing in which they illuminate the input end 2 of the directional waveguide 1 and a position shown in the lower drawing in which they illuminate the backlight waveguide 154. Thus, the display apparatus is arranged to illuminate the backlight waveguide 154 using with the same array 152 of light sources that illuminate the directional backlight 1. The physical movement can be brought about by actuators or by other physical means.

Figure 24:
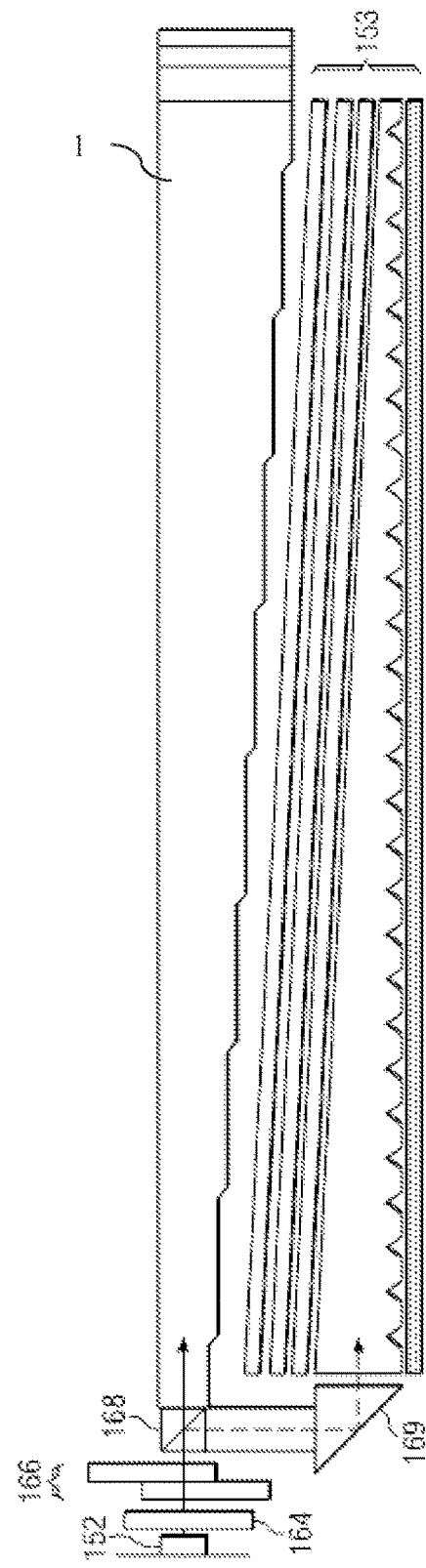
FIG. 24 is a schematic diagram illustrating a directional backlight in which light is switched between illuminating backlight systems, in accordance with the present disclosure.

FIG. 24 is a schematic diagram illustrating a directional backlight in which the display apparatus is arranged to illuminate the backlight waveguide 154 using with the same array 152 of light sources that illuminate the directional backlight 1 by the light being switched between illuminating backlight systems. The backlight apparatus comprises an optical structure arranged to direct the light from the array 15 of light sources selectively to the input end of the directional waveguide 1 or to the backlight waveguide 154. In particular, the light path from a single source array 152 can be altered by means of polarization switching. The emitted light may be polarized by a polarizing element such as a linear polarizing sheet 164 before being modulated in polarization by liquid crystal (LC) switch 166. Light that is vertically polarized may then pass through polarizing beam splitter (PBS) 168 and may enter the optical valve for directional illumination purposes. In another modulating state the switch 166 may cause the light to be horizontally polarized causing it to be deflected off the PBS 168 and mirror 169 before entering the backlight for 2D illumination. Related embodiments to the embodiment of FIG. 24 might use other beam deflecting methods and/or devices such as electrically controllable mirrors or those based on electrically deformable deflection elements.

Figure 25A:
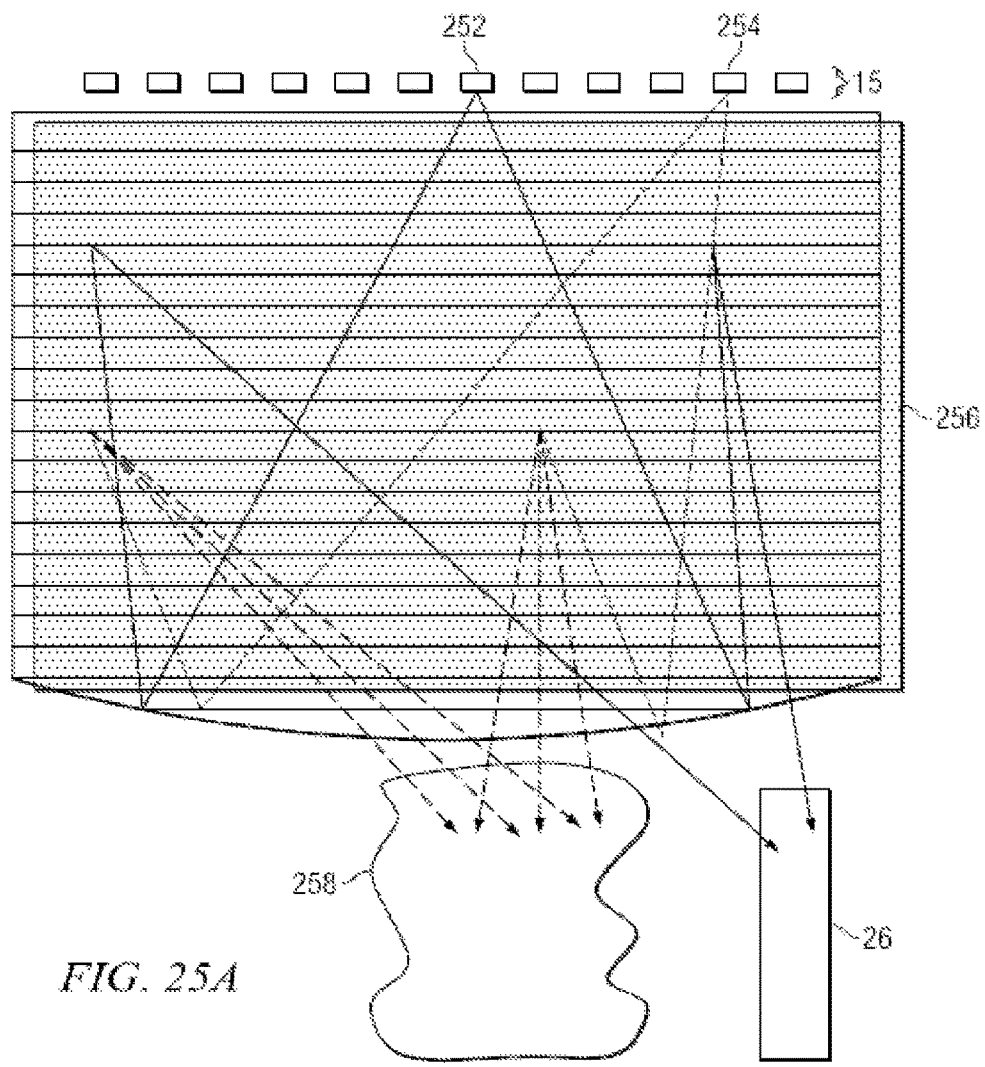
FIG. 25A is a schematic diagram illustrating a directional display device whereby an angle dependent diffuser is used to diffuse high angle rays to a greater extent than those directed normally from the imaging directional backlight, in accordance with the present disclosure.

FIG. 25A is a schematic diagram illustrating a directional display device including a waveguide structure wherein an angle dependent diffuser film 256 extending across the waveguide 1 is used to diffuse high angle rays to a greater extent than those directed normally from the imaging directional backlight. Further, FIG. 25A shows a waveguide with voided portions 120 which have been substantially filled by any one of the embodiments previously discussed, with an additional angle dependent diffuser film 256. Diffuser film 256 may have a property that it does not angularly diffuse light incident at angles in a first range around the normal to the film in the lateral direction, but does angularly diffuse incident light at higher angles, that is at angles in a second range in the lateral direction outside the first range. Thus, the diffuser film appears clear or non-scattering to near-normally incident light. Thus, viewing window 26 is achieved for on-axis imaging while viewing window 258 of greater lateral extent is achieved for off-axis imaging. Advantageously the viewing angle of the display for 2D viewing can be increased.

Figure 25B:
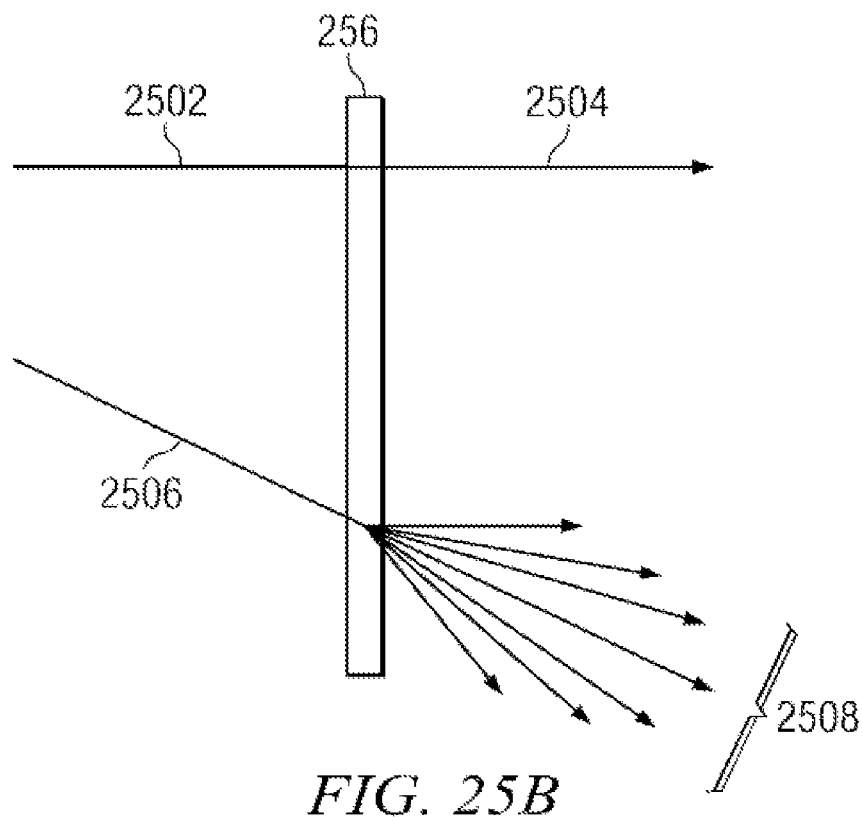
FIG. 25B is a schematic diagram illustrating a side view of an angular dependent diffuser, in accordance with the present disclosure.

FIG. 25B is a schematic diagram illustrating the operation of and a side view of an angular dependent diffuser film 256 perpendicular to the lateral direction. In a system, similar to the embodiment of FIG. 25A, this component may act to mix high angle rays providing 2D viewing capability while substantially maintaining the accurate imaging of near normal light for purposes such as 3D autostereoscopic viewing.

Figure 25C:
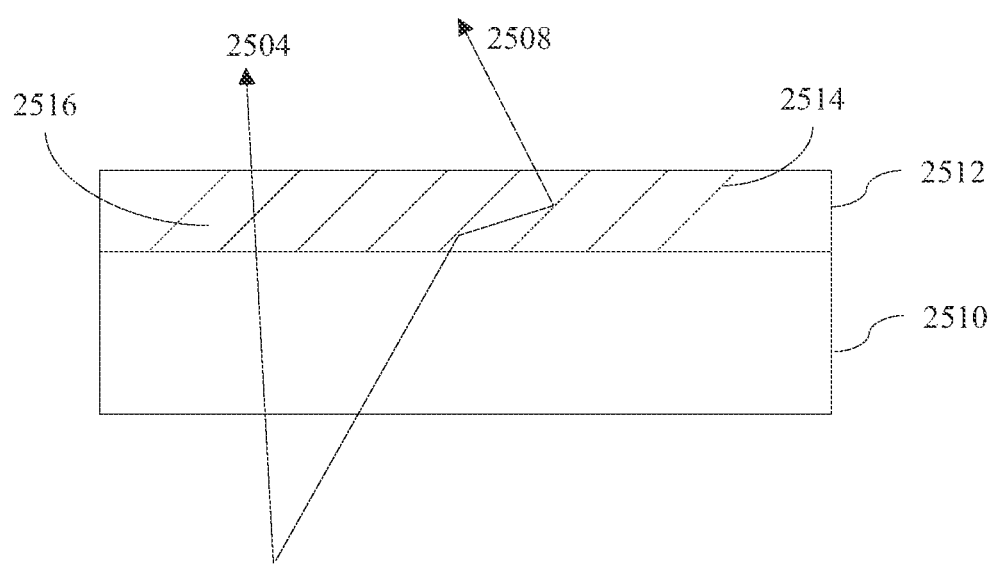
FIG. 25C is a schematic diagram illustrating a side view of an angular dependent diffuser, in accordance with the present disclosure.

FIG. 25C is a schematic diagram illustrating one example embodiment of a high angle diffuser. Film 256 comprises a support layer 2510 has a layer 2512 formed thereon comprising a monomeric mixture with inclined regions 2514 of low refractive index alternating with regions 2516 of high refractive index therebetween. The regions 2514 and 2516 are inclined with respect to the normal of the film 256. Although this example includes two regions of 2514 and 2516 of differing refractive index, in general there may be additional regions of differing refractive index. Light rays 2508 that are incident close to the inclination angle of the regions 2514, 2516 may be scattered that may be due to total internal reflection between layers 2514, 2516 while light rays 2504 that are incident away from the inclination angle of the regions 2514, 2516 may be directly transmitted. Multiple scattering directions can be achieved by stacking films arranged at an angle to each other so that a central clear window may be achieved with outer diffusing regions in horizontal directions or horizontal and vertical directions. At very high incident angles, the film may no longer scatter the light. Thus, the film 256 may be substantially transparent in a first range, which in this example is from 0 degrees to 25 degrees, with respect to the normal to the film 256 and may be substantially scattering in a second range, which in this example is from 25 degrees to 55 degrees, with respect to the normal to the film 256.

An example of a high angle diffuser film is provided by Sumitomo Chemical Co., LTD. under the trademarked product name "Lumisty".

Figure 25D:
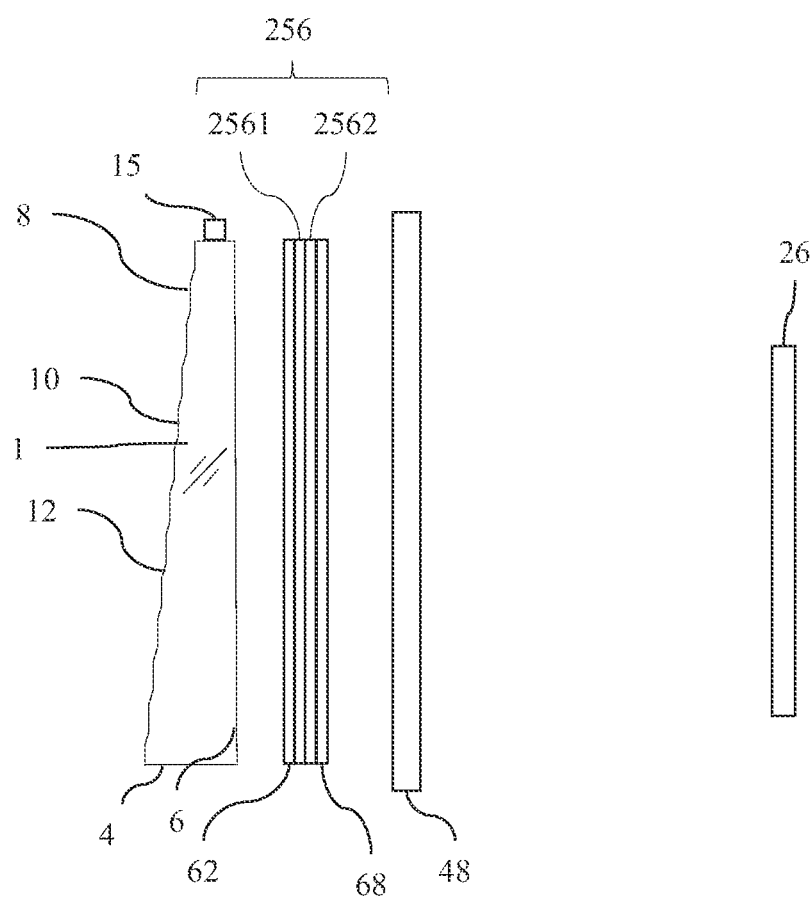
FIG. 25D is a schematic diagram illustrating an arrangement of an angular dependent diffuser in an autostereoscopic directional display device arranged to provide wide angle viewing, in accordance with the present disclosure.

FIG. 25D is a schematic diagram illustrating an arrangement of an angular dependent diffuser in an autostereoscopic directional display device arranged to provide wide angle viewing. Diffuser 256 is arranged extending across the display apparatus between Fresnel lens 62 and asymmetric diffuser 68. Diffuser 256 may comprise: a first layer 2561 arranged to angularly diffuse light in a sub-range from +25 and +55 degrees in the horizontal direction with respect to the normal to the diffuser 256 and substantially not angularly diffuse light outside this input ray angle cone; and a second layer 2561 arranged to angularly diffuse light in a sub-range from −25 and −55 degrees in the horizontal direction with respect to the normal to the diffuser 256. As a result, the diffuser 256 diffuses light in a second range from 25 to 55 degrees with respect to the normal and substantially does not diffuse light outside this viewing cone and in a first range within 25 degrees with respect to the normal. Further layers can be added to provide diffusion in the vertical direction if required.

As described above, the control system is arranged in a 3D mode of operation to selectively operate the light sources to direct light into the viewing windows in positions corresponding to the left and right eyes of the observer, for example, using a time division multiplexing technique. The control system is also arranged to operate in a 2D mode of operation, for example by continuously displaying the same image across the SLM 48. Advantageously the film may provide increased viewing angle for 2D mode of operation in a thin layer at low cost. In operation, for a tracked observer 408 close to the on-axis position the display operates as an autostereoscopic display and film 256 has substantially no effect on output characteristics of the display. When the observer gets to higher angle positions, the observer tracking system may determine that autostereoscopic operation is no longer required and switch to 2D operation. In this case, all the light sources of the array 15 may be illuminated. In the illumination directions that are greater than 25 degrees, the diffuser may provide increased viewing angle for sparsely separated light sources. This may reduce the number and intensity and color matching specification of individually controllable light sources of array 15 and edge light sources 1304 (if present) advantageously reducing cost of light sources and control system. Advantageously the layers 62, 256, 68 may be arranged into a single structure to reduce light loss and complexity.

Thus an autostereoscopic display apparatus may comprise a display device including an SLM 48 comprising an array of pixels, the display device being controllable to direct an image displayed on all of the pixels into selectable viewing windows 26 having different positions; and a control system that is operable in a 3D mode of operation and a 2D mode of operation, the control system being arranged in the 3D mode of operation to control the display device to display temporally multiplexed left and right images and synchronously to direct the displayed images into viewing windows 26 in positions corresponding to the left and right eyes of the observer 408, and being arranged in the 2D mode of operation to control the display device to display a continuous 2D image, wherein the display device 48 further comprises an angle-dependent diffuser film 256 extending across the display device 48 having a property that light incident at angles in a first range around the normal to the film 256 is not angularly diffused but light incident at angles in a second range outside said first range is angularly diffused.

The embodiment of FIG. 25D can be combined with any of the other wide angle embodiments described herein. In general, such a diffuser film may achieve similar advantages when applied extending across any type of autostereoscopic display apparatus that is operable in a 3D mode of operation using a time division multiplexing technique and also a 2D mode of operation.

Figure 26:
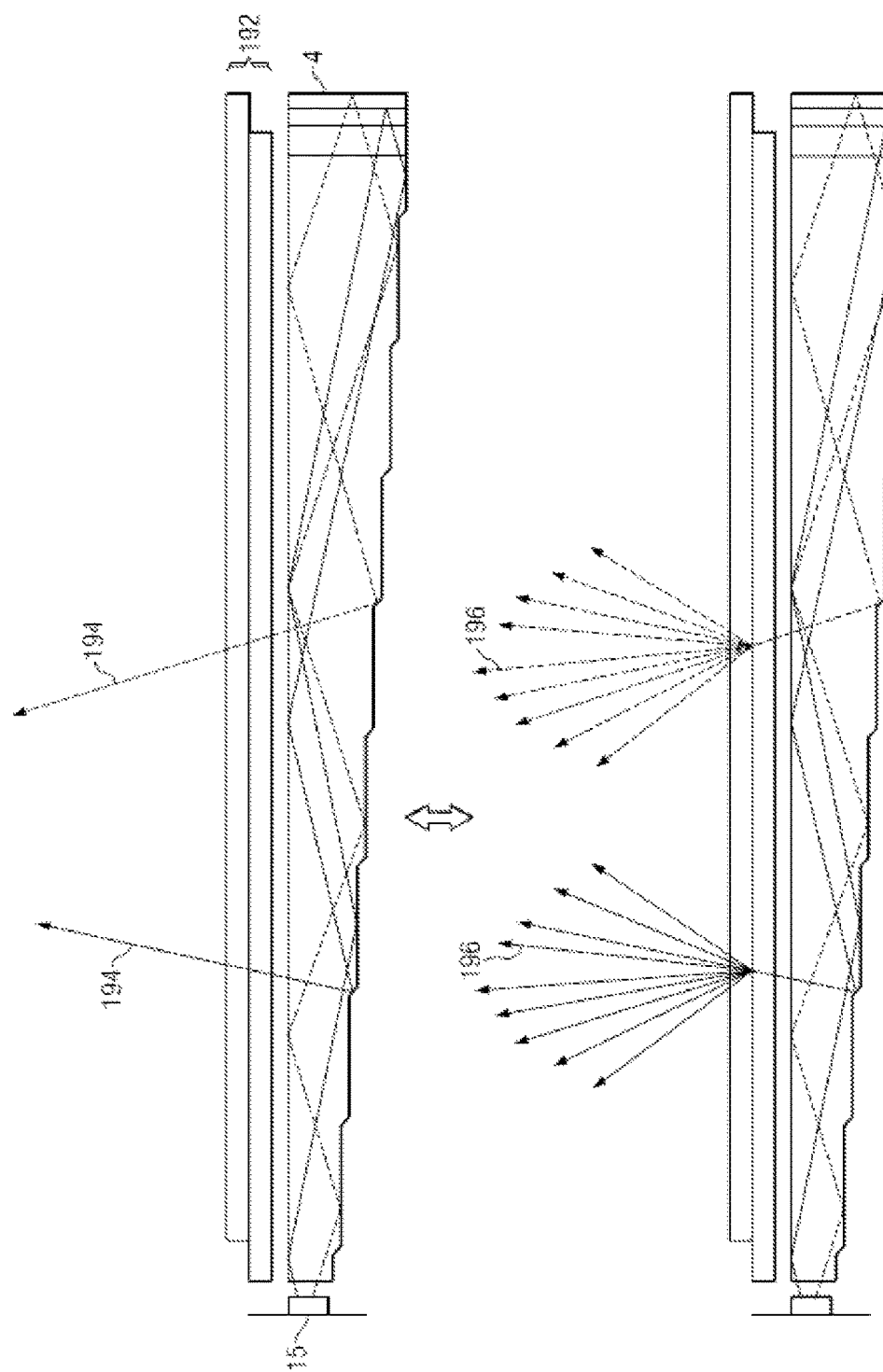
FIG. 26 is a schematic diagram illustrating a directional backlight in which illuminating light is diffused using a switchable diffusing element, in accordance with the present disclosure.

FIG. 26 is a schematic diagram illustrating a directional backlight in which illuminating light is diffused using a switchable diffusing element. Further, FIG. 26 shows schematically an embodiment that may redirect imaging rays using a switchable diffuser. Light rays 194 may be emitted from the imaging directional backlight structure and may form source images within a window plane for directional illumination. A switchable diffuser such as a polymer dispersed liquid crystal device 192 may have minimal effect on the rays in a first state. Electrically altering the first state into a different state that is diffusing may act to break the imaging condition and spread the light 196 substantially uniformly for wide angle 2D viewing.

Figure 27:
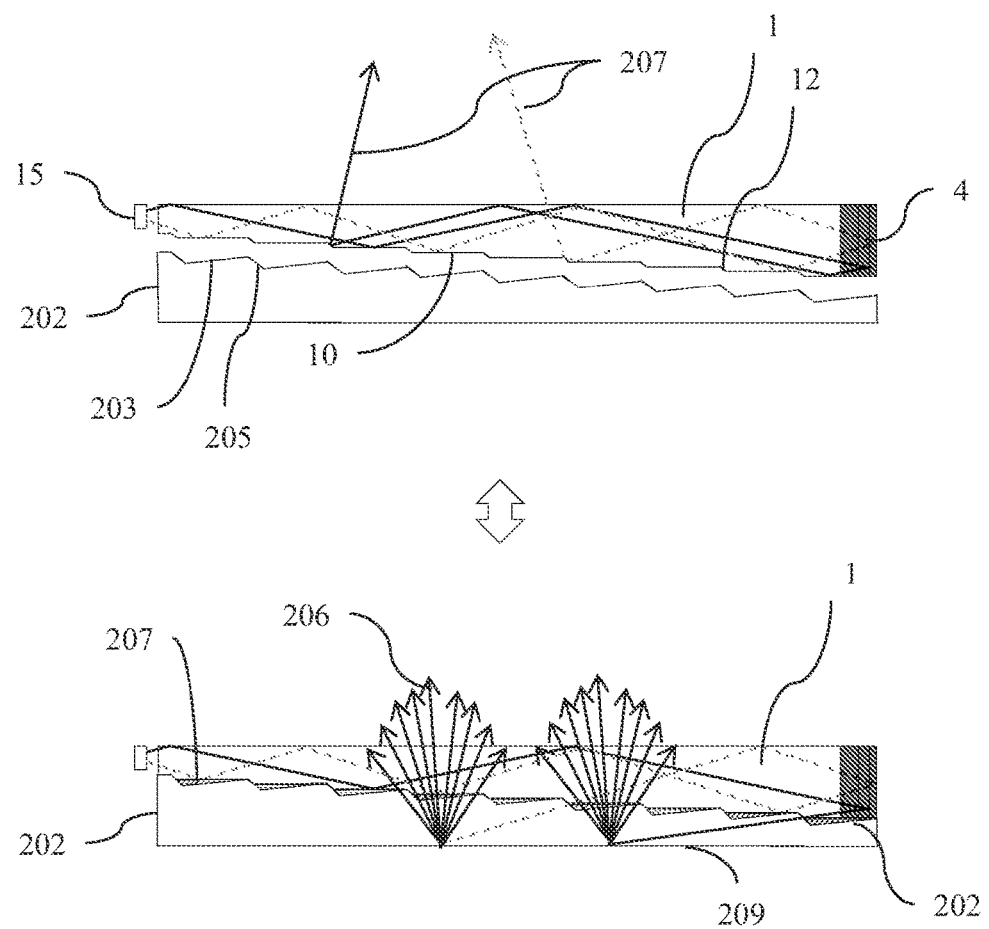
FIG. 27 is a schematic diagram illustrating a directional backlight in which guided light may be extracted in a diffuse form by optically contacting the bottom surface of a directional backlight with a diffuse reflecting element, in accordance with the present disclosure.

FIG. 27 is a schematic diagram illustrating a directional backlight in which guided light may be extracted in a diffuse form by optically contacting the bottom surface of a directional backlight with a diffuse reflecting element 202 comprising a structured side with features 203, 205 and a diffusing side comprising a diffusing surface 209. Further, FIG. 27 is a further embodiment in which the imaging condition of an imaging directional backlight may be broken through the introduction of a diffuser. In FIG. 27, a reflecting diffusing element 202 may be made to be optically isolated in one state and in optical contact with the light extraction features in another state. In the first state light may not interact with the diffusing element 202. Making optical contact through physically moving the element 202 toward the guide may allow light to penetrate the diffuser structure by breaking the total internal reflection condition at the light extraction regions 12. In the second state air gaps 207 may be provided by inclined sides 203, 205, 10, 12 to achieve guiding for light passing in the first direction through the waveguide 1. The resulting diffuse light 206 may provide desired wide angle 2D illumination.

Figure 28:
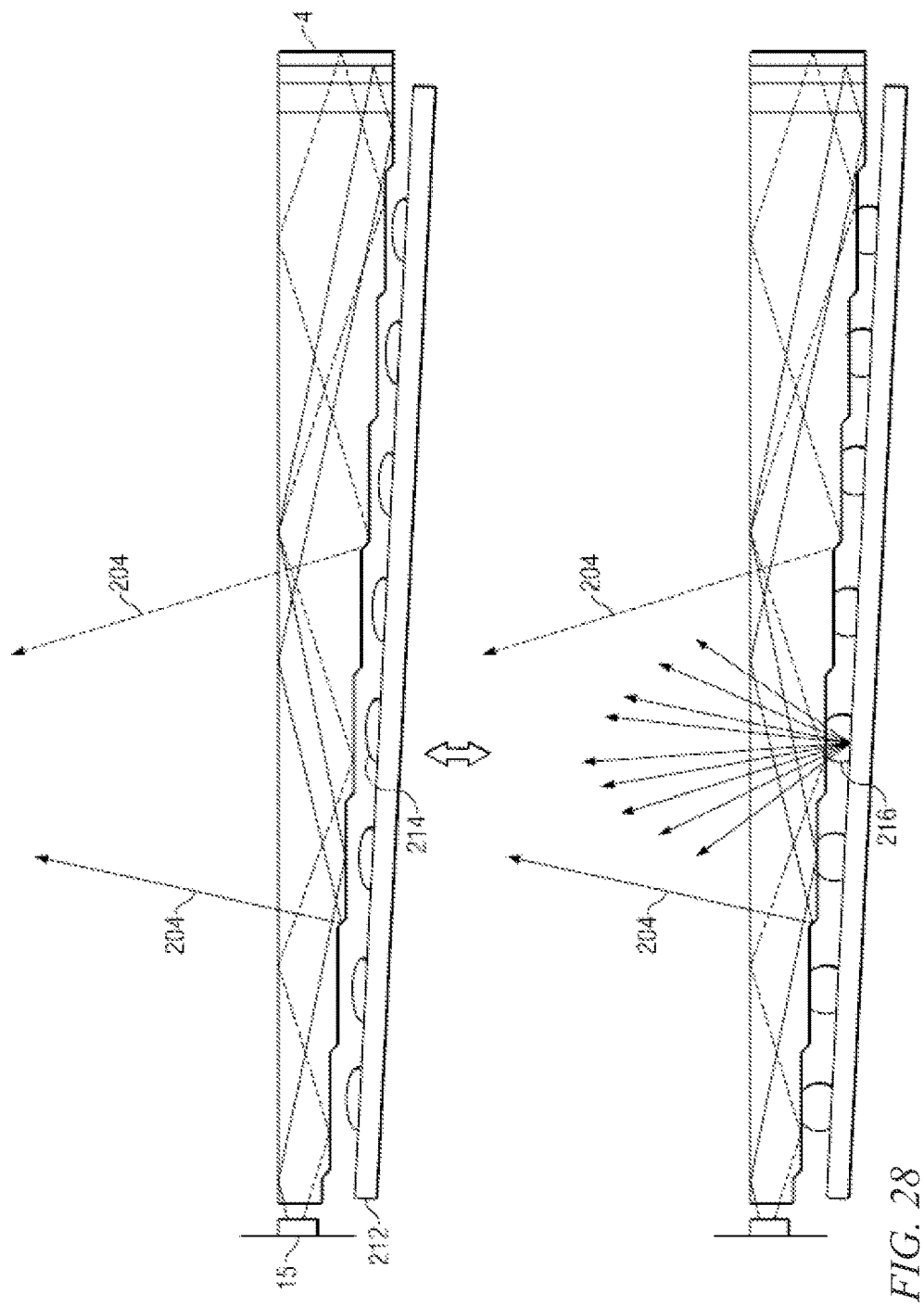
FIG. 28 is a schematic diagram illustrating a directional backlight in which guided light may be extracted in a diffuse form by optically contacting the bottom surface of the directional backlight with a diffuse reflecting element through electroforming material surface material, in accordance with the present disclosure.
Figure 29:
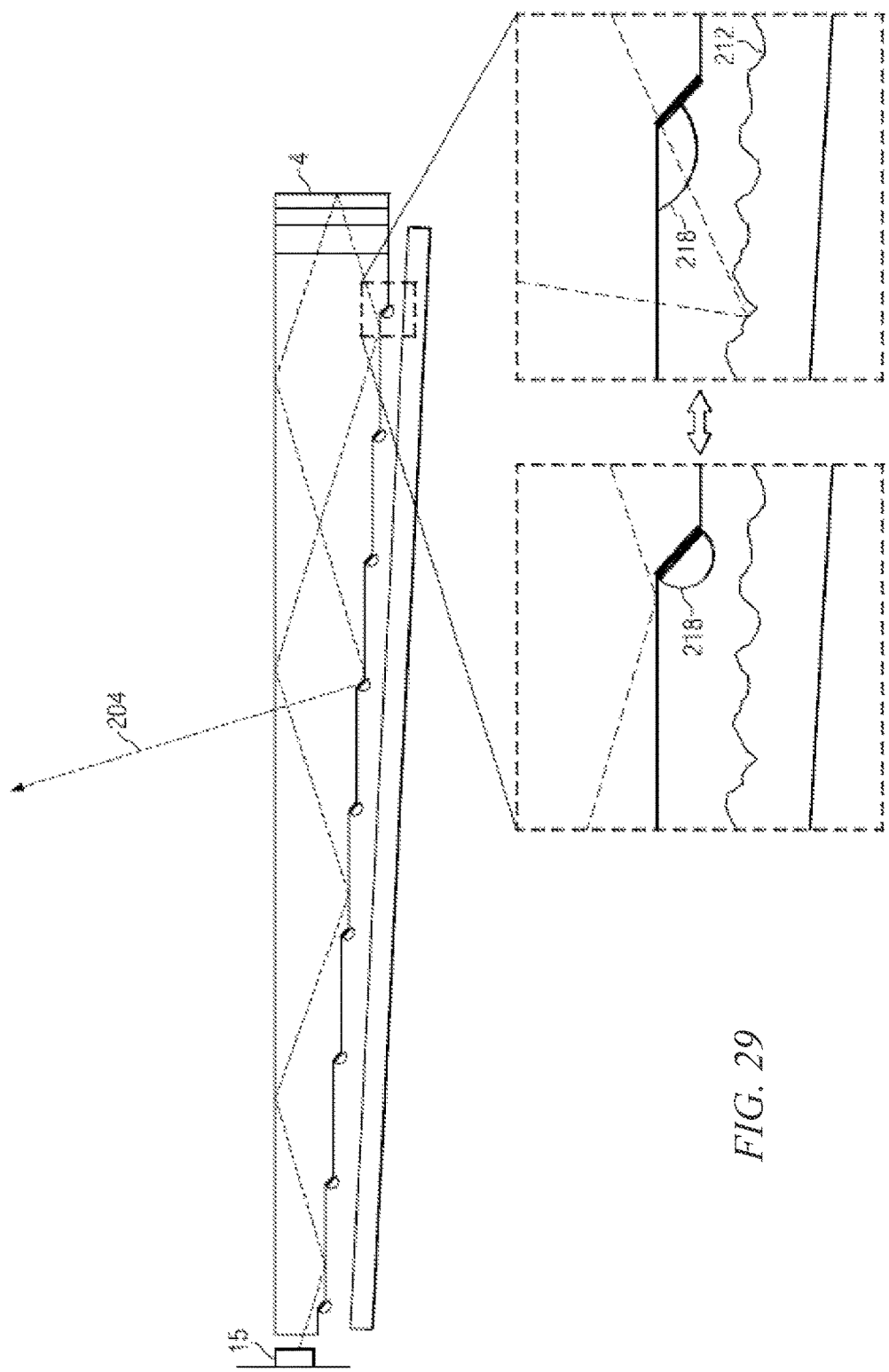
FIG. 29 is a schematic diagram illustrating a directional backlight in which electro-wetting material is made to move from behind reflecting facets into the guiding region of an imaging directional backlight forcing light to exit and reflect off a diffusing surface, in accordance with the present disclosure.

FIG. 28 is a schematic diagram illustrating a directional backlight in which guided light may be extracted in a diffuse form by optically contacting the bottom surface of an imaging directional backlight with a diffuse reflecting element through electroforming material surface material, and FIG. 29 is a schematic diagram illustrating of yet another embodiment in which electro-wetting material is made to move from behind reflecting facets into the guiding region of an optical valve forcing light to exit and reflect off a diffusing surface. Alternative methods of making optical contact between a lower reflecting diffuser element and an imaging directional backlight can be considered such as electroforming polymers 214 or electro-wetting materials 218 as illustrated in FIGS. 28 and 29 respectively.

It is understood that in the above embodiments that a full directional backlight may include additional Fresnel and diffusing elements.

Figure 30:
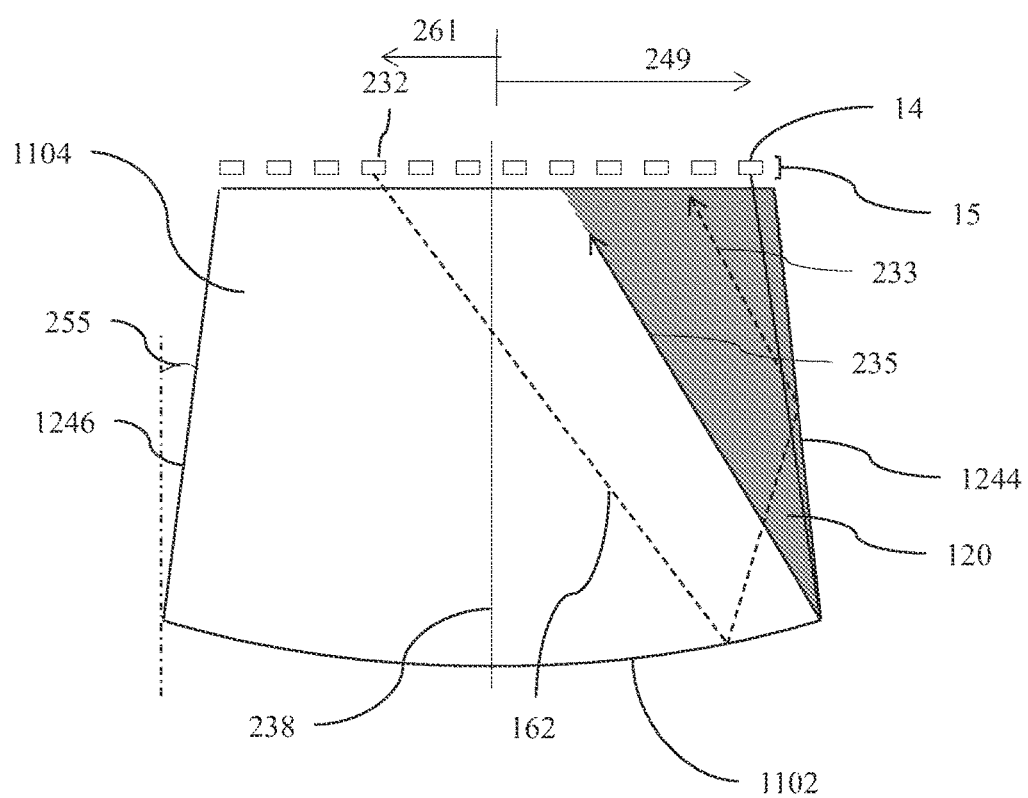
FIG. 30 is a schematic illustration of a top view of a wedge directional backlight arranged to achieve reduced visibility of void portions, in accordance with the present disclosure.
Figure 31:
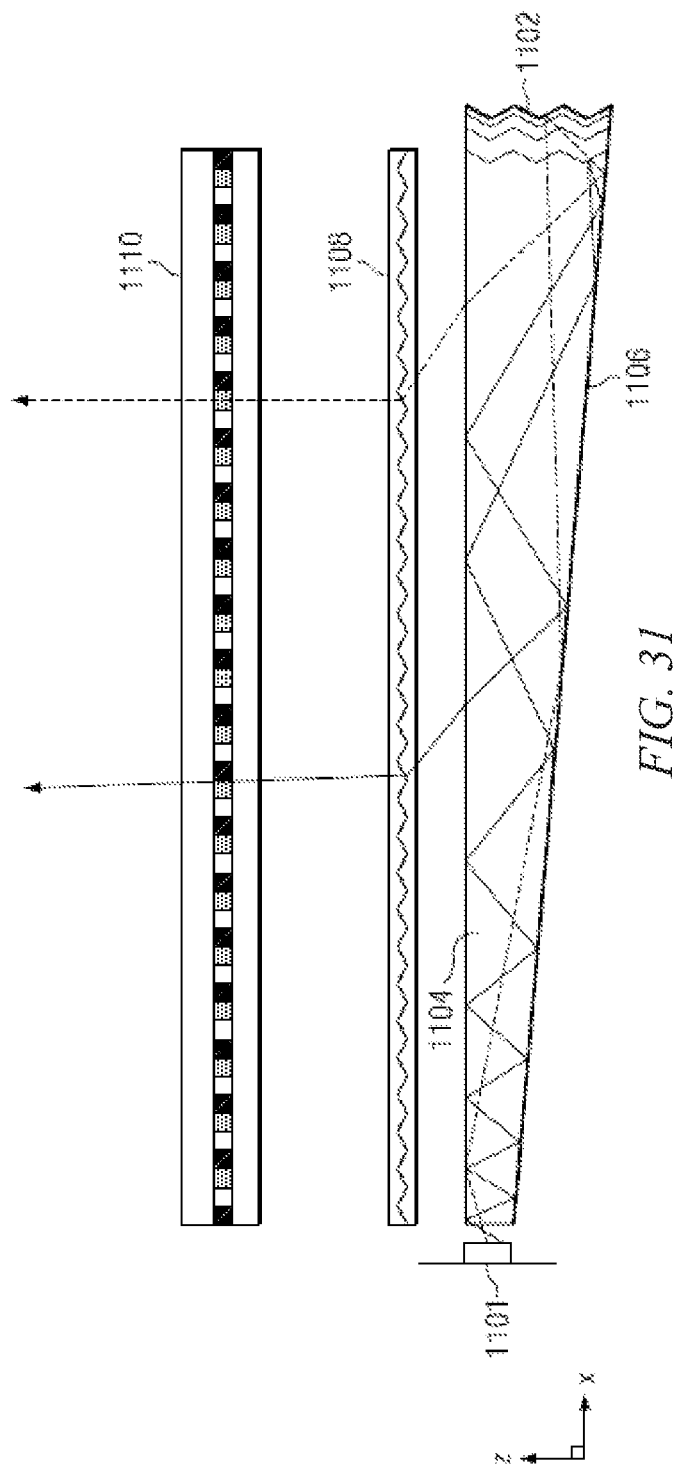
FIG. 31 is a schematic illustration of the side view of a wedge directional backlight, in accordance with the present disclosure.

FIG. 30 is a schematic diagram illustrating a front view of an autostereoscopic display device comprising a wedge directional backlight and comprising angled sides 1244, 1246. FIG. 31 is a schematic diagram illustrating a side view of an autostereoscopic display device comprising a wedge directional backlight arranged to achieve landscape and portrait operation. Wedge directional backlights are described in U.S. Pat. No. 7,660,047 incorporated herein by reference. The optical wedge 1104 is a waveguide having an input end and first and second, opposed guide surfaces 1106 for guiding light along the optical wedge 1104 that are both planar. The optical wedge 1104 is illuminated by light source array 1101 and light propagates within the medium 1104 of the wedge by total internal reflection at the guide surfaces 1106. The optical wedge 1104 has a reflective end 1102 formed by a corrugated mirror facing the input end for reflecting light from the input end back through the optical wedge 1104. The second guide surface is inclined at an angle to reflect light in directions that break the total internal reflection of the first guide surface after reflection at the reflective end 1102, so that light is output at the first guide surface by refraction of light.

By way of comparison with the stepped imaging directional backlight, light extraction features are not provided. However, the operation is similar in that the optical wedge 1104 directs input light from the light sources of the light source array 1101 at different input positions across the input end in output directions relative to the normal to the first guide surface that are dependent on those input positions. A control system as described above with reference to FIGS. 11A and 11B is arranged to selectively operate the light sources to direct light into the viewing windows in positions corresponding to the left and right eyes of the observer.

The optical wedge 1104 extends across a transmissive spatial light modulator 1110 to which the output light is supplied. The spatial light modulator 1110 comprises an array of pixels that modulate light arranged in an aperture with a shape having two perpendicular axes of mirror symmetry. Since light is output from the optical wedge 1104 at high angles of refraction, a prismatic element 1108 extending across first guide surface of the optical wedge 1104 acts as a deflection element to deflect light towards the normal to the spatial light modulator 1110.

Sloped sides 1244, 1246 may be arranged in a similar manner to that shown in FIG. 28 to achieve filling of void portion 120.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight apparatus comprising:
a waveguide extending between an input end for receiving input light and a reflective end for reflecting the input light back through the waveguide;
an array of light sources disposed at different input positions in a lateral direction across the same input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions; and
a control system arranged to selectively operate the light sources to direct light into selectable viewing windows at different locations and comprising at least one of the optical windows,
wherein the reflective end converges the reflected light such that reflected light from light sources that are offset from the optical axis of the waveguide fails to illuminate outer portions of the waveguide,
the waveguide further comprises sides, extending between the input end and the reflective end and between the guiding surfaces, that are planar surfaces arranged to reflect light from the light sources, and
the control system being arranged, on selective operation of a first light source to direct light into a first of the viewing windows, to simultaneously operate a second light source that directs light into the first of the viewing windows, wherein the light of the second light source is reflected by the reflective end and then by a side of the waveguide into the outer portion of the waveguide that fails to be illuminated by the first light source,
wherein the first guide surface is arranged to guide light by total internal reflection and the second guide surface comprises a plurality of light extraction features oriented to reflect light guided through the waveguide in directions allowing exit through the first guide surface as the output light,
wherein the light extraction features are facets of the second guide surface, and
wherein the second guide surface has a stepped shape comprising said facets and intermediate regions between the facets that are arranged to direct light through the waveguide without extracting the light.

2. A directional backlight apparatus according to claim 1, wherein the second light source is selected to direct light into the same viewing window as the first light source.

3. A directional backlight apparatus according to claim 1, wherein the sides of the waveguide are parallel.

4. A directional backlight apparatus according to claim 1, wherein the sides of the waveguide diverge from the input end to the reflective end.

5. A directional backlight apparatus according to claim 1, wherein the sides of the waveguide converge from the input end to the reflective end.

6. A directional backlight apparatus according to claim 1, wherein the sides of the waveguide are arranged to reflect light from the light sources by total internal reflection.

7. A directional backlight apparatus according to claim 1, wherein the sides of the waveguide have a reflective coating.

8. A display apparatus comprising:
a directional backlight apparatus comprising:
a waveguide extending between an input end for receiving input light and a reflective end for reflecting the input light back through the waveguide;
an array of light sources disposed at different input positions in a lateral direction across the same input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions; and
a control system arranged to selectively operate the light sources to direct light into selectable viewing windows at different locations and comprising at least one of the optical windows,
wherein the reflective end converges the reflected light such that reflected light from light sources that are offset from the optical axis of the waveguide fails to illuminate outer portions of the waveguide, the waveguide further comprises sides, extending between the input end and the reflective end and between the guiding surfaces, that are planar surfaces arranged to reflect light from the light sources, and the control system being arranged, on selective operation of a first light source to direct light into a first of the viewing windows, to simultaneously operate a second light source that directs light into the first of the viewing windows, wherein the light of the second light source is reflected by the reflective end and then by a side of the waveguide into the outer portion of the waveguide that fails to be illuminated by the first light source; and a transmissive spatial light modulator extending across the directional backlight apparatus for modulating the light output therefrom, wherein the first guide surface is arranged to guide light by total internal reflection and the second guide surface comprises a plurality of light extraction features oriented to reflect light guided through the waveguide in directions allowing exit through the first guide surface as the output light, wherein the light extraction features are facets of the second guide surface, and wherein the second guide surface has a stepped shape comprising said facets and intermediate regions between the facets that are arranged to direct light through the waveguide without extracting the light.

9. A display apparatus according to claim 8, wherein the transmissive spatial light modulator is disposed across the first guide surface of the waveguide.

10. A display apparatus according to claim 8, being an autostereoscopic display apparatus, wherein the control system is arranged to control the spatial light modulator to display temporally multiplexed left and right eye images and synchronously to operate the light sources to direct light into viewing windows in positions corresponding to the left and right eyes of an observer.

11. A display apparatus according to claim 10, further comprising a sensor system arranged to detect the position of an observer relative to the display device, the control system to direct the displayed images into viewing windows in positions corresponding to the left and right eyes of the observer, in dependence on the detected position of the observer.

12. A display apparatus according to claim 8, wherein the first guide surface is arranged to guide light by total internal reflection and the second guide surface is substantially planar and inclined at an angle to reflect light in directions that break the total internal reflection for outputting light through the first guide surface, the display device further comprising a deflection element extending across the first guide surface of the waveguide for deflecting light towards the normal to the spatial light modulator.

13. A display apparatus comprising:

a display device including: a waveguide extending between an input end for receiving input light and a reflective end for reflecting the input light back through the waveguide; an array of light sources disposed at different input positions in a lateral direction across the same input end of the waveguide, the waveguide having first and second, opposed guide surfaces extending between the input end and the reflective end for guiding light forwards and back along the waveguide, the waveguide being arranged to reflect input light from light sources at the different input positions across the input end after reflection from the reflective end into respective optical windows in output directions distributed in the lateral direction in dependence on the input positions; and a transmissive spatial light modulator extending across the waveguide for modulating the light output therefrom, wherein the spatial light modulator extends across only part of the area of the waveguide; and a control system arranged to selectively operate the light sources to direct light into selectable viewing windows at different locations and comprising at least one of the optical windows, wherein the first guide surface is arranged to guide light by total internal reflection and the second guide surface comprises a plurality of light extraction features oriented to reflect light guided through the waveguide in directions allowing exit through the first guide surface as the output light, wherein the light extraction features are facets of the second guide surface, and wherein the second guide surface has a stepped shape comprising said facets and intermediate regions between the facets that are arranged to direct light through the waveguide without extracting the light.

14. A display apparatus according to claim 13, being an autostereoscopic display apparatus, wherein the control system is arranged to control the spatial light modulator to display temporally multiplexed left and right eye images and synchronously to operate the light sources to direct light into viewing windows in positions corresponding to the left and right eyes of an observer.

15. A display apparatus according to claim 14, further comprising a sensor system arranged to detect the position of an observer relative to the display device, the control system to direct the displayed images into viewing windows in positions corresponding to the left and right eyes of the observer, in dependence on the detected position of the observer.

* * * * *